(12) United States Patent
Kobayashi et al.

(10) Patent No.: US 8,538,197 B2
(45) Date of Patent: Sep. 17, 2013

(54) IMAGE PROCESSING APPARATUS

(75) Inventors: Hiroshi Kobayashi, Kanagawa (JP);
Osamu Kano, Tokyo (JP); Kei Hisano,
Tokyo (JP); Masashi Ota, Tokyo (JP)

(73) Assignee: Sony Corporation (JP)

( * ) Notice: Subject to any disclaimer, the term of this patent is extended or adjusted under 35 U.S.C. 154(b) by 718 days.

(21) Appl. No.: 12/452,902

(22) PCT Filed: Jul. 3, 2008

(86) PCT No.: PCT/JP2008/062045
§ 371 (c)(1),
(2), (4) Date: Jan. 26, 2010

(87) PCT Pub. No.: WO2009/016914
PCT Pub. Date: Feb. 5, 2009

(65) Prior Publication Data
US 2010/0157154 A1  Jun. 24, 2010

(30) Foreign Application Priority Data

Aug. 2, 2007 (JP) ............... P2007-202379
Aug. 2, 2007 (JP) ............... P2007-202380
Aug. 2, 2007 (JP) ............... P2007-202381
Aug. 2, 2007 (JP) ............... P2007-202382
Aug. 2, 2007 (JP) ............... P2007-202383
Aug. 2, 2007 (JP) ............... P2007-202384

(51) Int. Cl.
*G06K 9/36* (2006.01)
*G06K 9/00* (2006.01)
*H04N 9/76* (2006.01)
*G09G 5/00* (2006.01)

(52) U.S. Cl.
USPC ............ 382/284; 382/162; 348/599; 345/629

(58) Field of Classification Search
USPC .................. 382/162, 284; 348/599; 345/629
See application file for complete search history.

(56) References Cited

U.S. PATENT DOCUMENTS 6,157,415 A * 12/2000 Glen ............................. 348/599
6,335,761 B1  1/2002 Glen et al.
(Continued)

FOREIGN PATENT DOCUMENTS

| EP | 1933571 A1 | 6/2008 |
| JP | 2005-180477 A | 7/2005 |
| JP | 2006086728 A | 3/2006 |
| JP | 2006-094531 A | 4/2006 |
| WO | 2005013087 A2 | 2/2005 |
| WO | WO-2007-023698 A1 | 3/2007 |

OTHER PUBLICATIONS

Office Action from Japanese Application No. 2007-202379, dated Apr. 17, 2012.

(Continued)

*Primary Examiner* — Bernard Krasnic
(74) *Attorney, Agent, or Firm* — Lerner, David, Littenberg, Krumholz & Mentlik, LLP

(57) ABSTRACT

There is provided an image processing apparatus capable of preventing colors from changing while being displayed when images are combined. The image processing apparatus according to an embodiment includes a video graphic processor that combines a plurality of image signals to generate a combined image signal and an HDMI Tx that transmits, when the combined image signal is transmitted, an identification flag of one of a first color space standard and a second color space standard having a color gamut wider than a color gamut of the first color space standard as the color space standard of the combined image signal and a host CPU decides the first or second color space standard so as to prevent change in color while being displayed.

4 Claims, 61 Drawing Sheets

(56) References Cited

U.S. PATENT DOCUMENTS

| | | | |
|---|---|---|---|
| 6,462,786 B1 * | 10/2002 | Glen et al. | 348/599 |
| 6,518,970 B1 * | 2/2003 | Glen et al. | 345/501 |
| 7,483,042 B1 * | 1/2009 | Glen | 345/629 |
| 7,522,307 B2 | 4/2009 | Sawada | |
| 2005/0099434 A1 * | 5/2005 | Gray et al. | 345/629 |
| 2005/0146538 A1 * | 7/2005 | Gray et al. | 345/629 |
| 2009/0116819 A1 | 5/2009 | Kondo et al. | |

OTHER PUBLICATIONS

Supplementary European Search Report EP 08790838, dated Mar. 27, 2012.

Office Action from Japanese Application No. 2007-202379, dated Dec. 20, 2011.

* cited by examiner

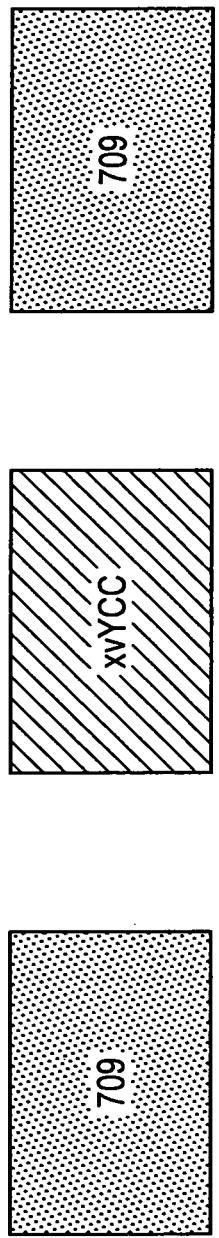
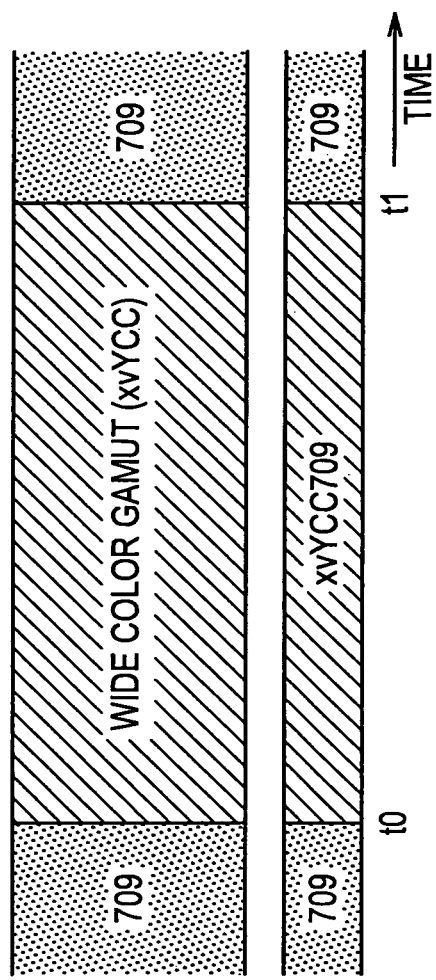
FIG.6A SCREEN IMAGE
FIG.6B OUTPUT VIDEO SIGNAL
FIG.6C COLOR SPACE INFORMATION

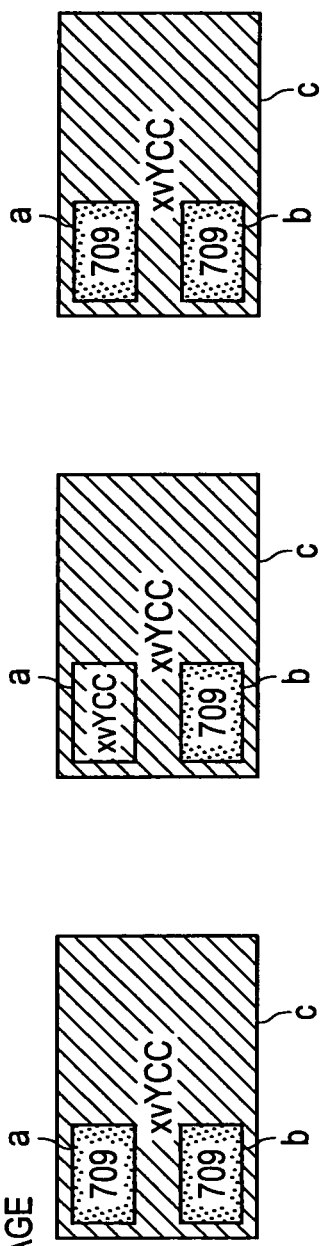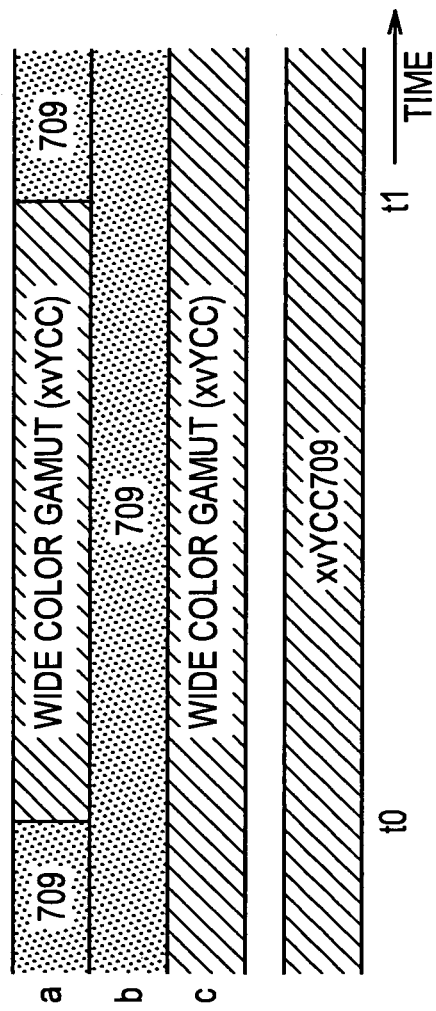

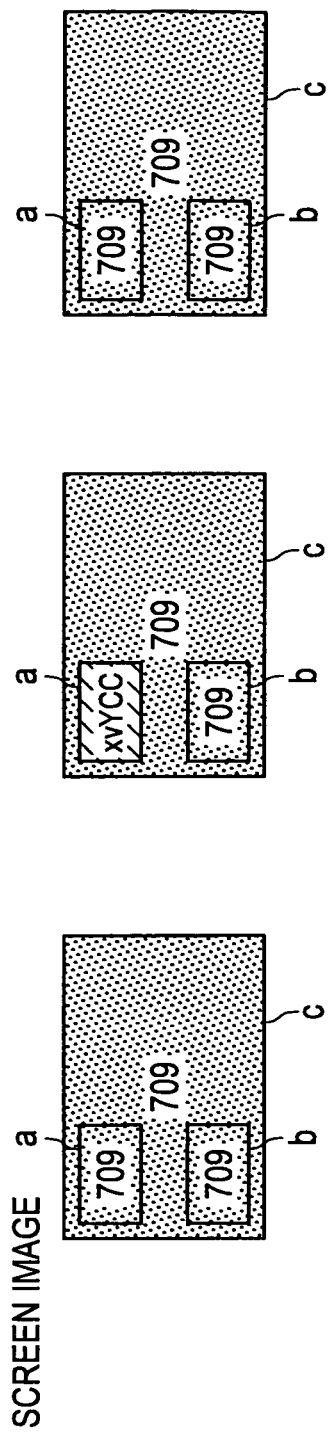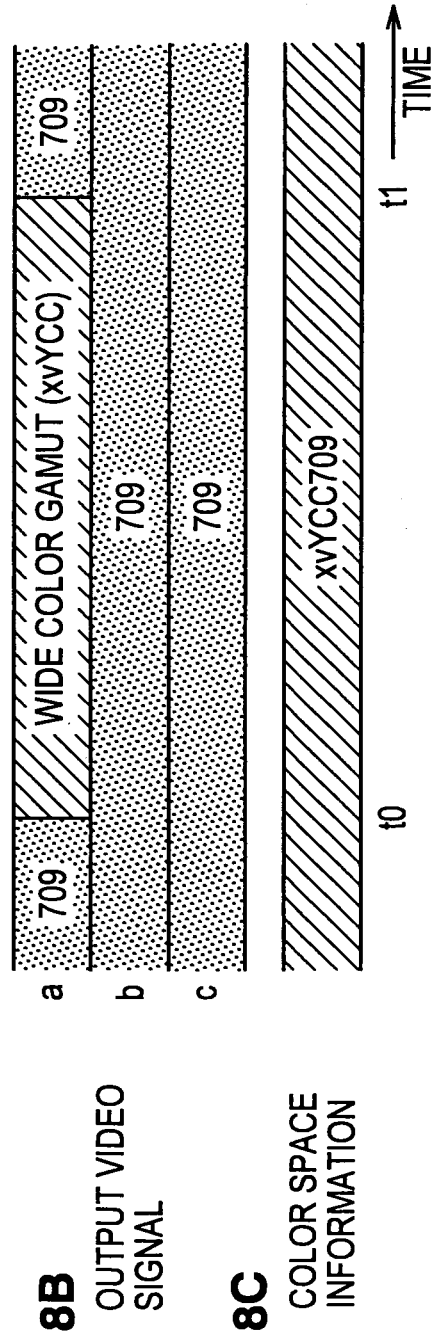

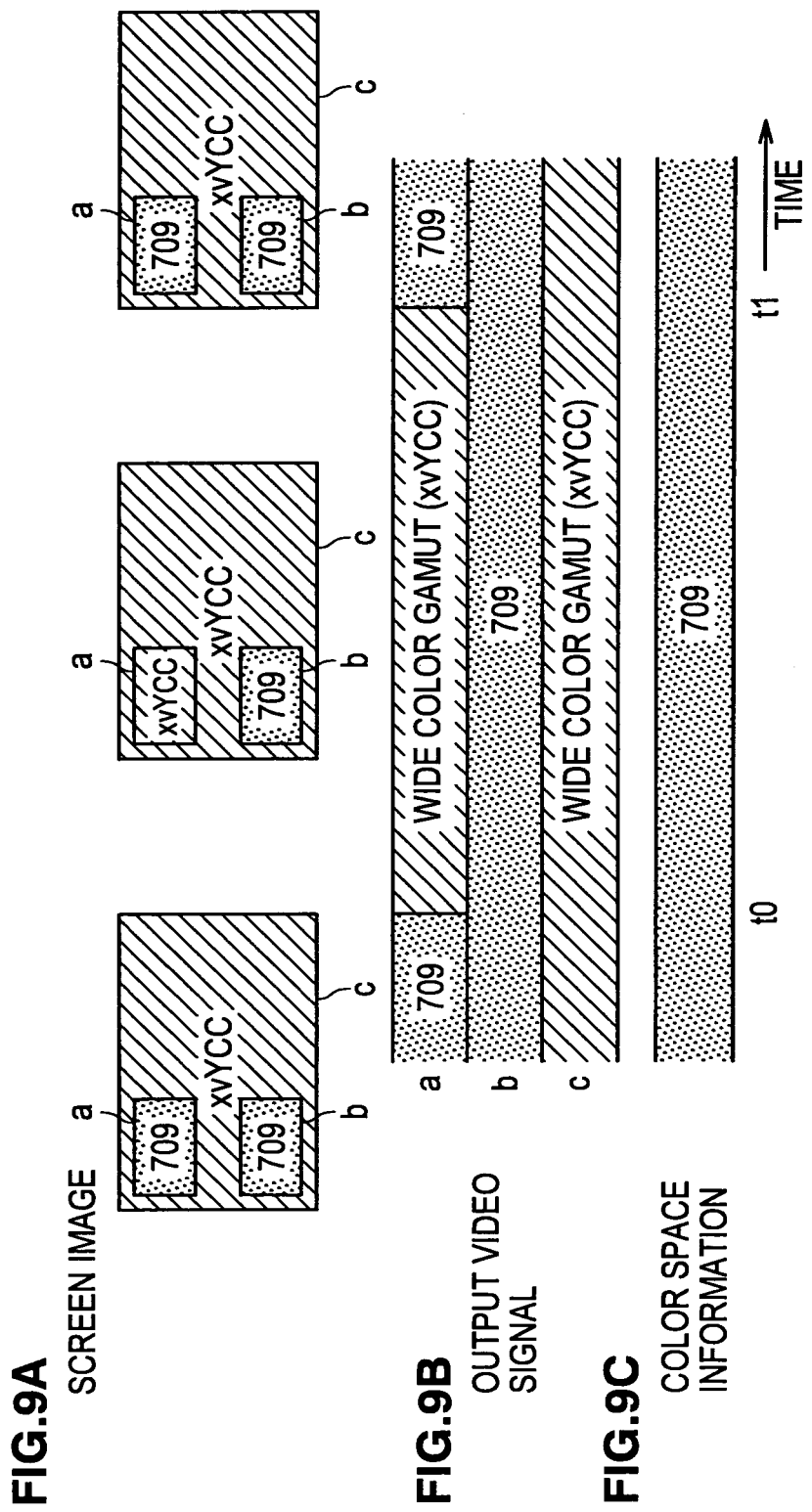

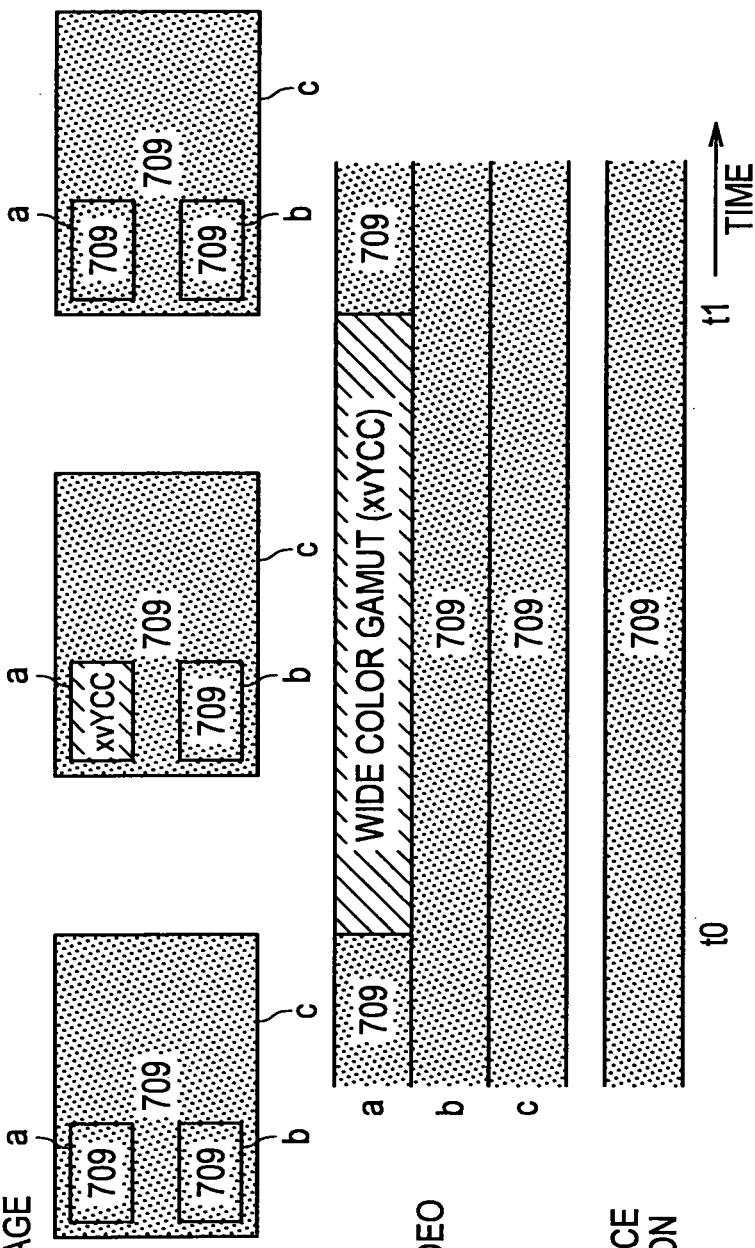

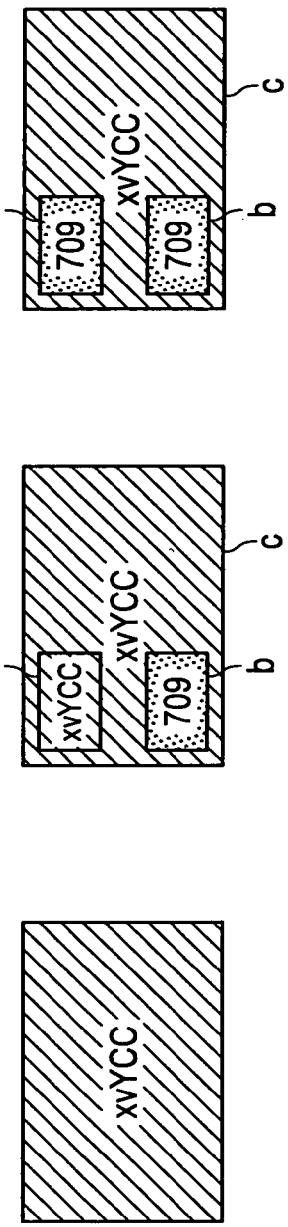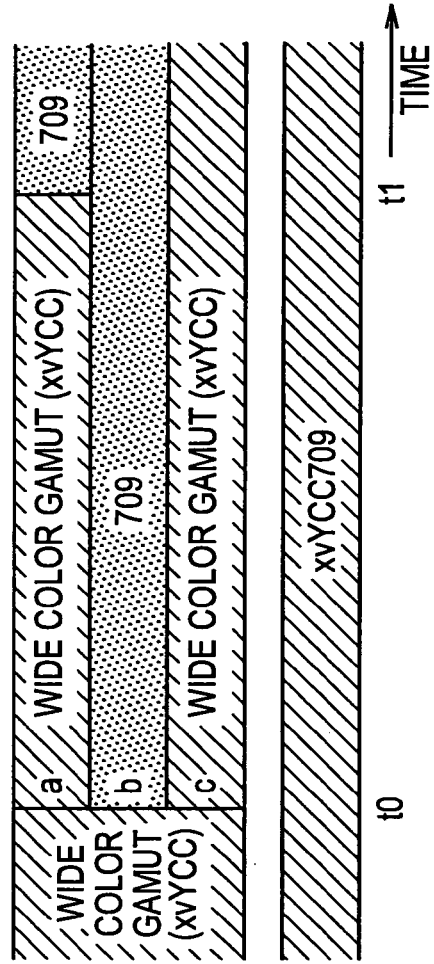
FIG.11A SCREEN IMAGE
FIG.11B OUTPUT VIDEO SIGNAL
FIG.11C COLOR SPACE INFORMATION

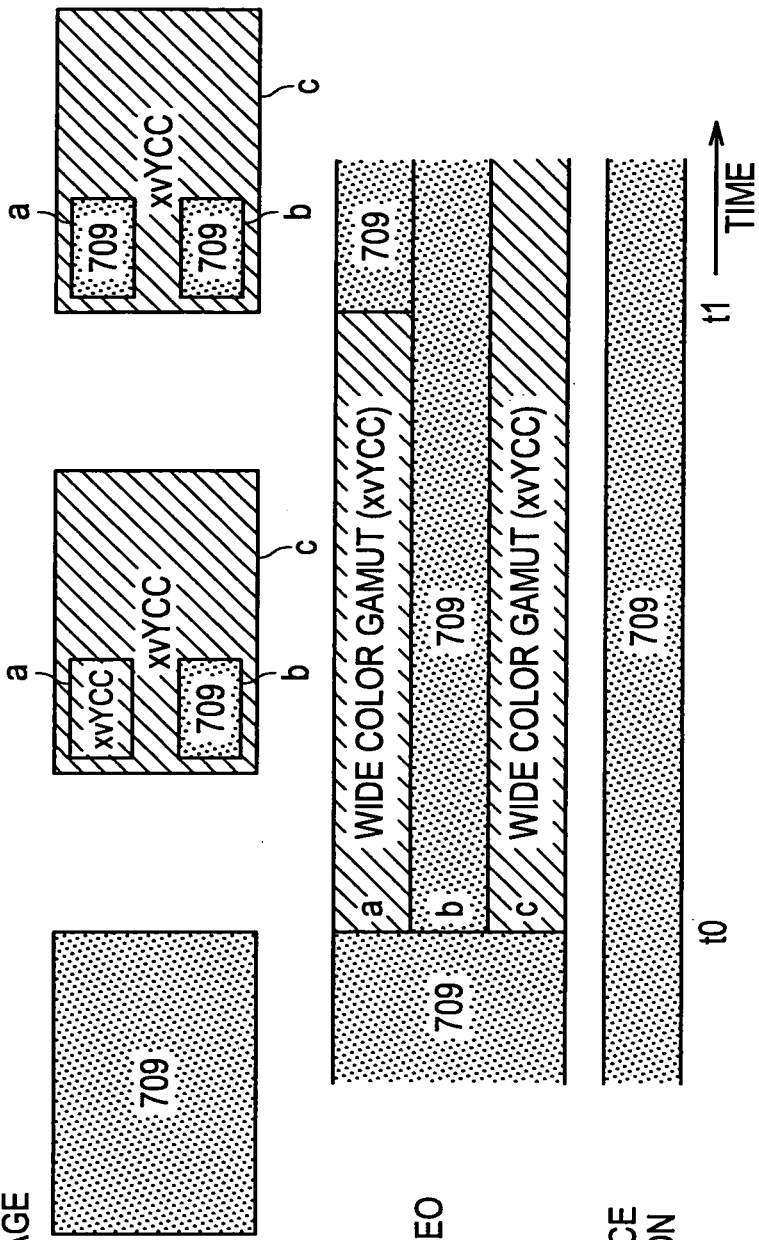

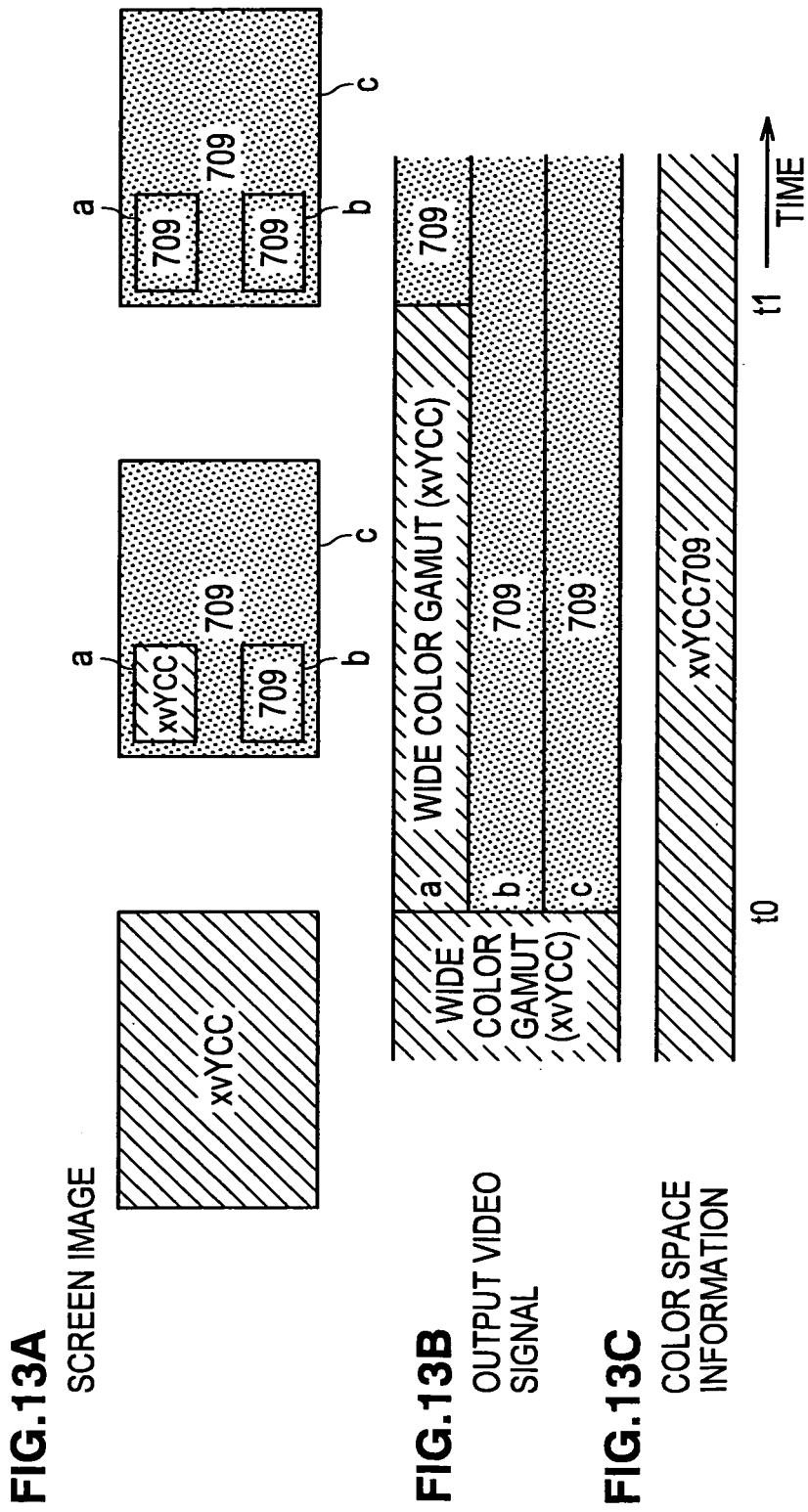

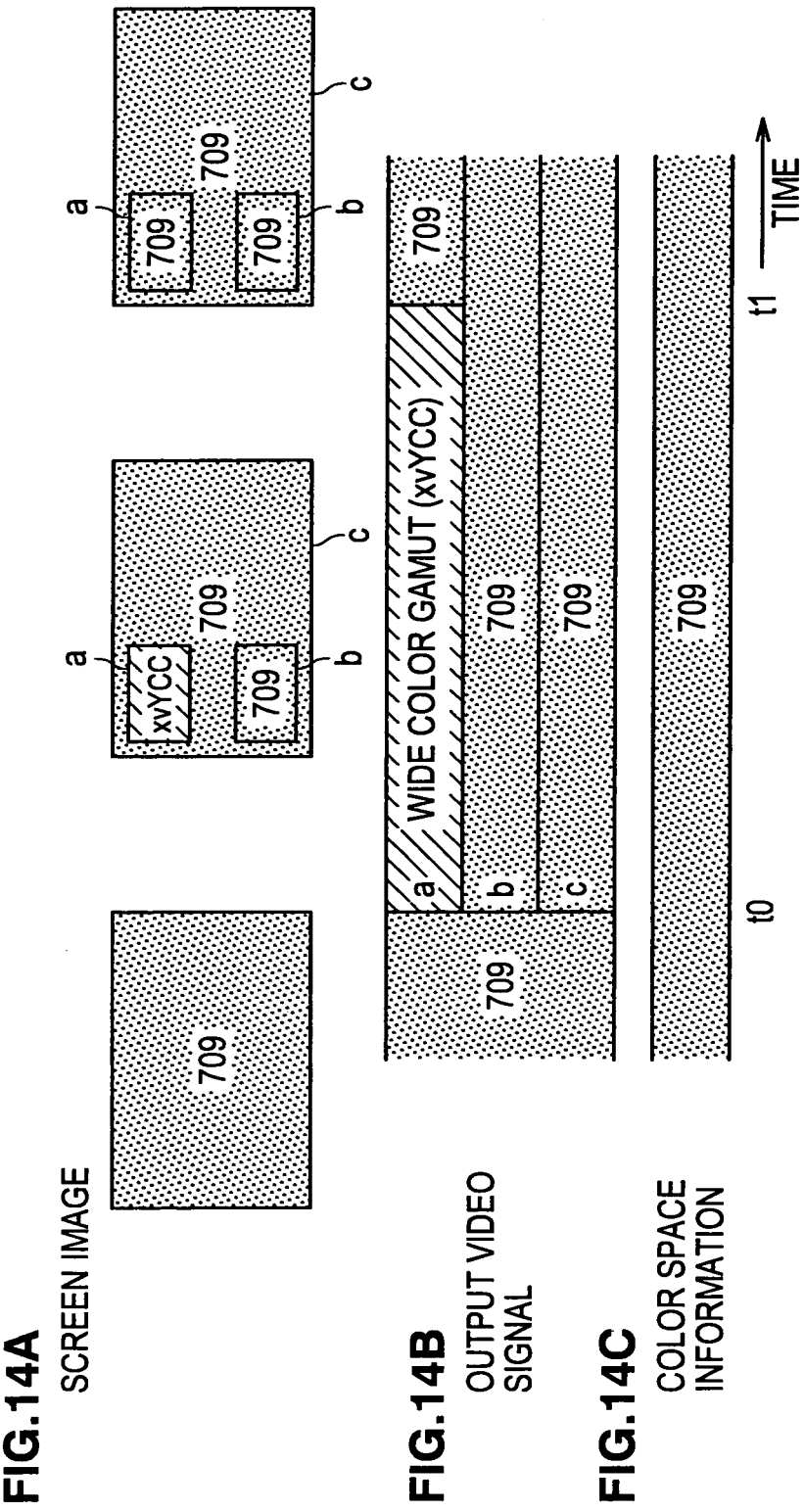

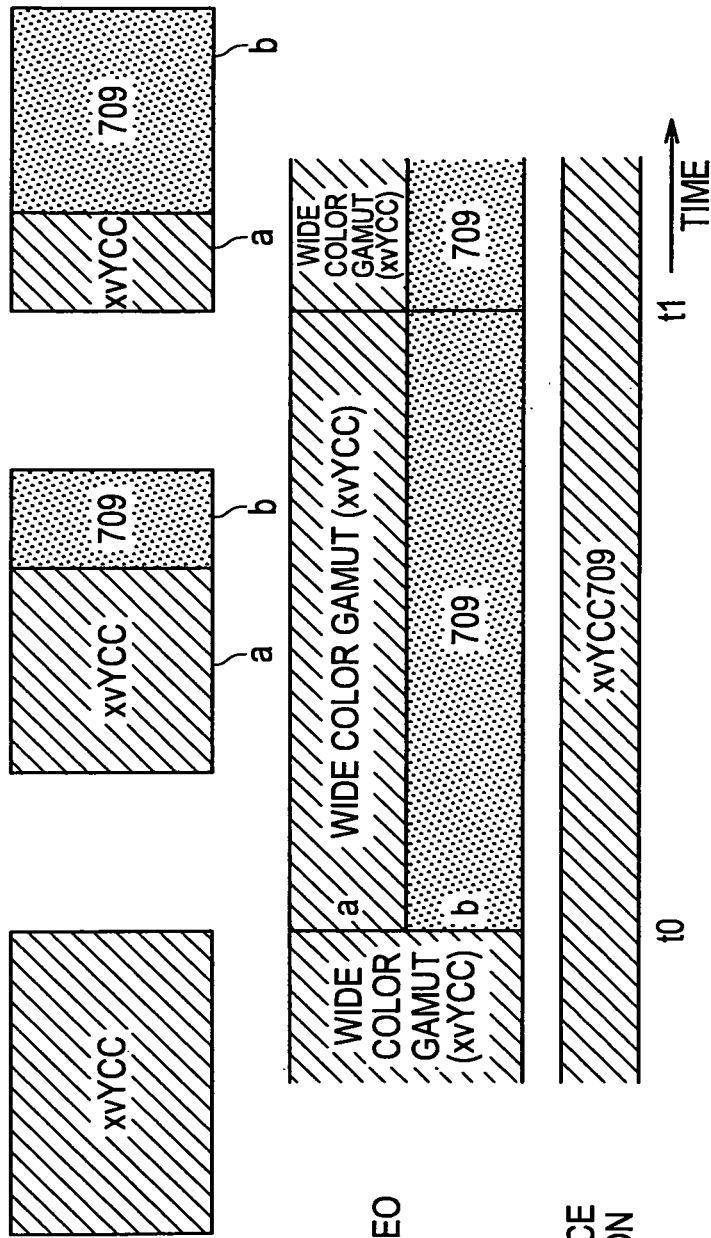

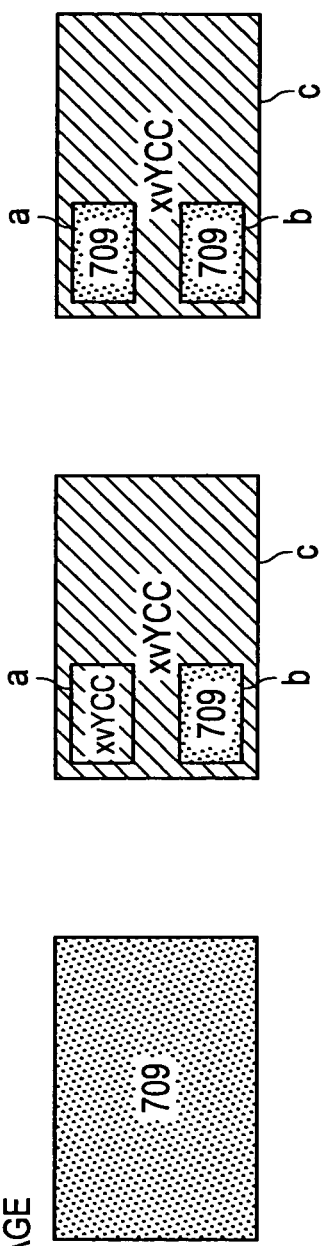
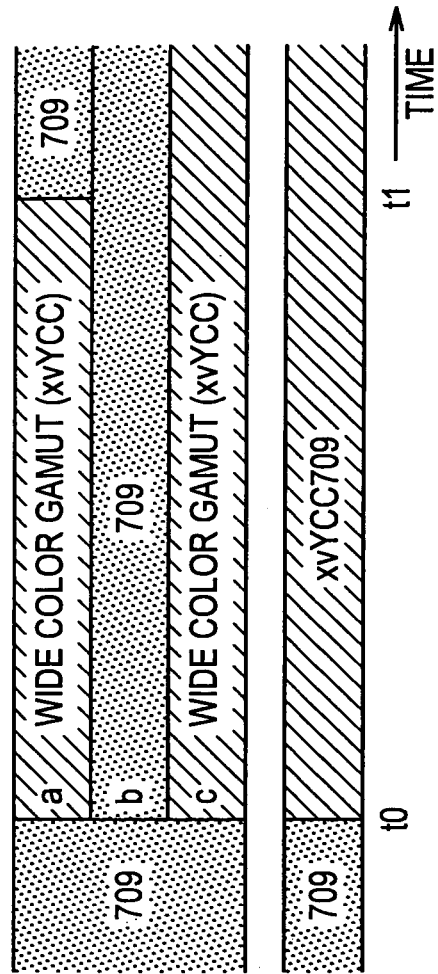
FIG.16A SCREEN IMAGE
FIG.16B OUTPUT VIDEO SIGNAL
FIG.16C COLOR SPACE INFORMATION

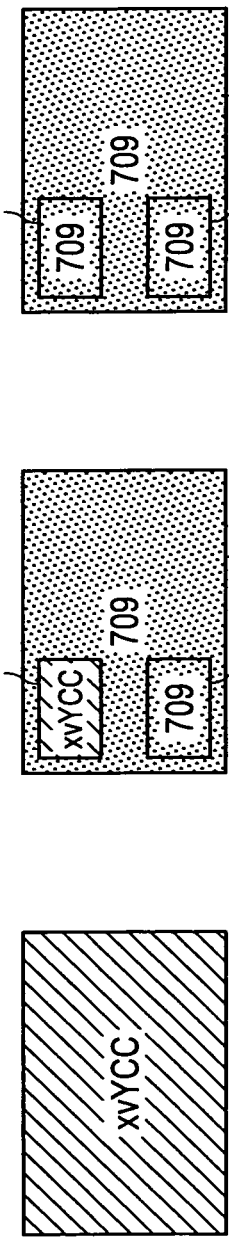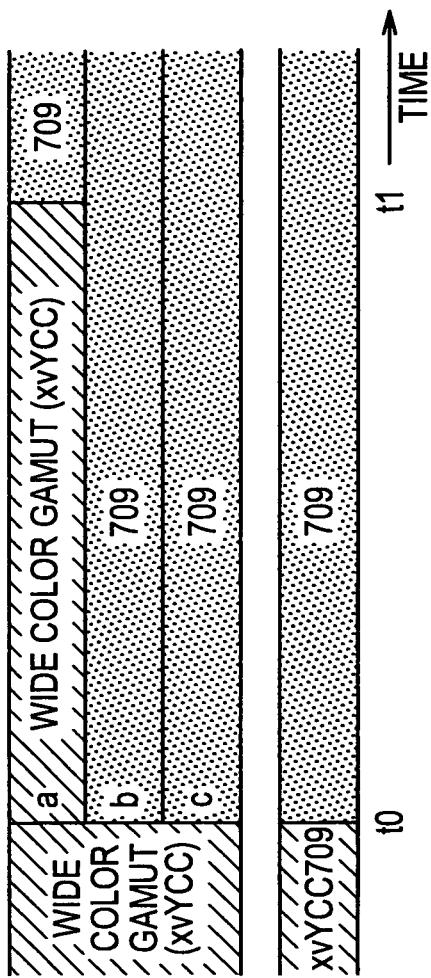
FIG.17A SCREEN IMAGE
FIG.17B OUTPUT VIDEO SIGNAL
FIG.17C COLOR SPACE INFORMATION

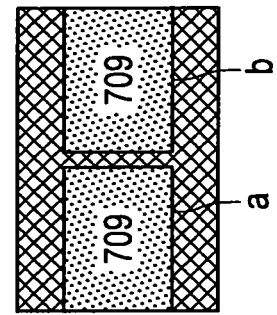
FIG.18A SCREEN IMAGE
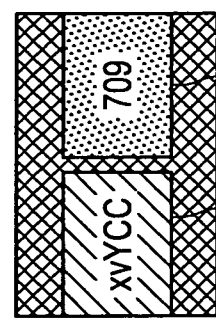
FIG.18B OUTPUT VIDEO SIGNAL
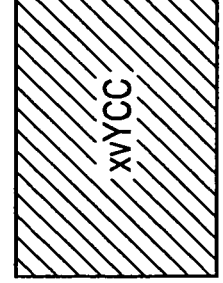
FIG.18C COLOR SPACE INFORMATION
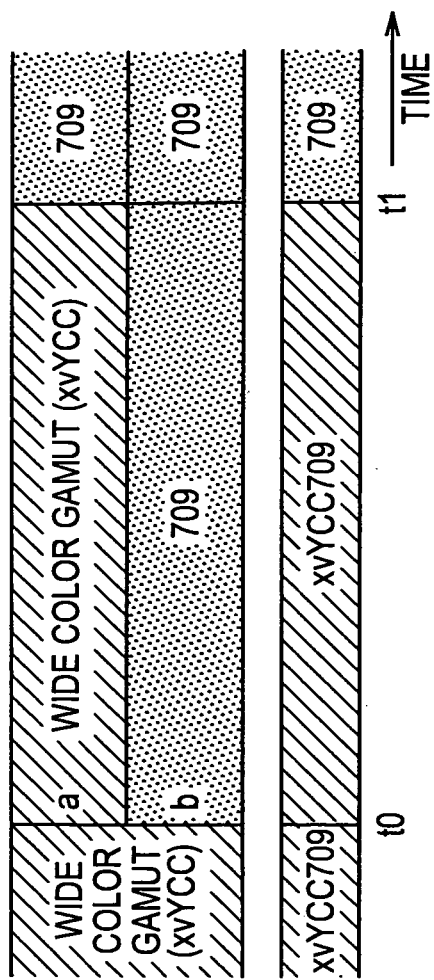

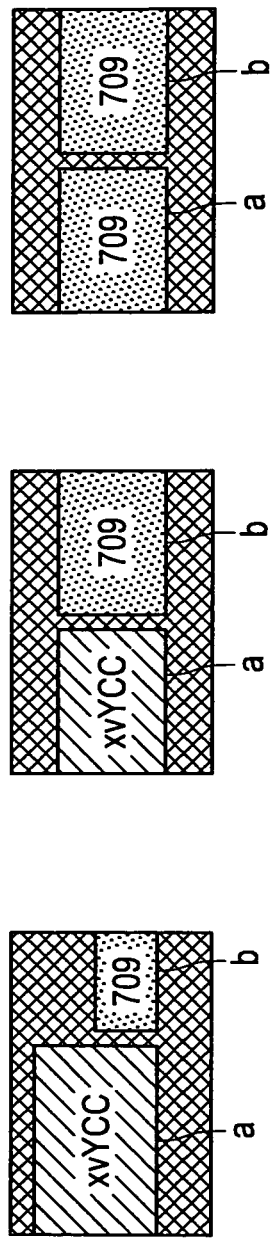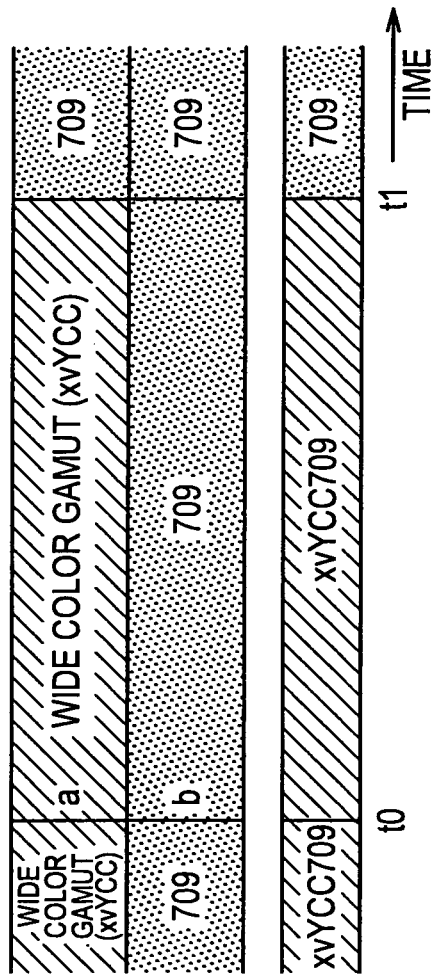
FIG.19A SCREEN IMAGE
FIG.19B OUTPUT VIDEO SIGNAL
FIG.19C COLOR SPACE INFORMATION

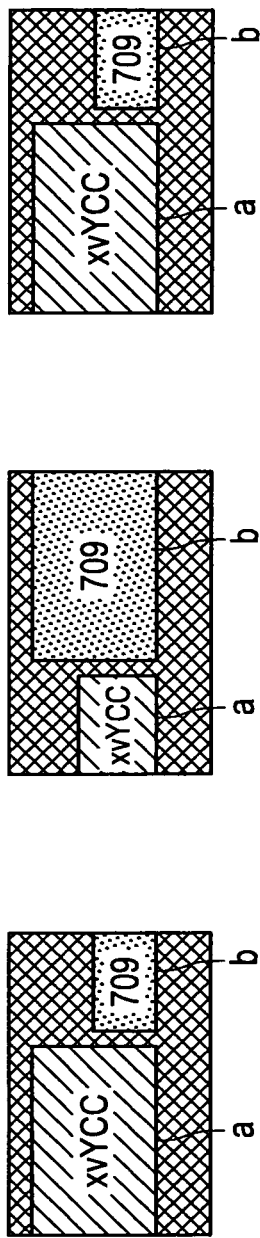
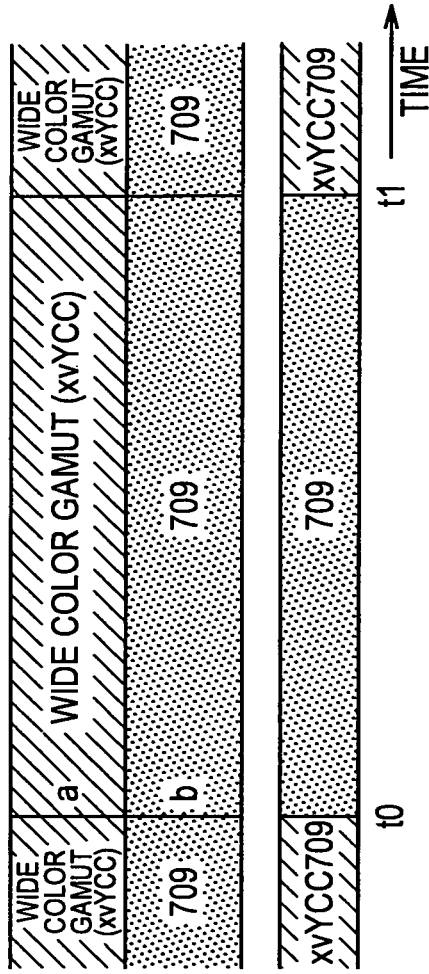
FIG.20A SCREEN IMAGE
FIG.20B OUTPUT VIDEO SIGNAL
FIG.20C COLOR SPACE INFORMATION

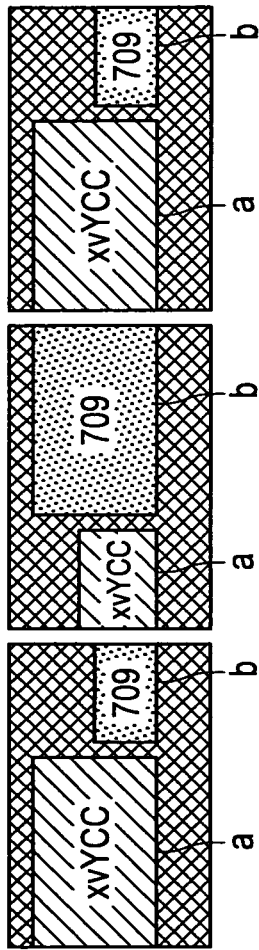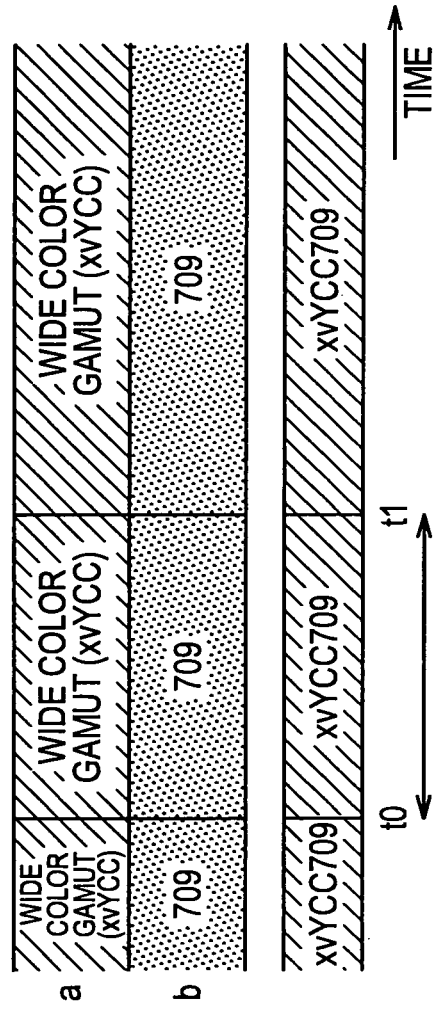

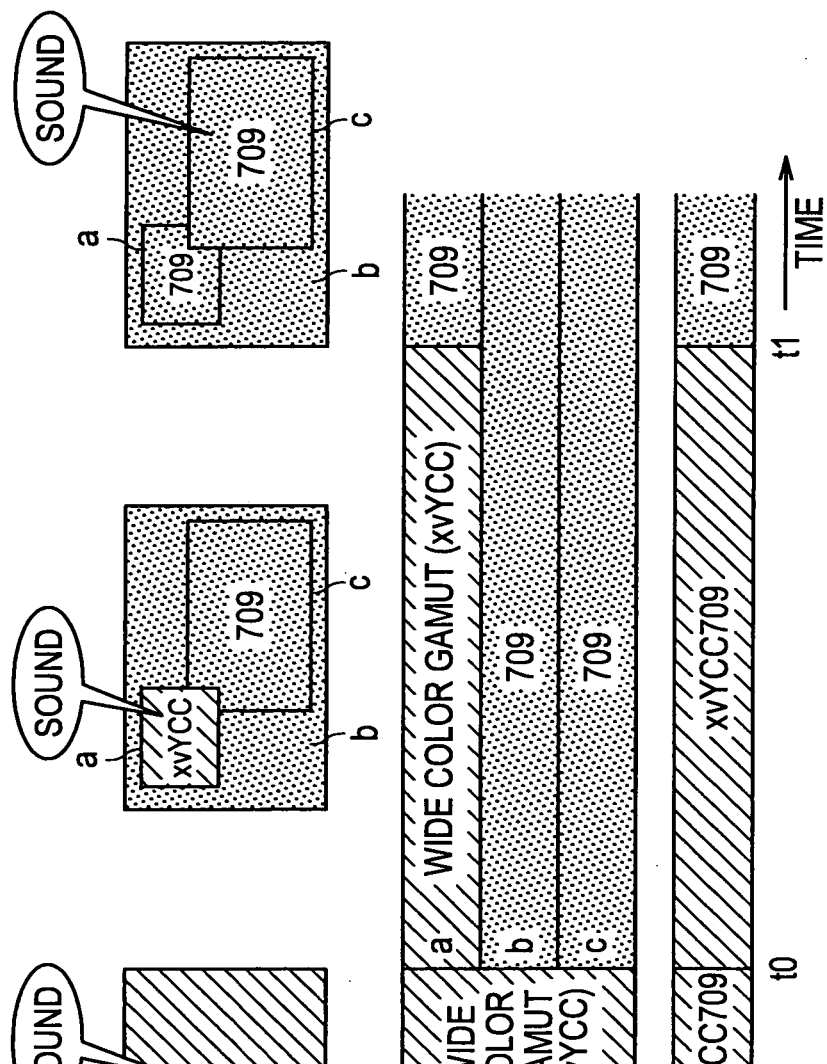
FIG.22A SCREEN IMAGE
FIG.22B OUTPUT VIDEO SIGNAL
FIG.22C COLOR SPACE INFORMATION

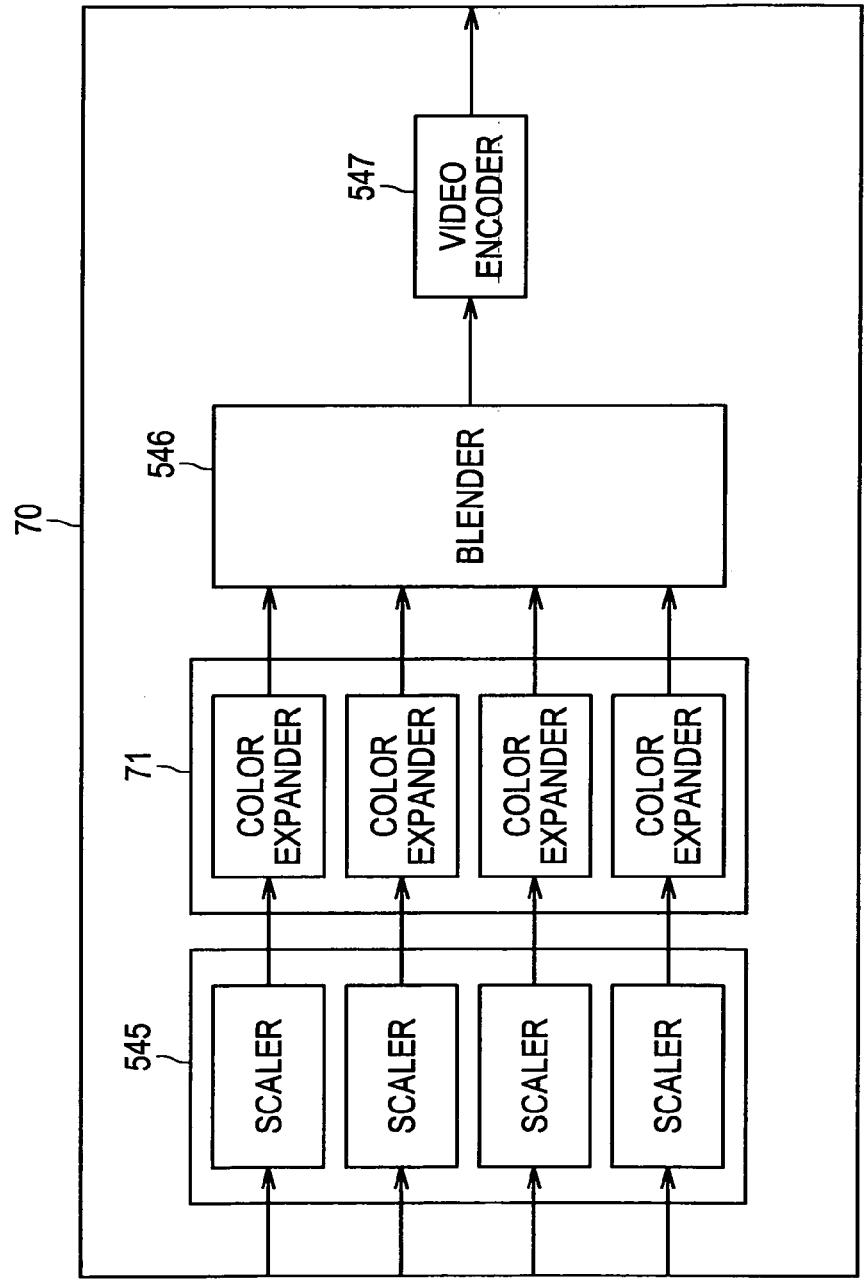

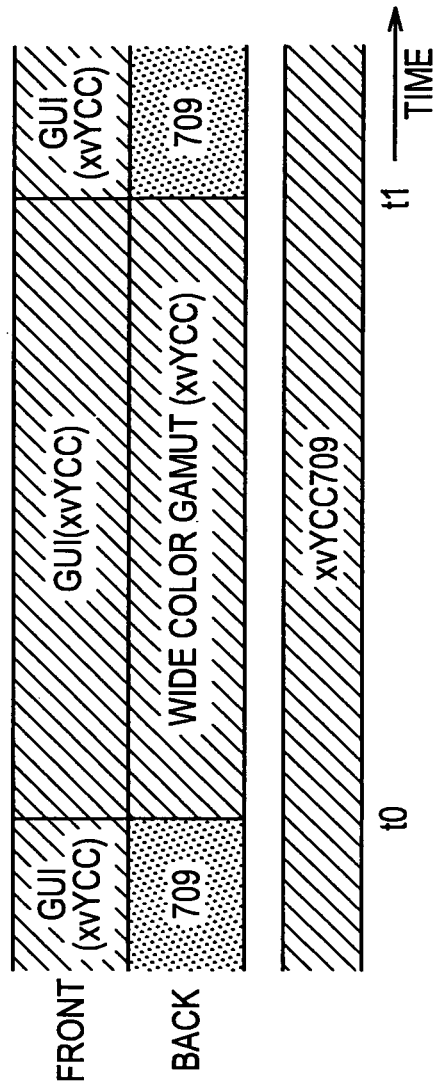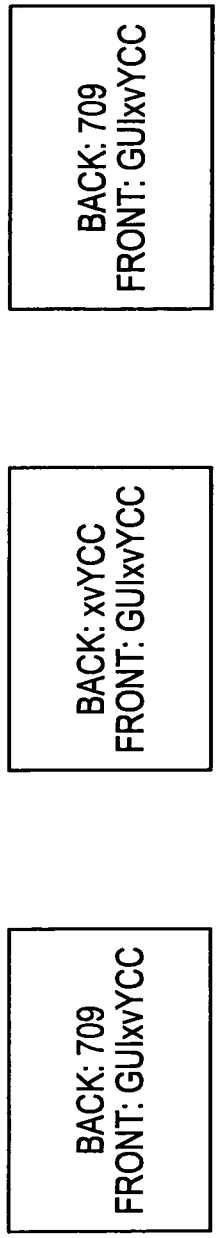
FIG.28A SCREEN IMAGE
FIG.28B OUTPUT VIDEO SIGNAL
FIG.28C COLOR SPACE INFORMATION

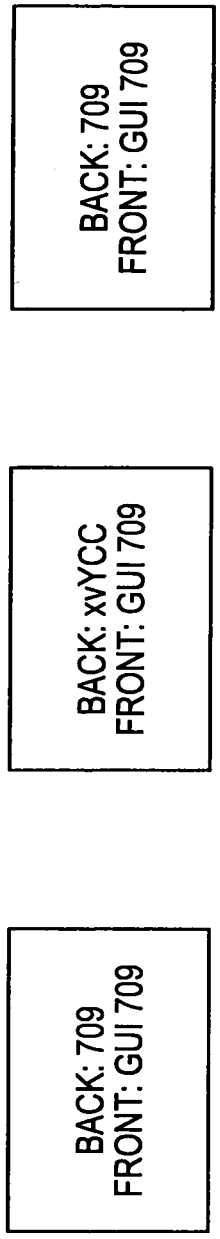
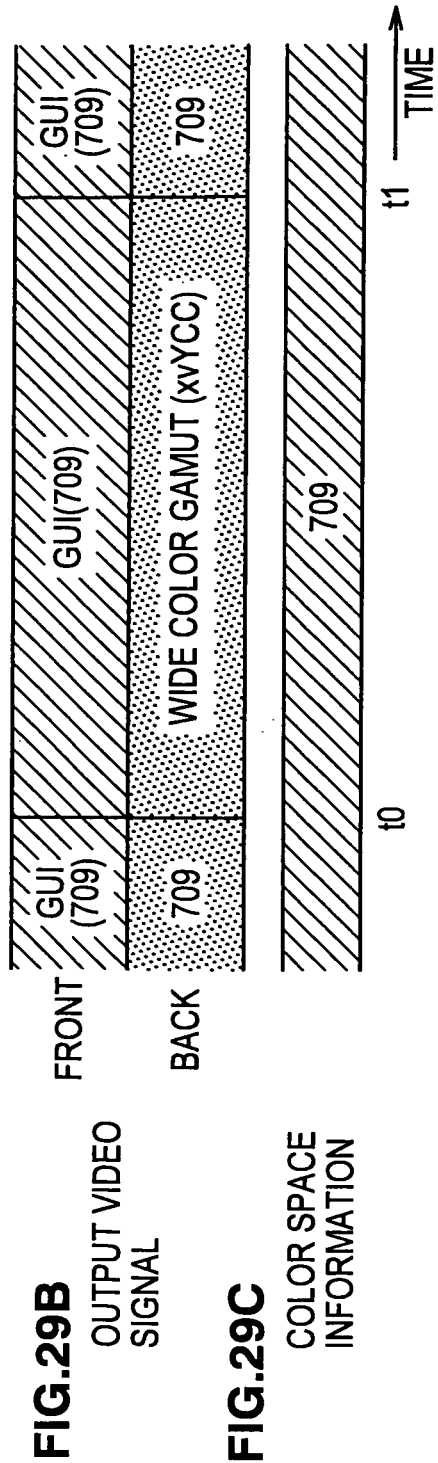
FIG.29A SCREEN IMAGE
FIG.29B OUTPUT VIDEO SIGNAL
FIG.29C COLOR SPACE INFORMATION

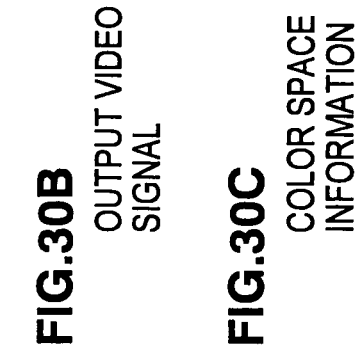

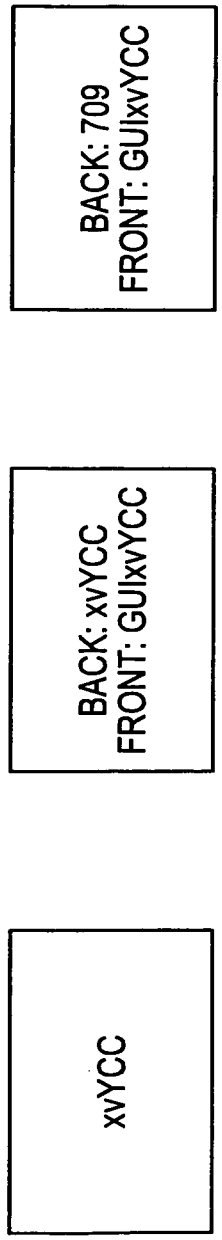
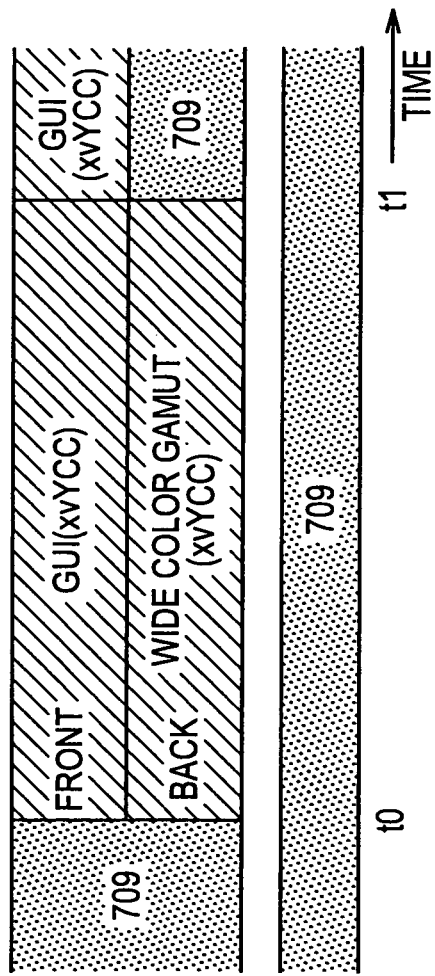
FIG.31A SCREEN IMAGE
FIG.31B OUTPUT VIDEO SIGNAL
FIG.31C COLOR SPACE INFORMATION

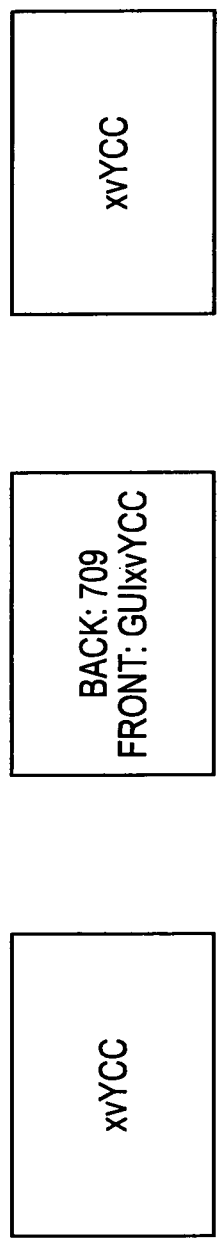
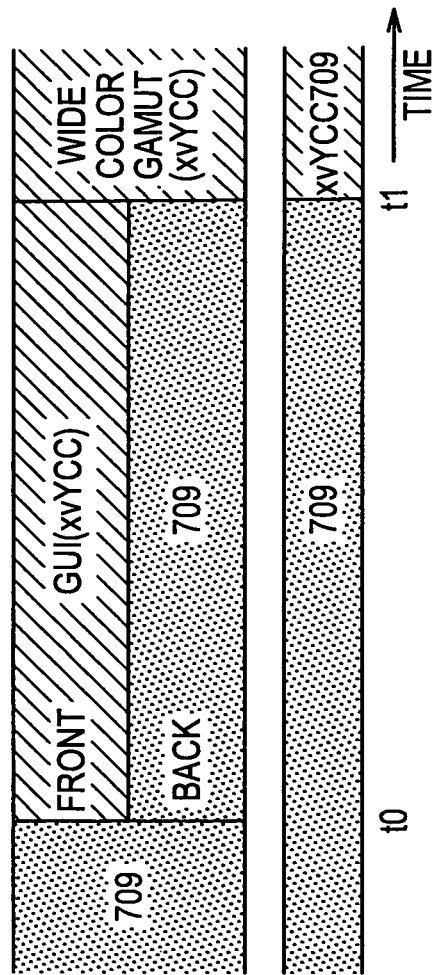
FIG.32A SCREEN IMAGE
FIG.32B OUTPUT VIDEO SIGNAL
FIG.32C COLOR SPACE INFORMATION

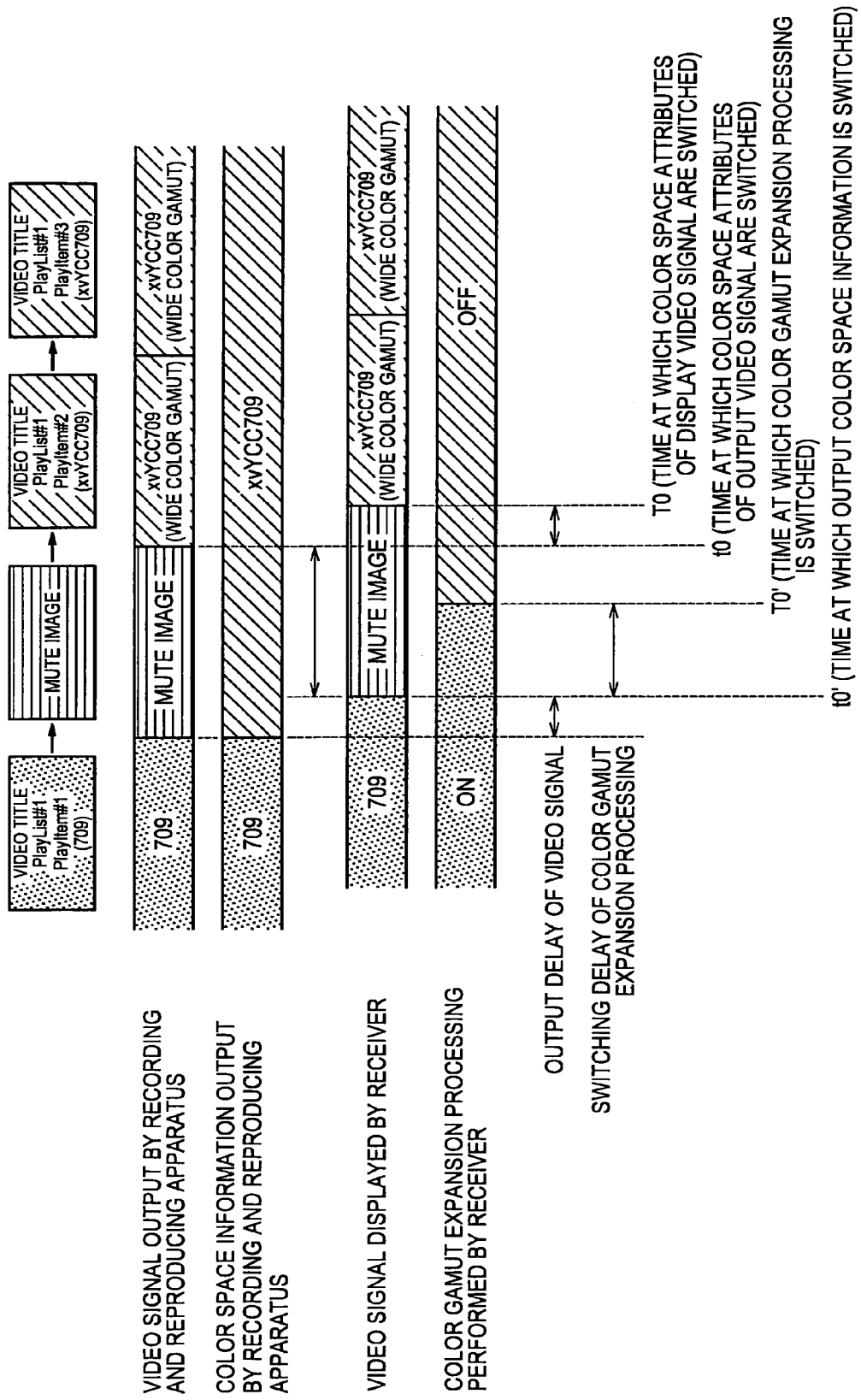

| TIME | COLOR SPACE INFORMATION |
|---|---|
| 0 | xvYCC |
| 10 | BT.709 |
| 15 | xvYCC |

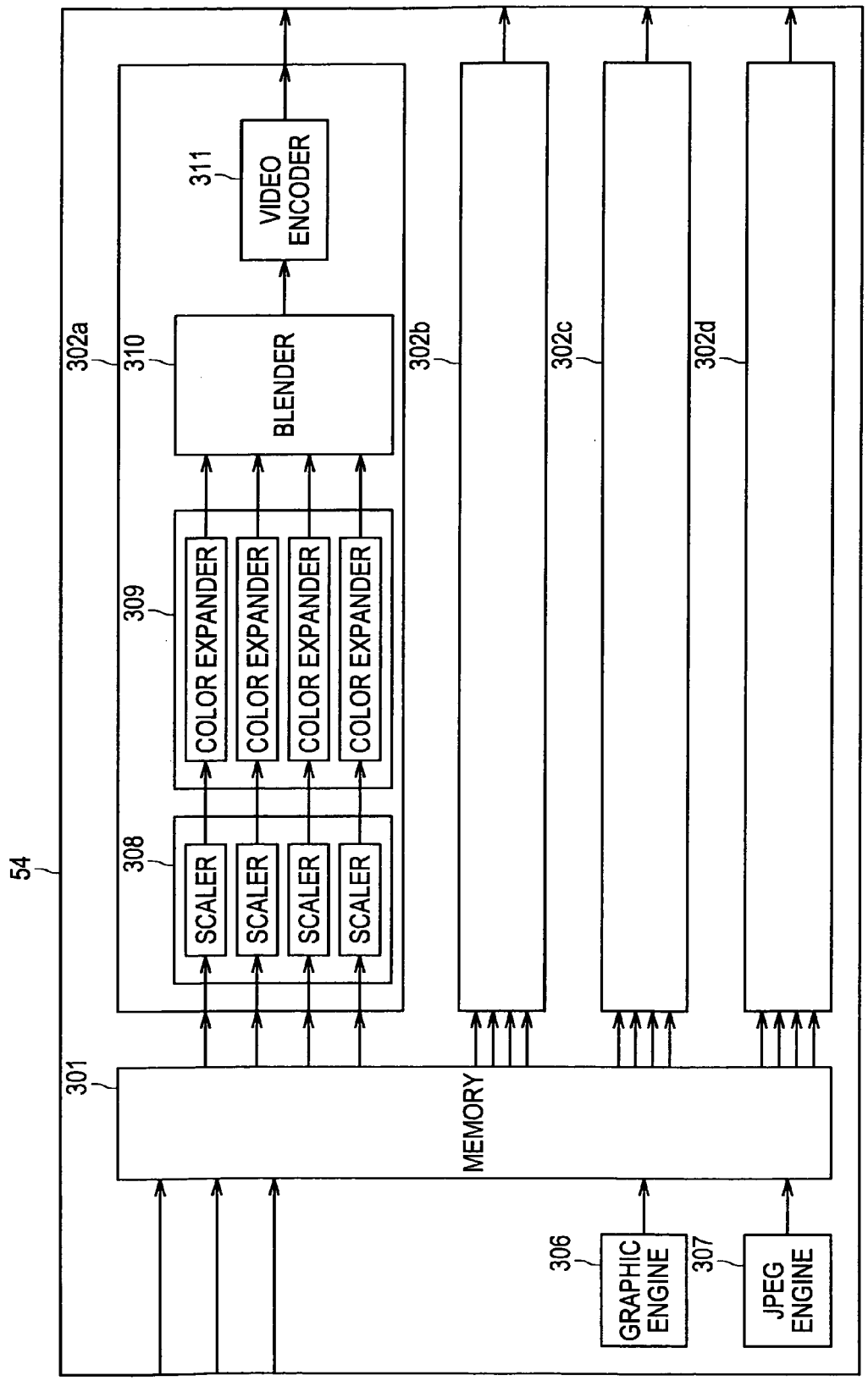

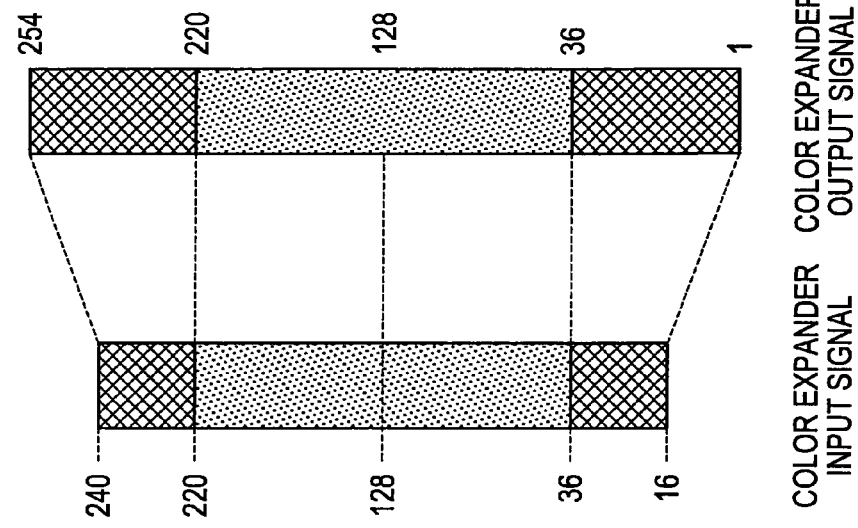
FIG.59A Cr SIGNAL EXPANSION PROCESSING
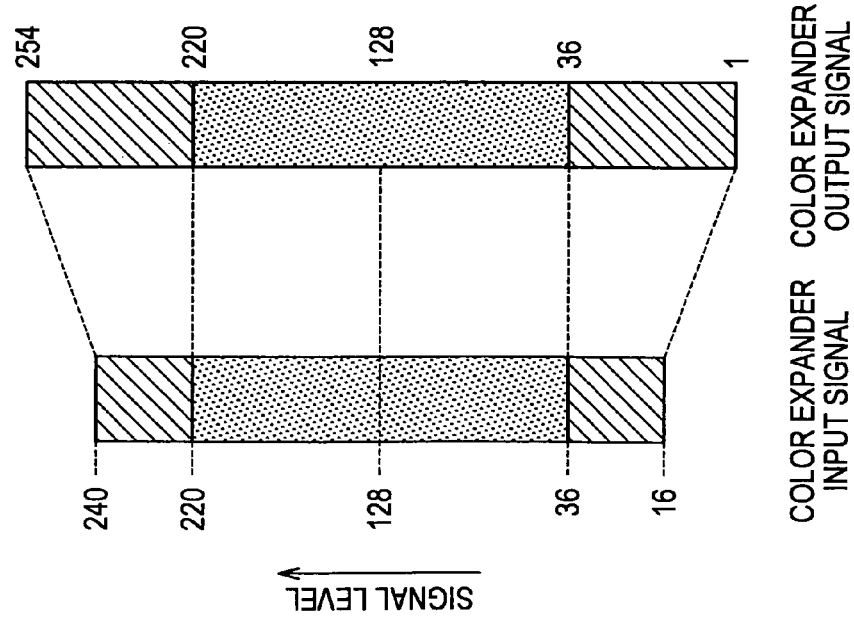
FIG.59B Cb SIGNAL EXPANSION PROCESSING

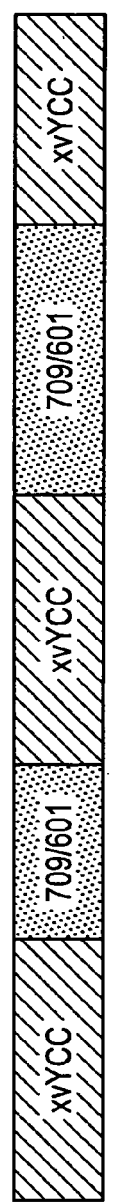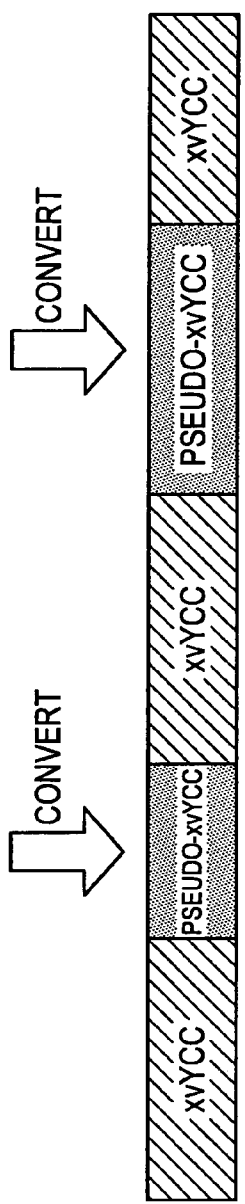
FIG.61A INPUT SIGNAL
FIG.61B OUTPUT VIDEO SIGNAL
FIG.61C COLOR SPACE INFORMATION

IMAGE PROCESSING APPARATUS

CROSS-REFERENCES TO RELATED APPLICATIONS

The present application is a national phase entry under 35 U.S.C. §371 of International Application No. PCT/JP2008/062045 filed Jul. 3, 2008, published on Feb. 5, 2009 as WO 2009/016914 A1, which claims priority from Japanese Patent Application Nos. JP 2007-202379, JP 2007-202380, JP 2007-202381, JP 2007-202382, JP 2007-202383, and JP 2007-202384 all filed in the Japanese Patent Office on Aug. 2, 2007.

TECHNICAL FIELD

The present invention relates to an image processing apparatus that processes a plurality of pieces of image data having different color space information.

BACKGROUND ART

In displays and HDTV (High Definition TeleVision) broadcasting, color spaces standardized by sRGB (IEC (International Electrotechnical Commission) 61966-2-1) or ITU-R (International Telecommunication Union-Radiocommunication Sector) BT.709 have been widely used. In recent years, with the advent of wide color gamut panels, color representations of a wider color gamut exceeding sRGB are now possible on the TV receiver side.

To make full use of a wider color gamut of panels, such a TV receiver adopts a technology to expand the color gamut (hereinafter, called "color gamut expansion processing") by signal processing on video content of the color space of sRGB and the TV receiver can reproduce more vivid colors by performing color gamut expansion processing of colors with saturation at such a high level that would be clipped in the sRGB color space. Moreover, the user can turn on/off color gamut expansion processing by selecting the image quality mode of the TV receiver.

The TV receiver can also receive color space information from a source device together with a video signal by using HDMI (High-Definition Multimedia Interface) and exercise control according to color space information such as turning on color gamut expansion processing for BT.709 and turning off color gamut expansion processing for color space information of other wide color gamut automatically.

On the other hand, image sensors and camera signal processing increasingly adopt the wide color gamut and a wide color gamut signal of the color gamut that is shot by a camera and exceeds that of sRGB can be recorded on a disk or tape before being reproduced. The wide color gamut signal recorded on a disk or tape can also be dubbed onto an optical disk recorder via a digital interface such as IEEE (Institute of Electrical and Electronic Engineers) 1394 or the disk on which a wide color gamut signal is recorded can be reproduced by an optical disk recorder or player. Moreover, a camera and recorder can transmit such a wide color gamut signal or color space information to a TV receiver by using HDMI.

A conventional display using a CRT (cathode ray tube) can display only colors, for example, inside the color space covered by sRGB and it is difficult to see colors with high saturation present in the natural world through the display. However, displays having a wider color gamut than before are appearing thanks to recent display technology and a liquid crystal TV receiver using an LED (light emitting diode) backlight is known as a typical wide color gamut compatible display.

xvYCC is standardized as a standard for video signal (image signal) suitable for such a wide color gamut display after video signal specifications that adopt a wide color gamut while maintaining compatibility with conventional signals being discussed. The xvYCC is a standard issued by IEC (International Electrotechnical Commission) as an international standard (IEC 61966-2-4) and broadens the color space while ensuring compatibility with the color gamut of ITU-R BT. 709 (equivalent to sRGB) used by HDTV (High Definition TeleVision). According to the xvYCC, colors that is difficult for the current color space standard "ITU-R BT.709" (equivalent to sRGB for still images) of animation content can be represented.

For transmission using a wide color gamut such as the xvYCC, it is necessary for both a sender and a receiver to recognize that an xvYCC signal is transmitted and make a correct display because the color space of the sender and that of the receiver may be different. Thus, for example, color space information can be received together with a video signal from the source device by using HDMI and definitions of metadata and the xvYCC color space are added to the HDMI version 1.3.

That is, while only the color space of SMPTE 170M/ITU601 or ITU709 was defined before in AVI (Auxiliary Video Information) InfoFrame as attribute data of the HDMI standard, a field is now added for a new color space such as xvYCC. When an xvYCC signal is transmitted by between devices compatible with the HDMI version 1.3, correct gamut mapping between a sender and a receiver can be realized by supporting the standard.

Patent Document 1 discloses a technology enabling desired color reproduction by using a standard color space whose color gamut is expanded as conventional technology.

PRIOR ART DOCUMENT

Patent Document 1 Japanese Patent Application Laid-Open No. 2006-180477

DISCLOSURE OF THE INVENTION

Incidentally, if color gamut expansion processing of a TV receiver is turned on/off, the tint and the depth of color of a displayed image change. If color space information is changed depending on attributes of animation images/still images in the background when, for example, animation images/still images are blended with the background of graphics of a fixed color, the color of graphics while being displayed, which should be fixed, will change because the TV receiver switches color gamut expansion processing according to the color space information. Thus, the user may find such a change while being displayed annoying.

Moreover, when a plurality of animation images/still images or graphics is combined, for example, if the color space standard of the combined image changes from a state in which all animation images/still images conform to BT.709 to a state in which one animation image/still image conforms to the wide color gamut and color space information is changed depending on attributes of the animation image/still image, the TV receiver switches color gamut expansion processing according to the color space information and therefore, colors of graphics or animation images/still images while being displayed change, making some users unpleasant.

The present invention has been made in view of the conventional circumstances described above and it is desirable to provide an image processing apparatus capable of preventing change in color while being displayed after images are combined.

According to an embodiment of the present invention, there is provided an image processing apparatus that performs signal processing of an image signal of a first color space standard and an image signal of a second color space standard having a wider color gamut than a color gamut specified by the first color space standard including image processing means for combining a plurality of image signals to generate a combined image signal, control means for deciding color space information of the combined image signal in favor of one of the first color space standard and the second color space standard, and transmission means for transmitting the combined image signal and the decided color space information according to a predetermined digital video signal transmission standard. The control means decides the color space information of the combined image signal in accordance with at least one of the color space standards of the plurality of image signals combined by the image processing means and the color space information transmitted prior to switching to the combined image signal.

According to another embodiment of the present invention, there is provided an image processing apparatus that outputs an image signal of a first color space standard and an image signal of a second color space standard having a wider color gamut than the color gamut specified by the first color space standard including detection means for detecting a switching time when the first color space standard and the second color space standard of the image signal are switched, control means for changing color space information of the image signal in accordance with switching of the image signal from one color space standard to another color space standard, and transmission means for transmitting the image signal and the color space information according to a predetermined digital video signal transmission standard. The control means changes the color space information prior to a switching time of the color space standards.

According to another embodiment of the present invention, there is provided an image processing apparatus that outputs an image signal of a first color space standard and an image signal of a second color space standard having a wider color gamut than a color gamut specified by the first color space standard including detection means for detecting a switching time when the first color space standard and the second color space standard of the image signal are switched, control means for changing color space information of the image signal in accordance with switching of the image signal from one color space standard to another color space standard, and transmission means for transmitting the image signal and the color space information according to a predetermined digital video signal transmission standard. If next switching of the color space standard occurs within a predetermined period after the switching time, the control means restricts a change of the color space information in accordance with the another color space standard.

According to another embodiment of the present invention, there is provided an image processing apparatus that outputs an image signal of a first color space standard and an image signal of a second color space standard having a wider color gamut than a color gamut specified by the first color space standard including detection means for detecting a switching time when the first color space standard and the second color space standard of the image signal are switched, control means for changing color space information of the image signal in accordance with switching of the image signal from one color space standard to another color space standard, output control means for controlling output of the image signal, and transmission means for transmitting the image signal and the color space information according to a predetermined digital video signal transmission standard. The output control means inserts a preset image signal when the image signal is switched from one color space standard to another color space standard.

According to another embodiment of the present invention, there is provided an image processing apparatus that performs signal processing of an image signal of a first color space standard and an image signal of a second color space standard having a wider color gamut than a color gamut specified by the first color space standard including detection means for detecting change points of the color space standards of the image signal, recording means for recording change point information in which the change points of the color space standards of the image signal and positions of the image signal are associated, and control means for controlling signal processing of the image signal based on the change point information.

According to another embodiment of the present invention, there is provided an image processing apparatus that processes and outputs an image signal of a first color space standard and an image signal of a second color space standard having a wider color gamut than a color gamut specified by the first color space standard including color gamut conversion processing means for converting the image signal of the first color space standard into an artificial wide color gamut signal by artificially expanding the color gamut thereof to the color gamut of the second color space standard, transmission means for transmitting the image signal including the artificial wide color gamut signal from the color gamut conversion processing means and color space information, and control means for exercising control so that, when the image signal in which the image signal of the first color space standard and the image signal of the second color space standard are mixed is transmitted, the image signal of the first color space standard is artificially expanded to a color gamut of the second color space standard by the color gamut conversion processing means and the artificial wide color gamut signal artificially expanded, the video signal of the second color space standard, and the color space information of the second color space standard are transmitted by the transmission means.

Here, an image signal in which an image signal of the first color space standard and that of the second color space standard are mixed can be shown to be an image signal in which the image signal of the first color space standard and the image signal of the second color space standard are temporally switched. Also, the color gamut conversion processing can be shown to artificially expand color signal components of the image signal of the first color space standard to the color gamut of the second color space standard by independently controlling a level conversion gain in a range equal to or below a predetermined threshold of a signal level and above the predetermined threshold and further, it is preferable to use, among the color signal components of the image signal of the first color space standard, signals in the range equal to or below the predetermined threshold of the signal level as they are and make level conversions of signals in the range above the predetermined threshold to expand to the color gamut of the second color space standard.

In such embodiments, regarding an image signal in which an image signal of the first color space standard and that of the second color space standard are mixed, the image signal of the first color space standard is artificially expanded to the color gamut of the second color space standard and color space information is fixed to that of the second color space standard before being transmitted together with the image signal.

According to the present invention, as described above, colors can be prevented from changing while being displayed on a TV receiver side because color space information of a combined image signal is fixed.

BRIEF DESCRIPTION OF THE DRAWINGS

FIG. 6 is a schematic diagram showing a relationship between a color space standard of a video signal and color space information of attribute data when an image based on one color space standard is output;

FIG. 7 is a schematic diagram showing Concrete Example 1 of a screen image, output video signal, and color space information when images are combined;

FIG. 8 is a schematic diagram showing Concrete Example 2 of a screen image, output video signal, and color space information when images are combined;

FIG. 9 is a schematic diagram showing Concrete Example 3 of a screen image, output video signal, and color space information when images are combined;

FIG. 10 is a schematic diagram showing Concrete Example 4 of a screen image, output video signal, and color space information when images are combined;

FIG. 11 is a schematic diagram showing Concrete Example 5 of a screen image, output video signal, and color space information when images are combined;

FIG. 12 is a schematic diagram showing Concrete Example 6 of a screen image, output video signal, and color space information when images are combined;

FIG. 13 is a schematic diagram showing Concrete Example 7 of a screen image, output video signal, and color space information when images are combined;

FIG. 14 is a schematic diagram showing Concrete Example 8 of a screen image, output video signal, and color space information when images are combined;

FIG. 15 is a schematic diagram showing Concrete Example 9 of a screen image, output video signal, and color space information when images are combined;

FIG. 16 is a schematic diagram showing Concrete Example 10 of a screen image, output video signal, and color space information when images are combined;

FIG. 17 is a schematic diagram showing Concrete Example 11 of a screen image, output video signal, and color space information when images are combined;

FIG. 18 is a schematic diagram showing Concrete Example 12 of a screen image, output video signal, and color space information when images are combined;

FIG. 19 is a schematic diagram showing Concrete Example 13 of a screen image, output video signal, and color space information when images are combined;

FIG. 20 is a schematic diagram showing Concrete Example 14 of a screen image, output video signal, and color space information when images are combined;

FIG. 21 is a schematic diagram showing Concrete Example 15 of a screen image, output video signal, and color space information when images are combined;

FIG. 22 is a schematic diagram showing Concrete Example 16 of a screen image, output video signal, and color space information when images are combined;

FIG. 23 is a block diagram showing another configuration of a combining processing unit;

FIG. 28 is a schematic diagram showing Concrete Example 17 of a screen image, output video signal, and color space information when images are combined;

FIG. 29 is a schematic diagram showing Concrete Example 18 of a screen image, output video signal, and color space information when images are combined;

FIG. 30 is a schematic diagram showing Concrete Example 19 of a screen image, output video signal, and color space information when images are combined;

FIG. 31 is a schematic diagram showing Concrete Example 20 of a screen image, output video signal, and color space information when images are combined;

FIG. 32 is a schematic diagram showing Concrete Example 21 of a screen image, output video signal, and color space information when images are combined;

FIG. 48 is a schematic diagram showing the relationship between the transmitted video signal and color space information;

FIG. 58 is a block diagram showing another example of the configuration of the video graphic processor;

FIG. 59 is a diagram exemplifying level changes when expansion processing of a Cr signal and a Cb signal is performed;

FIG. 61 is a timing chart exemplifying the color space information for an input/output signal and an output signal of the color expander.

DESCRIPTION OF REFERENCE NUMERALS

Figure 1:
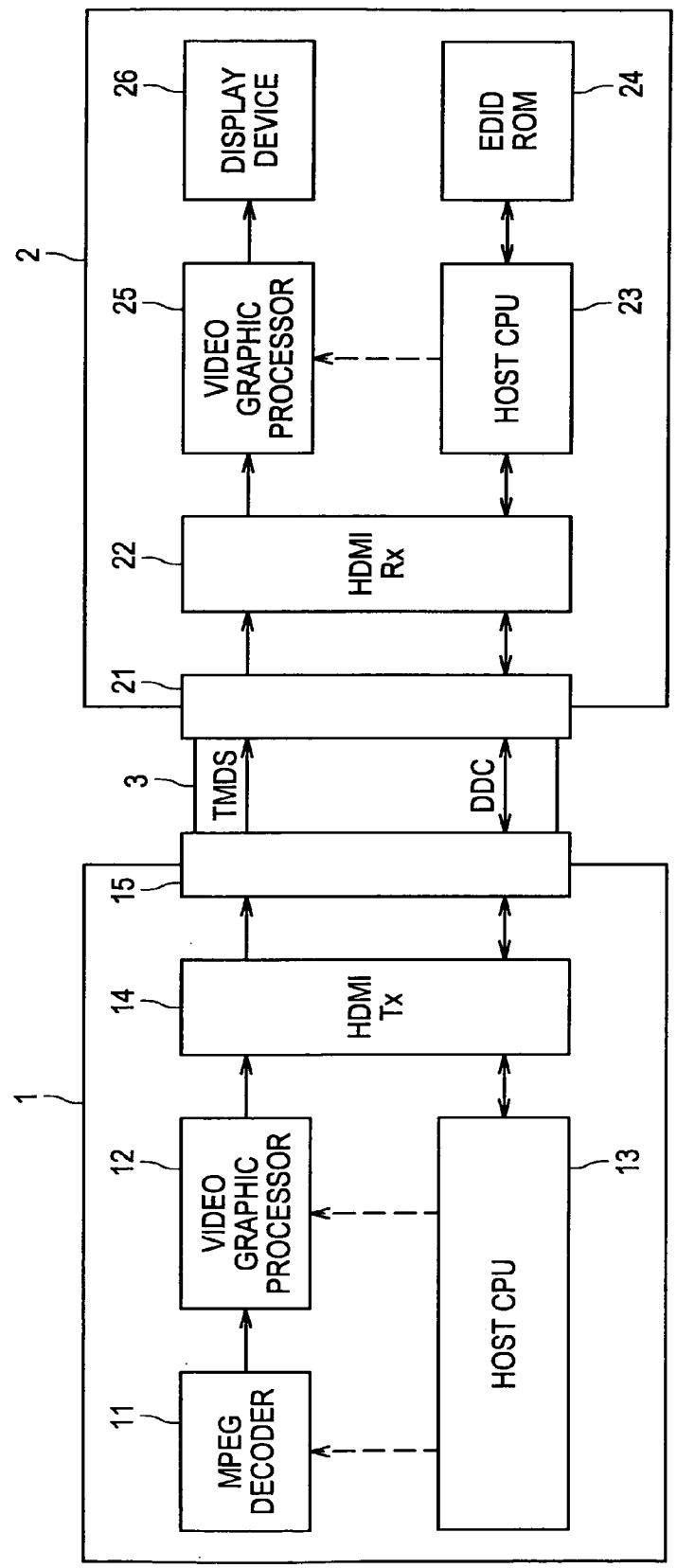
FIG. 1 is a diagram showing a reproduction system according to an embodiment of the present invention.

1: Recording and reproducing apparatus
2: TV receiver
3: HDMI cable
11: MPEG decoder
12: Video graphic processor
13: Host CPU
14: HDMI Tx
15: HDMI connector
21: HDMI connector
22: HDMI Rx
23: Host CPU
24: EDIDROM
25: Video graphic processor
26: Display device
41: Line input terminal
42: Analog tuner
43: Disk drive
44: Hard disk drive
45: IEEE 1394 input terminal
46: Digital tuner
47: Selector
48: Video decoder
49: Selector
50: MPEG encoder
51: HDV processor
52: Stream processor
53: MPEG decoder
54: Video graphic processor
55: HDMI Tx
56: DAC
57: HDMI connector
58: Component terminal
59: Composite terminal
60: Host CPU
309: Color expander

BEST MODE FOR CARRYING OUT THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First to sixth embodiments of the present invention will be described below in detail with reference to drawings.

First Embodiment

FIG. 1 is a diagram showing a reproduction system according to a first embodiment of the present invention. In the reproduction system, a recording and reproducing apparatus 1 and a TV receiver 2 are connected via an HDMI (High-Definition Multimedia Interface) cable 3 and the TV receiver 2 is capable of displaying image data of a first color space standard by artificially expanding the color gamut thereof to that of image data of a second color space standard, which has a color gamut wider than that specified by the first color space standard. Examples of the first color space standard include sRGB (IEC61966-2-1) and ITU-R BT.709. Examples of the second color space standard include xvYCC.

The xvYCC is a standard issued by IEC (International Electrotechnical Commission) as an international standard (IEC 61966-2-4) and broadens the color space while ensuring compatibility with the color gamut of ITU-R BT. 709 (equivalent to sRGB) used by HDTV (High Definition TeleVision). According to the xvYCC, colors that is difficult for the current color space standard "ITU-R BT.709" (equivalent to sRGB for still images) of animation content can be represented.

Figure 2:
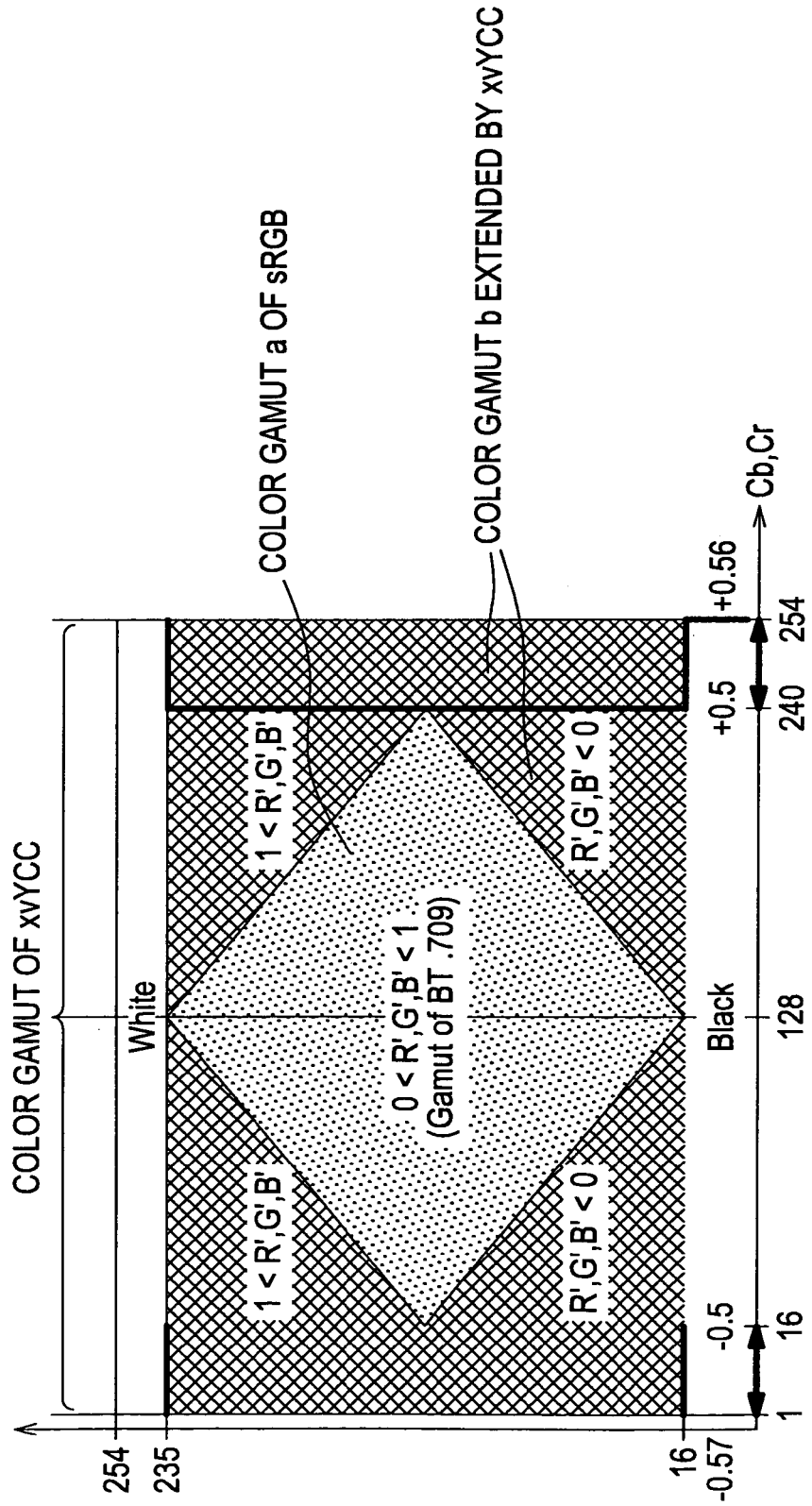
FIG. 2 is a schematic diagram when a color gamut of xvYCC is projected onto a plane.

FIG. 2 is a schematic diagram when the color gamut of the xvYCC is projected onto a plane. In FIG. 2, a color gamut a is a color gamut of sRGB and a color gamut b is a color gamut expanded by xvYCC. As shown in FIG. 2, while only colors in which R, G, and B are each represented by 0 to 1 are used in sRGB, colors that take negative values or values exceeding 1 are also defined for xvYCC. Therefore, for example, if the TV receiver 2 truly reproduces a material feeling/sense of perspective of a body by performing processing to expand the color gamut a of sRGB to the color gamut b of video content (hereinafter, called "color gamut expansion processing"), the user can enjoy color images of wide color gamut.

HDMI, which is the standard of the HDMI cable 3, is set to be upwardly compatible with IEEE 1394 and adopts TMDS (Transition Minimized Differential Signaling) for the physical layer, HDCP (High-bandwidth Digital Content Protection) for signal encryption, EDID (Extended Display Identification Data) for authentication between devices, and CEC (Consumer Electronics Control) for control system connection of the whole system. Moreover, definitions of metadata and the xvYCC color space are added to the HDMI version 1.3. Therefore, for example, if the TV receiver 2 performs color gamut expansion processing on image data based on metadata received from the recording and reproducing apparatus 1 and color gamut information of the TV receiver 2, more specifically, a gamut mapping algorithm of color space between devices on image data, correct colors can be reproduced.

The configuration of the reproduction system will be described by returning to FIG. 1. The recording and reproducing apparatus 1 includes an MPEG (Moving Picture Expert Group) decoder 11, a video graphic processor 12, a host CPU (Central Processing Unit) 13, an HDMI Tx (transmitter) 14, and an HDMI connector 15.

The MPEG decoder 11 decodes a video stream of MPEG1, MPEG2, MPEG4, MPEG4-AVC/H.264 or the like to generate a baseband signal.

The video graphic processor 12 performs conversion processing of the baseband signal generated by the MPEG decoder 11 to a desired image frame size or combining processing of a plurality of baseband signals.

The host CPU 13 controls the MPEG decoder 11 and the video graphic processor 12. For example, the host CPU 13 provides instructions to the MPEG decoder 11 to decode a desired data stream or instructions to the video graphic processor 12 to generate a combined image using decoded baseband signals. The host CPU 13 also determines a color space standard of a combined image and sends color space information thereof to the HDMI Tx 14. Moreover, the host CPU 13 performs communication with the TV receiver 2 via a DDC (Display Data Channel) line of the HDMI cable 3.

The HDMI Tx 14 converts attribute data such as a color gamut identification flag indicating the color space standard and metadata sent from the host CPU 13 together with a video/audio signal signal-processed by the video graphic processor 12 into a TMDS signal, which is output to the HDMI connector 15. The attribute data can be transmitted by using AVI (Auxiliary Video Information) InfoFrame defined by the HDMI standard.

The HDMI connector 15 is connected to the HDMI cable 3 to transmit a TMDS signal converted by the HDMI Tx 14 to the TV receiver 2.

Next, the configuration of the TV receiver 2 will be described. The TV receiver 2 includes an HDMI connector 21, an HDMI Rx (receiver) 22, a host CPU 23, an EDIDROM (Extended Display Identification Data Read Only Memory) 24, a video graphic processor 25, and a display device 26.

The HDMI connector 21 is connected to the HDMI cable 3 to receive a TMDS signal.

The HDMI Rx 22 acquires a video/audio signal and attribute data from the TMDS signal to send the video/audio signal to the video graphic processor 25.

The host CPU 23 controls on/off of color gamut expansion processing of the video graphic processor 25 based on attribute data. More specifically, if, for example, the color space information of attribute data is ITU-R BT.709, the host CPU 23 turns on color gamut expansion processing of the video graphic processor 25 and if the color space information of attribute data is xvYCC, the host CPU 23 turns off color gamut expansion processing of the video graphic processor 25.

The EDIDROM 24 has display information of the TV receiver 2 stored therein and has, for example, compatible resolution information of the TV receiver 2 and color space information indicating the type of color gamut written thereto. The display information stored in the EDIDROM 24 is provided to the recording and reproducing apparatus 1 via the DDC (Display Data Channel) line of the HDMI cable 3.

Figure 3:
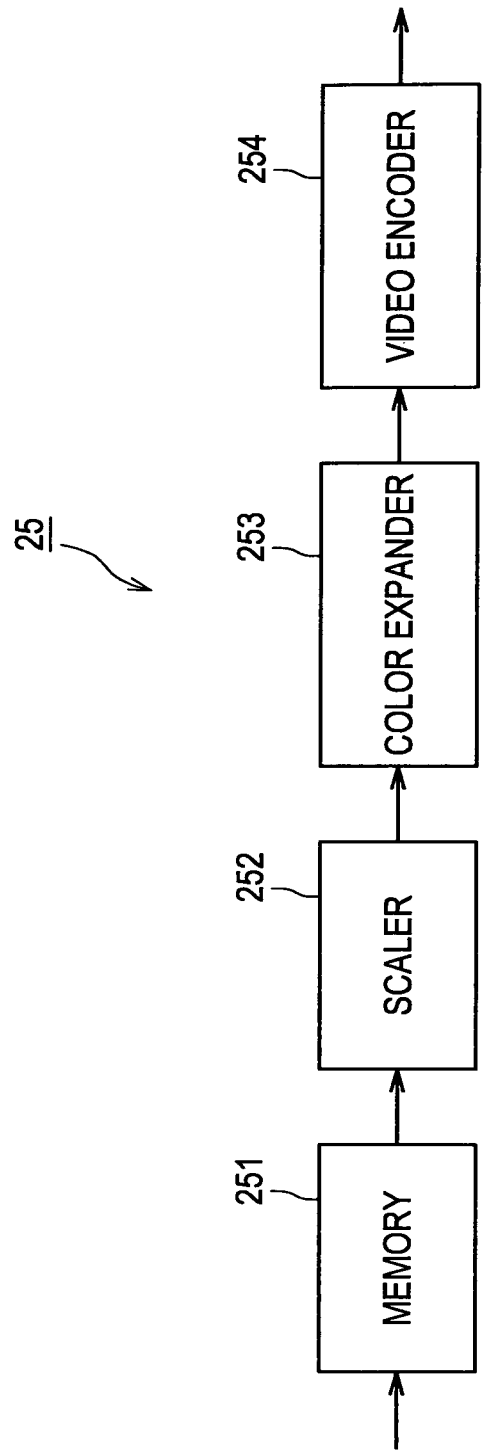
FIG. 3 is a block diagram showing a configuration of a video graphic processor.

FIG. 3 is a block diagram showing the configuration of the video graphic processor 25. The video graphic processor 25 includes a memory 251, a scaler 252, a color expander 253, and a video encoder 254. A video signal input from the HDMI Rx 22 is written to a video plane of the memory 251. The video signal written to the memory 251 is read from each plane and scaled to a desired size by the scaler 252. Moreover, color gamut expansion processing is performed by the color expander 253 in accordance with instructions from the host CPU 23. The color expander 253 artificially expands, for example, a video signal of BT.709 to the color gamut of video signal of xvYCC. If color gamut expansion processing is performed on a video signal of xvYCC, the color gamut of video signals of xvYCC is matched to that of the video signal whose color gamut is artificially expanded. The video encoder 254 generates timing or adds a synchronization signal so that desired output specifications are achieved.

The display device 26 has a wide color gamut panel and displays a screen signal-processed by the video graphic processor 25.

Thus, the TV receiver 2 can truly reproduce bodies in the screen in the color space of the wide color gamut by turning on/off color gamut expansion processing in accordance with attribute data received together with a video/audio signal.

Incidentally, the TV receiver 2 switches color gamut expansion processing according to the color space information in such a reproduction system and if, for example, the recording and reproducing apparatus 1 blends animation images/still images with the background of graphics of a fixed color and changes the color space information according to attributes of the animation images/still images in the background, the color of graphics that should be a fixed color may change in the TV receiver 2 while being displayed. Hereinafter, a method of preventing such a problem will be described.

Figure 4:
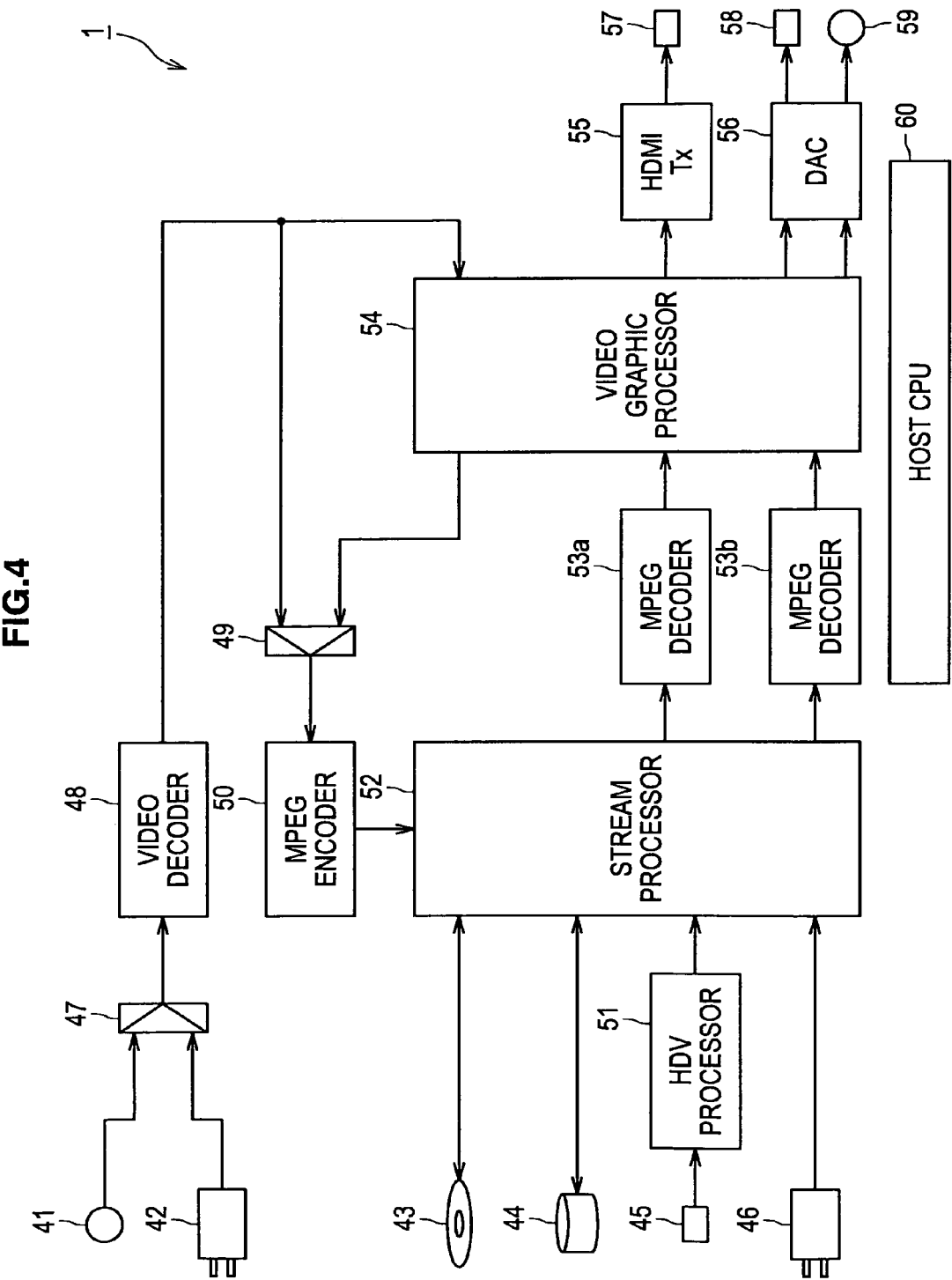
FIG. 4 is a block diagram concretely showing the configuration of a recording and reproducing apparatus.

FIG. 4 is a block diagram concretely showing the configuration of the recording and reproducing apparatus 1. The recording and reproducing apparatus 1 includes a line input terminal 41, an analog tuner 42, a disk drive 43, a hard disk drive 44, an IEEE 1394 terminal 45, a digital tuner 46, a selector 47 that selects one of input signals from the line input terminal 41 and the analog tuner 42, a video decoder 48 that decodes a video-audio signal from the selector 47, a selector 49 that selects one of a baseband signal decoded by the video decoder 48 and a baseband signal on which signal processing such as image combining is performed by a video graphic processor 54, an MPEG encoder 50 that encodes the baseband signal from the selector 49, an HDV (High-Definition Video) processor 51, a stream processor 52, MPEG decoders 53a and 53b, a video graphic processor 54, an HDMI Tx 55, a DAC 56, an HDMI connector 57, a component terminal 58, a composite terminal 59, and a host CPU 60.

The MPEG decoders 53a and 53b, the video graphic processor 54, the HDMI Tx 55, the HDMI connector 57, and the host CPU 60 correspond to the MPEG decoder 11, the video graphic processor 12, the HDMI Tx 14, the HDMI connector 15, and the host CPU 13 respectively.

Subsequently, a recording operation by the recording and reproducing apparatus 1 will be described. A desired input is selected from a video signal output from the line input terminal 41 and a video signal output from the analog tuner 42 by the selector 47 and then input to the video decoder 48. For example, the video decoder 48 A/D-converts an input analog video signal in the NTSC color system and then separates the signal into a luminance signal and a chroma signal and also performs decode processing. A decoded baseband video signal is input to the selector 49 and the video graphic processor 54. After an output from the video decoder 48 or an output from the video graphic processor 54 being selected by the selector 49, the selected baseband signal is input to the MPEG encoder 50. The MPEG encoder 50 performs desired encoding such as MPEG1, MPEG2, MPEG4, MPEG4-AVC/H.264 or the like. An encoded stream is input to the stream processor 52. A stream is sent to the disk drive 43, the hard disk drive 44 of BD (Blu-ray Disc, trademark), DVD (Digital Versatile Disc) or the like from the stream processor 52 before being recorded on a desired disk.

A stream input from the IEEE 1394 input terminal 45 is input to the stream processor 52 via the HDV processor 51 and also a stream from the digital tuner 46 is input to the stream processor 52. The stream input to the stream processor 52 is recorded on a desired medium of the disk drive 43 or the hard disk drive 44 of BD, DVD or the like.

Processing such as extraction of a desired video stream and parsing is performed on the stream input to the stream processor 52 and decoding by the MPEG decoders 53 is performed thereon and then, the stream is input to the MPEG encoder 50 via the video graphic processor 54 and the selector 49. The MPEG encoder 50 performs desired encoding such as MPEG1, MPEG2, MPEG4, and MPEG4-AVC/H.264 and the encoded stream is input to the stream processor 52. The stream is sent from the stream processor 52 to the disk drive 43 or the hard disk drive 44 of BD, DVD or the like before being recorded on a desired disk.

Next, a reproduction operation by the recording and reproducing apparatus 1 will be described. A stream reproduced by the disk drive 43 or the hard disk drive 44 of BD, DVD or the like is input to the stream processor 52. The stream processor 52 extracts a desired video stream or parses information about color space attributes of image data from the stream and then sends video data to the MPEG decoders 53a and 53b. The MPEG decoders 53a and 53b decodes the video data. The baseband video signal decoded by the MPEG decoders 53a and 53b is input to the video graphic processor 54. The video graphic processor 54 performs conversion processing to a desired image frame size or various kinds of video signal processing and combines a graphic signal or the like with the video signal and then sends the baseband signal to the HDMI Tx 55. The HDMI Tx 55 converts the input baseband signal into a TMDS signal and outputs the TMDS signal to the HDMI connector 57 together with a control signal. An output of the video graphic processor 54 is input to the DAC 56 and a D/A converted analog component signal is output to the component terminal 58 and also a D/A converted analog composite video signal (or a Y/C separate video signal) is output to the composite video terminal (or an S terminal) 59.

Next, a transmission operation by the recording and reproducing apparatus 1 will be described with reference to FIGS. 1 to 4. It is assumed here that a stream reproduced by the disk drive 43 or the hard disk drive 44 of BD, DVD or the like contains an identification flag to identify the type of color gamut and metadata, which is attached information of the color gamut, as well as a wide color gamut video signal.

A stream containing a reproduced video/audio signal and metadata such as the identification flag is input to the stream processor 52. The stream processor 52 parses the stream to extract the identification flag and metadata and the host CPU 60 acquires metadata such as the identification flag of the stream from the stream processor 52. Since the identification flag and metadata are recorded as attached information of an elementary stream, synchronization thereof with a video signal is typically maintained. As described in the above description of the reproduction system, a stream containing a wide color gamut signal is decoded by the MPEG decoders 53a and 53b and then sent to the HDMI Tx 55 via the video graphic processor 54.

The host CPU 60 performs communication with the TV receiver 2 through a DDC (Display Data Channel) line of the HDMI cable 3 connected to the HDMI connector 57 to acquire display information written to the EDID (Extended Display Identification Data) ROM 24 via the HDMI Rx (receiver) 22 and the host CPU 23 contained in the TV receiver 2. The EDID ROM 24 has color space information indicating the type of color gamut written thereto, in addition to compatible resolution information of the TV receiver 2 and the like. Therefore, the host CPU 60 can determine whether the connected TV receiver 2 supports a wide color gamut video signal by acquiring display information. If the TV receiver 2 connected by the HDMI cable 3 supports a wide color gamut video signal, the host CPU 60 can set the color gamut identification flag and metadata acquired from a disk to the HDMI Tx 55 as attributes of a video signal when the wide color gamut video signal is transmitted.

As will be described later, the host CPU 60 acquires metadata of each image combined by the video graphic processor 54 to change the color gamut identification flag set to the HDMI Tx 55 to a desired value. More specifically, the color gamut identification flag to be set to the HDMI Tx 55 is determined based on the color space standard of each image to be combined and that before image combining.

The HDMI Tx 55 converts attribute data such as the color gamut identification flag and metadata into a TMDS signal together with a video/audio signal, which is output from the HDMI connector 57. The identification flag indicating the type of color gamut and metadata can be transmitted by using AVI (Auxiliary Video Information) InfoFrame defined by the HDMI standard. For example, the color gamut identification flag is defined by Colorimetry or Extended Colorimetry in an AVI InfoFrame packet. Audio InfoFrame can be used for attribute data of an audio signal.

Figure 5:
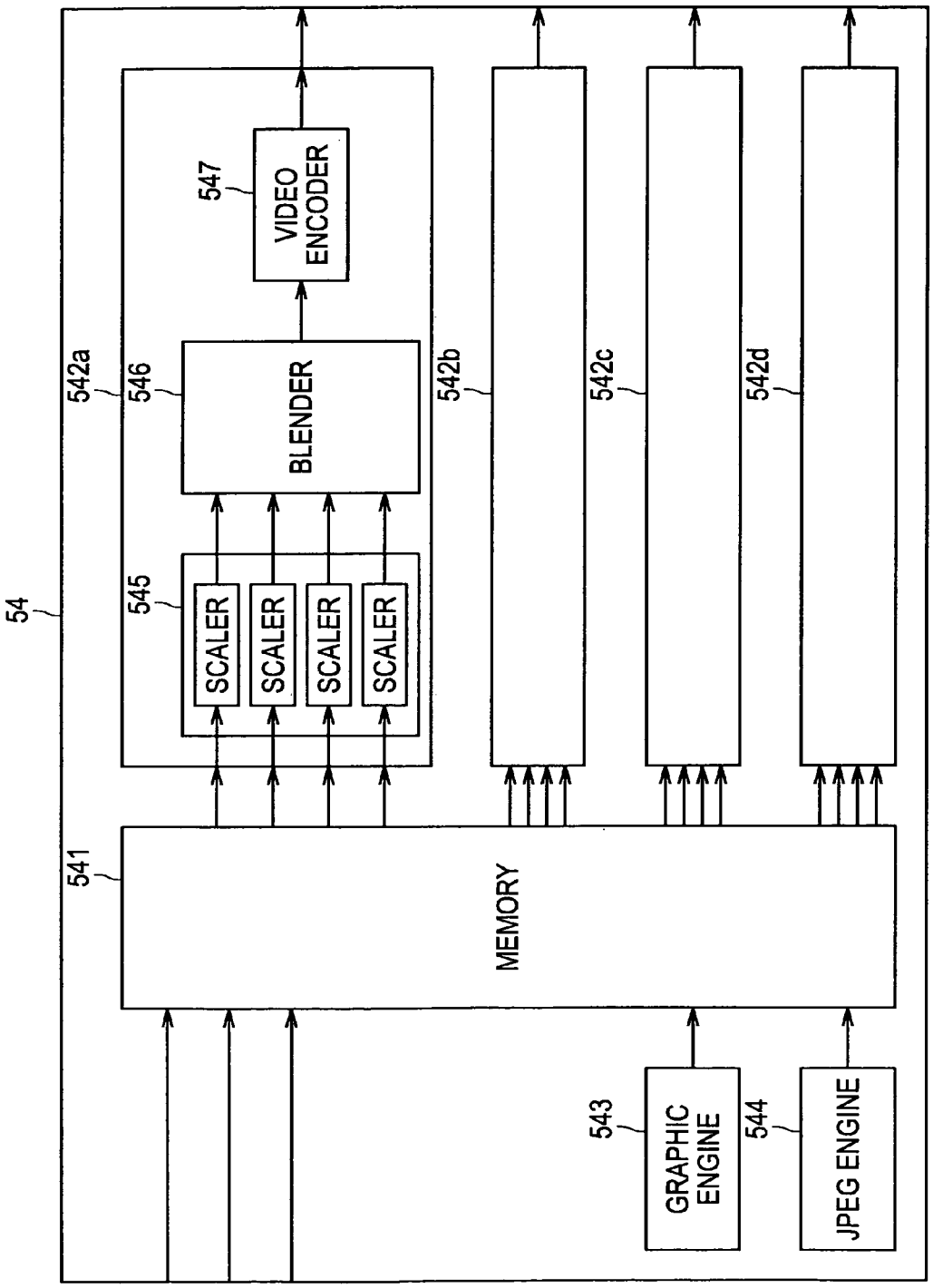
FIG. 5 is a functional block diagram of the video graphic processor when images are combined.

FIG. 5 is a functional block diagram of the video graphic processor 54 when images are combined. The video graphic processor 54 includes a memory 541, combining processing units 542a to 542d, a graphic engine 543, and a JPEG engine 544. The combining processing units 542a to 542d are prepared for each output format and each provided with a scaler 545, a blender 546, and a video encoder 547.

An output of the video decoder 48 and outputs of the MPEG decoders 53a and 53b are written to a video plane of the memory 541. The graphic engine 543 writes graphic data to a graphic plane of the memory 541. The JPEG engine 544 decodes a JPEG file and writes JPEG data to the video plane of the memory 541. Image data written to the memory 541 is read from each plane and scaled to a desired size by the scaler 545 before being sent to the blender 546. The blender 546 combines images read from each plane. The video encoder 547 generates timing or adds a synchronization signal to achieve desired output specifications.

The operation of the host CPU 60 when image combining processing is performed will be described below by showing concrete examples. BT.709 is cited as a concrete color space standard and xvYCC (xvYCC709) as a color space having a wider color gamut than BT.709 for the description that follows.

FIG. 6 is a schematic diagram showing a relationship between the color space standard of a video signal and color space information of attribute data when images are not combined, that is, an image based on one color space standard is output. When the color space standard of the video signal is switched from BT.709 to xvYCC at time t0, the host CPU 60 switches the color gamut identification flag set to the HDMI Tx 55 from BT.709 to xvYCC in synchronization with the color space standard of the video signal. When the color space standard of the video signal is switched from xvYCC to BT.709 at time t1, the host CPU 60 switches the color gamut identification flag set to the HDMI Tx 55 from BT.709 to xvYCC709 in synchronization with the color space standard of the video signal.

FIGS. 7 to 10 are schematic diagrams showing Concrete Example 1 to Concrete Example 4 of screen images, output video signals, and color space information when screens are combined. These concrete examples output a video signal of a combined screen obtained by combining three images of an image a, image b, and image c. The color space standard of an image changes at time t0 and time t1 and the color space standard of a video image to be output also changes accompanying the change. In these cases, the host CPU 60 fixes and outputs the color space information.

In Concrete Example 1 shown in FIG. 7, a video signal of a combined screen obtained by combining three images of the image a in BT.709, the image b in BT.709, and the image c in xvYCC is output before time t0. Then, the color space standard of the video signal of the image a is switched from BT.709 to xvYCC at time t0 and the color space standard of the video signal of the image a is switched from xvYCC to BT.709 at time t1. In Concrete Example 1, the host CPU 60 typically fixes the color gamut identification flag set to the HDMI Tx 55 to xvYCC709, regardless of the color space standard of images to be combined. Since color space information is typically fixed to xvYCC709 in Concrete Example 1, the color of the image c having a larger area does not change and also the images a and b of child screens are affected only slightly so that the change of color of the whole combined image can be reduced to a minimum.

In Concrete Example 2 shown in FIG. 8, a video signal of a combined screen obtained by combining three images of the image a in BT.709, the image b in BT.709, and the image c in BT.709 is output before time t0. Then, the color space standard of the video signal of the image a is switched from BT.709 to xvYCC at time t0 and the color space standard of the video signal of the image a is switched from xvYCC to BT.709 at time t1. In Concrete Example 2, the host CPU 60 typically fixes the color gamut identification flag set to the HDMI Tx 55 to xvYCC709, regardless of the color space standard of images to be combined. Since color space information is typically fixed to xvYCC709 in Concrete Example 2, the color of the image c having a larger area does not change and also the images a and b of child screens are affected only slightly so that the change of color of the whole combined image can be reduced to a minimum.

In Concrete Example 3 shown in FIG. 9, a video signal of a combined screen obtained by combining three images of the image a in BT.709, the image b in BT.709, and the image c in xvYCC is output before time t0. Then, the color space standard of the video signal of the image a is switched from BT.709 to xvYCC at time t0 and the color space standard of the video signal of the image a is switched from xvYCC to BT.709 at time t1. In Concrete Example 3, the host CPU 60 typically fixes the color gamut identification flag set to the HDMI Tx 55 to BT.709, regardless of the color space standard of images to be combined. Since color space information is typically fixed to BT.709 in Concrete Example 3, the color of the image c having a larger area does not change and also the images a and b of child screens are affected only slightly so that the change of color of the whole combined image can be reduced to a minimum.

In Concrete Example 4 shown in FIG. 10, a video signal of a combined screen obtained by combining three images of the image a in BT.709, the image b in BT.709, and the image c in BT.709 is output before time t0. Then, the color space standard of the video signal of the image a is switched from BT.709 to xvYCC at time t0 and the color space standard of the video signal of the image a is switched from xvYCC to BT.709 at time t1. In Concrete Example 4, the host CPU 60 typically fixes the color gamut identification flag set to the HDMI Tx 55 to BT.709, regardless of the color space standard of images to be combined. Since color space information is typically fixed to BT.709 in Concrete Example 4, the color of the image c having a larger area does not change and also the images a and b of child screens are affected only slightly so that the change of color of the whole combined image can be reduced to a minimum.

Thus, regardless of the color space standard of images to be combined, the color being displayed can be prevented from changing when images are combined by setting the color gamut identification flag of one color space standard to the HDMI Tx 55.

It is preferable to make the color space standard when a combined screen is output selectable by the user. For example, switching of "Wide color gamut setting"="Auto/Off" is made settable by the user. For the Auto setting, color space information of xvYCC709 is output only if a video signal output from the recording and reproducing apparatus 1 acting as a source is a wide color gamut and the TV receiver 2 acting as a sink is an apparatus compatible with the wide color gamut and, for the OFF setting, the color space information is fixed to BT.709 and output.

In addition, for example, switching of "Wide color gamut setting"="On/Off" is made settable by the user. For the On setting, if the TV receiver 2 is an apparatus compatible with the wide color gamut, the color space information is fixed to xvYCC709 and transmitted and, for the OFF setting, the color space information is fixed to BT.709 and output.

Whether the TV receiver 2 acting as a sink is compatible with the wide color gamut can be detected by acquiring display information written in the EDID ROM 24 of the TV receiver 2.

FIGS. 11 to 15 are schematic diagrams showing Concrete Example 5 to Concrete Example 9 of screen images, output video signals, and color space information when screens are combined. In these concrete examples, a video signal of a screen obtained by combining three images of the image a, the image b, and the image c is output at time t0. Also, the color space standard of the video signal of the image a changes at time t1. In these cases, the host CPU 60 fixes color space information to one at previous time and outputs the fixed color space information.

In Concrete Example 5 shown in FIG. 11, a video signal of a screen in xvYCC is output prior to time t0. Then, a video signal of a combined screen obtained by combining three images of the image a in xvYCC, the image b in BT.709, and the image c in xvYCC is output at time t0 and the color space standard of the video signal of the image a is switched from xvYCC to BT.709 at time t1. In Concrete Example 5, the host CPU 60 fixes the color gamut identification flag set to the HDMI Tx 55 to xvYCC709 of the video signal output prior to the video signal of the combined screen and outputs the fixed flag. If, for example, the title of the image prior to t0 and that of the image c is the same and the color space standard of video signals is also the same in Concrete Example 5, the combined screen at time t0 and thereafter can be caused to display without a sense of discomfort.

In Concrete Example 6 shown in FIG. 12, a video signal of a screen in BT.709 is output prior to time t0. Then, a video signal of a combined screen obtained by combining three images of the image a in xvYCC, the image b in BT.709, and the image c in xvYCC is output at time t0 and the color space standard of the video signal of the image a is switched from xvYCC to BT.709 at time t1. In Concrete Example 6, the host CPU 60 fixes the color gamut identification flag set to the HDMI Tx 55 to BT.709 of the video signal output prior to the video signal of the combined screen and outputs the fixed flag. If, for example, the title of the image prior to t0 and that of the image b is the same and the color space standard of video signals is also the same in Concrete Example 6, the combined screen at time t0 and thereafter can be caused to display without a sense of discomfort.

In Concrete Example 7 shown in FIG. 13, a video signal of a screen in xvYCC is output prior to time t0. Then, a video signal of a combined screen obtained by combining three images of the image a in xvYCC, the image b in BT.709, and the image c in BT.709 is output at time t0 and the color space standard of the video signal of the image a is switched from xvYCC to BT.709 at time t1. In Concrete Example 7, the host CPU 60 fixes the color gamut identification flag set to the HDMI Tx 55 to xvYCC709 of the video signal output prior to the video signal of the combined screen and outputs the fixed flag. If, for example, the title of the image prior to t0 and that of the image a is the same and the color space standard of video signals is also the same in Concrete Example 7, the combined screen at time t0 and thereafter can be caused to display without a sense of discomfort.

In Concrete Example 8 shown in FIG. 14, a video signal of a screen in BT.709 is output prior to time t0. Then, a video signal of a combined screen obtained by combining three images of the image a in xvYCC, the image b in BT.709, and the image c in BT.709 is output at time t0 and the color space standard of the video signal of the image a is switched from xvYCC to BT.709 at time t1. In Concrete Example 8, the host CPU 60 fixes the color gamut identification flag set to the HDMI Tx 55 to BT.709 of the video signal output prior to the video signal of the combined screen and outputs the fixed flag. If, for example, the title of the image prior to t0 and that of the image c is the same and the color space standard of video signals is also the same in Concrete Example 8, the combined screen at time t0 and thereafter can be caused to display without a sense of discomfort.

In Concrete Example 9 shown in FIG. 15, a video signal of a screen in xvYCC is output prior to time t0. Then, a video signal of a combined screen obtained by combining two images of the image a in xvYCC and the image b in BT.709 is output at time t0 and the area of the screen of the image a is changed at time t1. In Concrete Example 9, the host CPU 60 fixes the color gamut identification flag set to the HDMI Tx 55 to xvYCC709 of the video signal output prior to the video signal of the combined screen and outputs the fixed flag. If, for example, the title of the image prior to t0 and that of the image a is the same and the color space standard of video signals is also the same in Concrete Example 9, the combined screen at time t0 and thereafter can be caused to display without a sense of discomfort.

Thus, the color being displayed can be prevented from changing when images are combined by retaining the state of color space information immediately before combining the screen also after the transition to a screen combining mode.

FIGS. 16 and 17 are schematic diagrams showing Concrete Example 10 and Concrete Example 11 of screen images, output video signals, and color space information when screens are combined. In these concrete examples, a video signal of a screen obtained by combining three images of the image a, the image b, and the image c is output at time t0. Also, the color space standard of the video signal of the image a changes at time t1. In these cases, the host CPU 60 matches color space information to the color space standard of the largest image in area or size (angle of view). The size of each image in the combined screen can be detected by acquiring information from the scaler 545 of the video graphic processor 54.

In Concrete Example 10 shown in FIG. 16, a video signal of a screen in BT.709 is output prior to time t0. Then, a video signal of a combined screen obtained by combining three images of the image a in xvYCC, the image b in BT.709, and the image c in xvYCC is output at time t0 and the color space standard of the video signal of the image a is switched from xvYCC to BT.709 at time t1. In Concrete Example 10, the host CPU 60 switches the color gamut identification flag set to the HDMI Tx 55 to xvYCC709 of the video signal having the largest area among images that constitute the combined screen and outputs the color gamut identification flag. More specifically, the host CPU 60 determines that the image a and the image c in xvYCC scaled to desired sizes by the scaler 545 of the video graphic processor 54 are larger than the image b in BT.709 at time t0 and sets xvYCC709 to the HDMI Tx 55. The host CPU 60 also determines that the image c in xvYCC scaled to a desired size by the scaler 545 of the video graphic processor 54 is larger than the image a and the image b in BT.709 at time t1 and sets xvYCC709 to the HDMI Tx 55.

In Concrete Example 11 shown in FIG. 17, a video signal of a screen in xvYCC is output prior to time t0. Then, a video signal of a combined screen obtained by combining three images of the image a in xvYCC, the image b in BT.709, and the image c in BT.709 is output at time t0 and the color space standard of the video signal of the image a is switched from xvYCC to BT.709 at time t1. In Concrete Example 11, the host CPU 60 switches the color gamut identification flag set to the HDMI Tx 55 to BT.709 of the video signal having the largest area among images that constitute the combined screen and outputs the color gamut identification flag. More specifically, the host CPU 60 determines that the image b and the image c in BT.709 scaled to desired sizes by the scaler 545 of the video graphic processor 54 are larger than the image a in xvYCC at time t0 and sets BT.709 to the HDMI Tx 55. At time t1, the host CPU 60 sets BT.709 to the HDMI Tx 55 because all images are in BT.709.

Thus, by following the color space information of video having the largest size or display area in a combined screen, annoyance while the combined screen is displayed can be prevented because locations where the color changes while being displayed are reduced if screens are combined.

FIGS. 18 and 19 are schematic diagrams showing Concrete Example 12 and Concrete Example 13 of screen images, output video signals, and color space information when screens are combined. In these concrete examples, a video signal of a screen obtained by combining two images of the image a and the image b having the same size is output at time t0. Also, the color space standard of the video signal of the image a changes at time t1. In these cases, if images have the same size, the host CPU 60 switches color space information to one at previous time and then outputs the color space information.

In Concrete Example 12 shown in FIG. 18, a video signal of a screen in xvYCC is output prior to time t0. Then, a video signal of a combined screen obtained by combining two images of the image a in xvYCC and the image b in BT.709 is output at time t0 and the color space standard of the video signal of the image a is switched from xvYCC to BT.709 at time t1. The host CPU 60 determines that the image a in xvYCC scaled to a desired size by the scaler 545 of the video graphic processor 54 and the image b in BT.709 have the same size at time t0 and sets xvYCC709 of the color space information prior to time t0 to the HDMI Tx 55. At time t1, the host CPU 60 sets the identification flag of BT.709 to the HDMI Tx 55 because all images are in BT.709.

In Concrete Example 13 shown in FIG. 19, a video signal in which two images of the image a in xvYCC and the image b in BT.709 are combined is output prior to time t0. Then, two images of the image a in xvYCC and the image b in BT.709 become equal in size at time t0 and the color space standard of the video signal of the image a is switched from xvYCC to BT.709 at time t1. The host CPU 60 determines that the image a in xvYCC scaled to a desired size by the scaler 545 of the video graphic processor 54 and the image b in BT.709 have the same size at time t0 and sets xvYCC709 of the color space information prior to time t0 to the HDMI Tx 55. At time t1, the host CPU 60 sets the identification flag of BT.709 to the HDMI Tx 55 because all images are in BT.709.

Thus, if screens are equal in size or display area in a combined screen, annoyance while the combined screen is displayed can be prevented by retaining the color space information immediately before because the frequency with which the color changes while being displayed is thereby decreased when screens are combined.

FIGS. 20 and 21 are schematic diagrams showing Concrete Example 14 and Concrete Example 15 of screen images, output video signals, and color space information when screens are combined. In these concrete examples, the sizes of the combined image a and image b are reversed at times t0 and t1. In these cases, the host CPU 60 determines whether to switch the color space information in accordance with the period between time t0 and time t1. More specifically, if the switching period from time t0 to time t1 can be detected such as when switching of the screen size to be combined is controlled by a program, the detected period and a threshold is compared to determine whether to switch the color space information.

As a detection method of the switching period, information retained in the hard disk drive 44 or the like as a database and in which color space attributes of image data constituting a title are recorded as meta-information can be used. More specifically, a necessary time for the next switching of the color space standard to occur, that is, the period from time t0 to time t1 can be derived from information about the current reproduction time and meta-information of the title. Also, an interval in which color space attributes of video signal are frequently switched may be detected in advance from meta-information of the title so that color space attributes are not switched in a frequently switched interval.

In Concrete Example 14 shown in FIG. 20, a video signal in which two images of the image a in xvYCC and the image b in BT.709 are combined is output prior to time t0. Then, the image a in xvYCC becomes smaller than the image b in BT.709 at time t0 and the image a in xvYCC becomes larger than the image b in BT.709 at time t1. Here, the host CPU 60 compares the detected period and the threshold and determines that the detected period is larger the threshold. Then, at time t0, the host CPU 60 compares the image a in xvYCC scaled to a desired size by the scaler 545 of the video graphic processor 54 and the image b in BT.709 in size and sets the color space information BT.709 of the larger image b in size (area) to the HDMI Tx 55. Also, at time t1, the host CPU 60 compares the image a in xvYCC scaled to a desired size by the scaler 545 of the video graphic processor 54 and the image b in BT.709 in size and sets the color space information xvYCC709 of the larger image b in size (area) to the HDMI Tx 55.

In Concrete Example 15 shown in FIG. 21, a video signal in which two images of the image a in xvYCC and the image b in BT.709 are combined is output prior to time t0. Then, the image a in xvYCC becomes smaller than the image b in BT.709 at time t0 and the image a in xvYCC becomes larger than the image b in BT.709 at time t1. Here, the host CPU 60 compares the detected period and the threshold and determines that the detected period is smaller the threshold. Then, at time t0, the host CPU 60 retains the state of color space information prior to time t0 and sets xvYCC709 to the HDMI Tx 55. Also at time t1, the host CPU 60 compares the image a in xvYCC scaled to a desired size by the scaler 545 of the video graphic processor 54 and the image b in BT.709 in size and sets the color space information xvYCC709 of the larger image a in size (area) to the HDMI Tx 55.

Thus, if the size or display area of a combined screen changes in a short period, annoyance while the combined screen is displayed can be prevented by retaining the color space information immediately before because the frequency with which the color changes while being displayed is thereby decreased.

If the period from time t0 to time t1 is not detected in advance, control may be exercised whether to switch the color space information by counting the time after switching of the color space occurs and determining, when the color space is switched next time, whether the counted predetermined time is larger than the threshold.

FIG. 22 is a schematic diagram showing Concrete Example 16 of screen images, output video signals, and color space information when screens are combined. In this concrete example, a video signal of a combined screen obtained by combining three images of the image a, the image b, and the image c is output at time t0 and the color space standard of the video signal of the image a is switched from xvYCC to BT.709 at time t1. Also, a sound signal of the image a is output at time t0 and a sound signal of the image b is output at time t1. In this case, the host CPU 60 outputs color space information of the image whose sound signal is output. More specifically, the host CPU 60 selects a video signal of the main image of a plurality of video signals combined by the video graphic processor 54 and sets the sound signal of the video signal to the HDMI Tx 55. It is also preferable to make the main image selectable by the user.

By selecting a screen whose sound is output as a main screen and following color space information of video of the main screen, colors of images on which the user focus can be reproduced more vividly.

Next, another configuration example of the recording and reproducing apparatus 1 will be described with reference to FIGS. 23 to 25. FIG. 23 is a block diagram showing another configuration of the combining processing unit. The same reference numerals are attached to the same components as those of the combining processing unit 542 shown in FIG. 5 and a description thereof is omitted. In addition to the function of the combining processing unit 542 shown in FIG. 5, this combining processing unit 70 can artificially expand (color gamut expansion processing) the color gamut of sRGB to that of xvYCC. The combining processing unit 70 can also change the blend ratio of a plurality of images.

The combining processing unit 70 includes the scaler 545, a color expander 71 performing color gamut expansion processing, the blender 546, and the video encoder 547.

Figure 24:
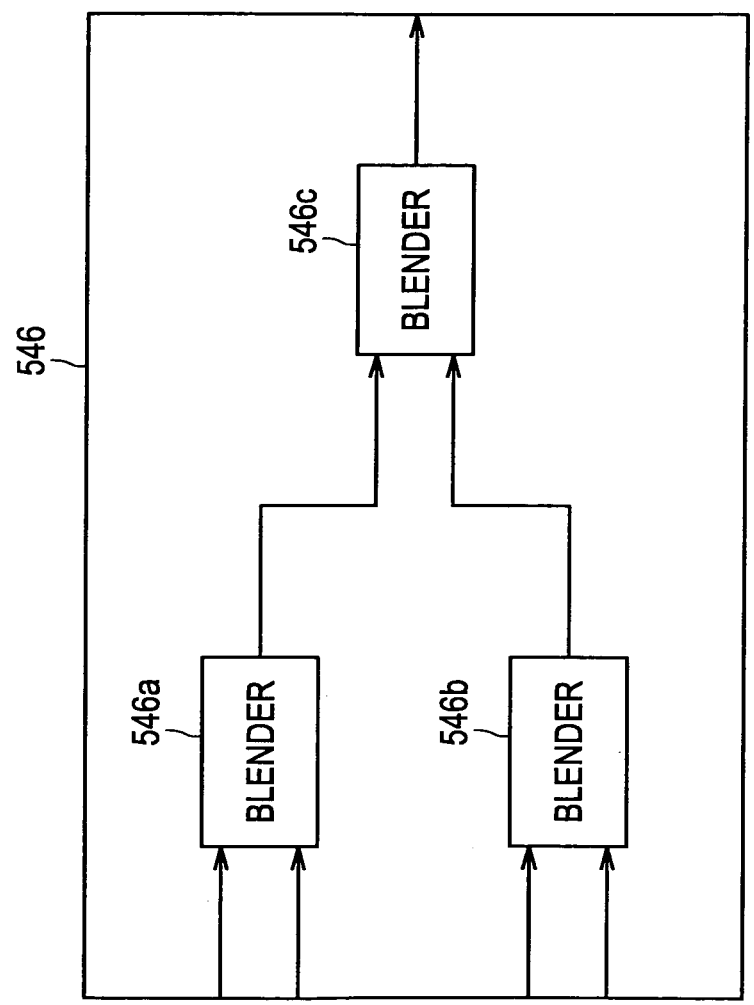
FIG. 24 is a block diagram showing a configuration example of a blender.

FIG. 24 is a block diagram showing a configuration example of the blender 546. The blender 546 includes three blenders 546a, 546b, and 546c and each blender has the same function. In this configuration example, four input video signals can arbitrarily be blended.

Figure 25:
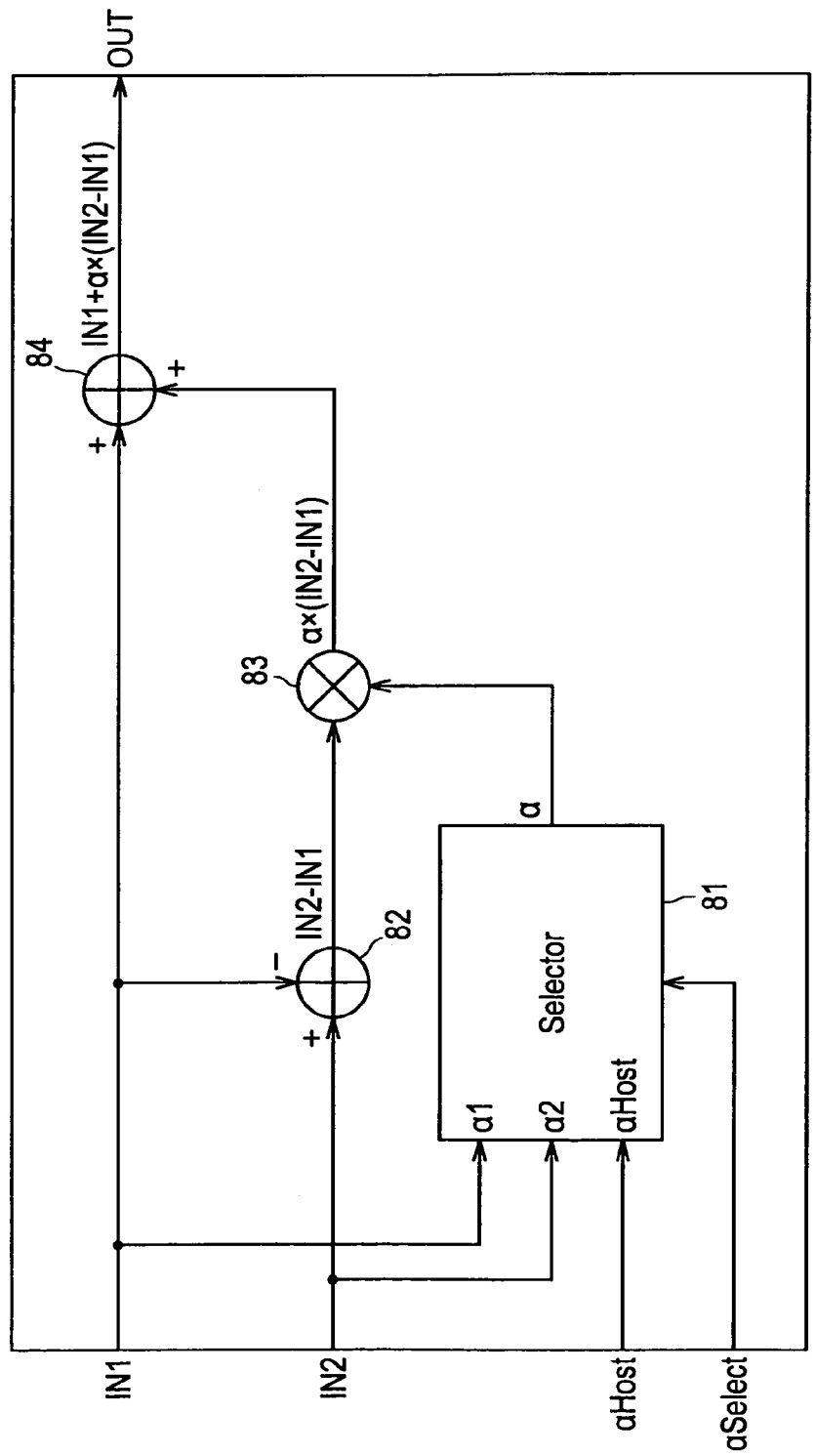
FIG. 25 is a block diagram showing each configuration of the blender.

FIG. 25 is a block diagram showing each configuration of the blenders 546a, 546b, and 546c. Each of the blenders 546a, 546b, and 546c combines 2-system input signals IN1 and IN2 in a blend ratio $\alpha$. That is, two images are combined based on a coefficient ($\alpha$ value). A selector 81 selects the blend ratio $\alpha$. $\alpha 1$ and $\alpha 2$ are input to the selector 81 for each pixel together with the input signal IN1 and the input signal IN2. Moreover, a control signal αSelect to select the α value is input from the host CPU 60 together with a blend ratio αHost for each screen and the desired α value is selected by the αSelect. A difference between the 2-system input signals IN1 and IN2 is calculated by a differential calculator 82 and the blend ratio α selected by a selector 83 is multiplied by a multiplier 83. The difference after being multiplied by the blend ratio α is added to the input signal N1 by an adder 84 before being output. That is, an output signal OUT can be calculated by the formula below.

[Math 1]

Returning to FIG. 23, image data scaled to a desired size by the scaler 545 is sent to the color expander 71. As will be described later, the color expander 71 can artificially expand (color gamut expansion processing), for example, the color gamut of sRGB to that of xvYCC. Image data output from the color expander 71 is input to the blender 546 and a plurality of images is combined in the blend ratio α. The video encoder 547 generates timing or adds a synchronization signal to achieve desired output specifications.

Next, the method of artificially expanding to the color gamut of xvYCC by the color expander 71 will be described. In BT. 601 or BT.709, the level of a chroma (Cr, Cb) signal is specified by values 16 to 240. In xvYCC, signal levels of values 1 to 254 can be handled to further expand the color gamut. When converting this to an artificial xvYCC signal, signals of 36 to 220 are allowed to pass unchanged and level conversions (level expansion) of each of signals of 16 to 36 and those of 221 to 240 are made by linear processing to convert the signals of 16 to 36 into signals of 1 to 36 and the signals of 221 to 240 into signals of 221 to 254. As a result, color signals with relatively high saturation of original signals are further expanded to generate artificial xvYCC signals. Cb can also be expanded in the same manner. Also, a similar color gamut expansion of RGB signals may be performed. Moreover, the threshold of level may be changed and a similar effect can be achieved by performing nonlinear processing of level conversions.

Another method of expanding the color gamut to that of xvYCC will be described below. As described in a document of "Recent Trend of Wide Gamut Standards for Color Imaging" (by T. Matsumoto et al) at IDW (International Display Workshop) 2006 Conference, the conversion formula from R', G', and B' to Y'709, Cb'709, and Cr'709 is represented by Formula (1). Moreover, Formula (2) is obtained from Formula (1).

[Math 2]

In the color gamut of BT.709, it is necessary to satisfy conditions of Formula (3). If, for example, the condition Cb=Cr is further added (if set as Cb=Cr=C), Formula (4) can be obtained from Formula (2) and Formula (3).

[Math 3]

Figure 26:
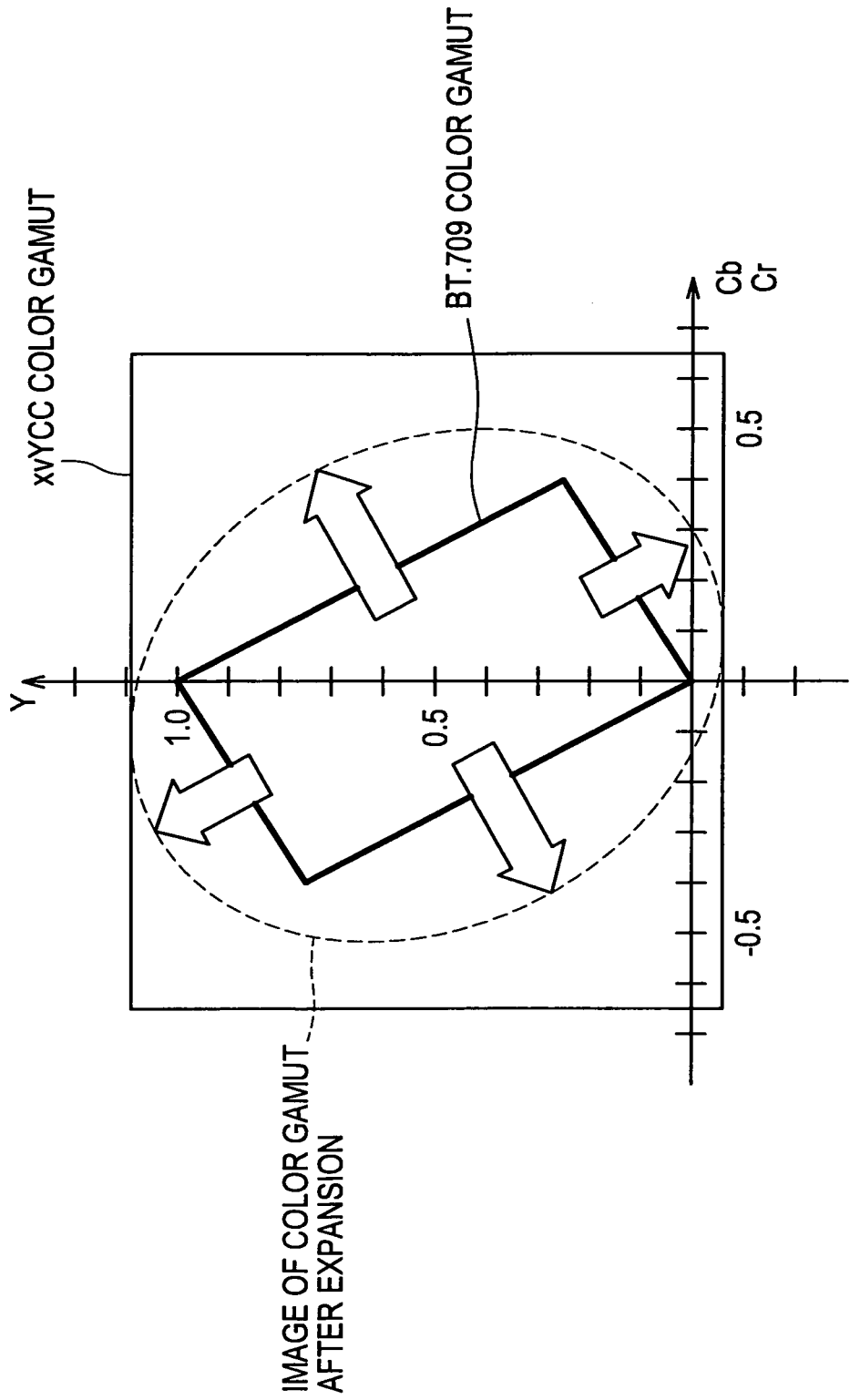
FIG. 26 is a schematic diagram showing a color gamut of BT.709 under certain conditions in a Y-Cb, Cb space.

FIG. 26 is a schematic diagram showing the color gamut of BT.709 under the above conditions in a Y-Cb, Cb space. Signals near boundaries of the color gamut region of BT. 709 in the rhombus are expanded (color gamut expansion processing) to regions outside the boundaries. However, the present embodiment is not limited to the above conditions and signals may be expanded (color gamut expansion processing) to signals near boundaries of the color gamut of BT.709.

By converting the color gamut of BT.709 or the like to the wide color gamut such as xvYCC in this manner, color space information transmitted via HDMI can typically be output by fixing to xvYCC709. Moreover, the color space information is not switched and thus, colors can be prevented from changing while being displayed.

Conversely, if a wide color gamut is input, the color space information may typically be fixed to BT. 709 or the like for output by compressing the color space information to narrower one such as BT.709 and sRGB.

Figure 27:
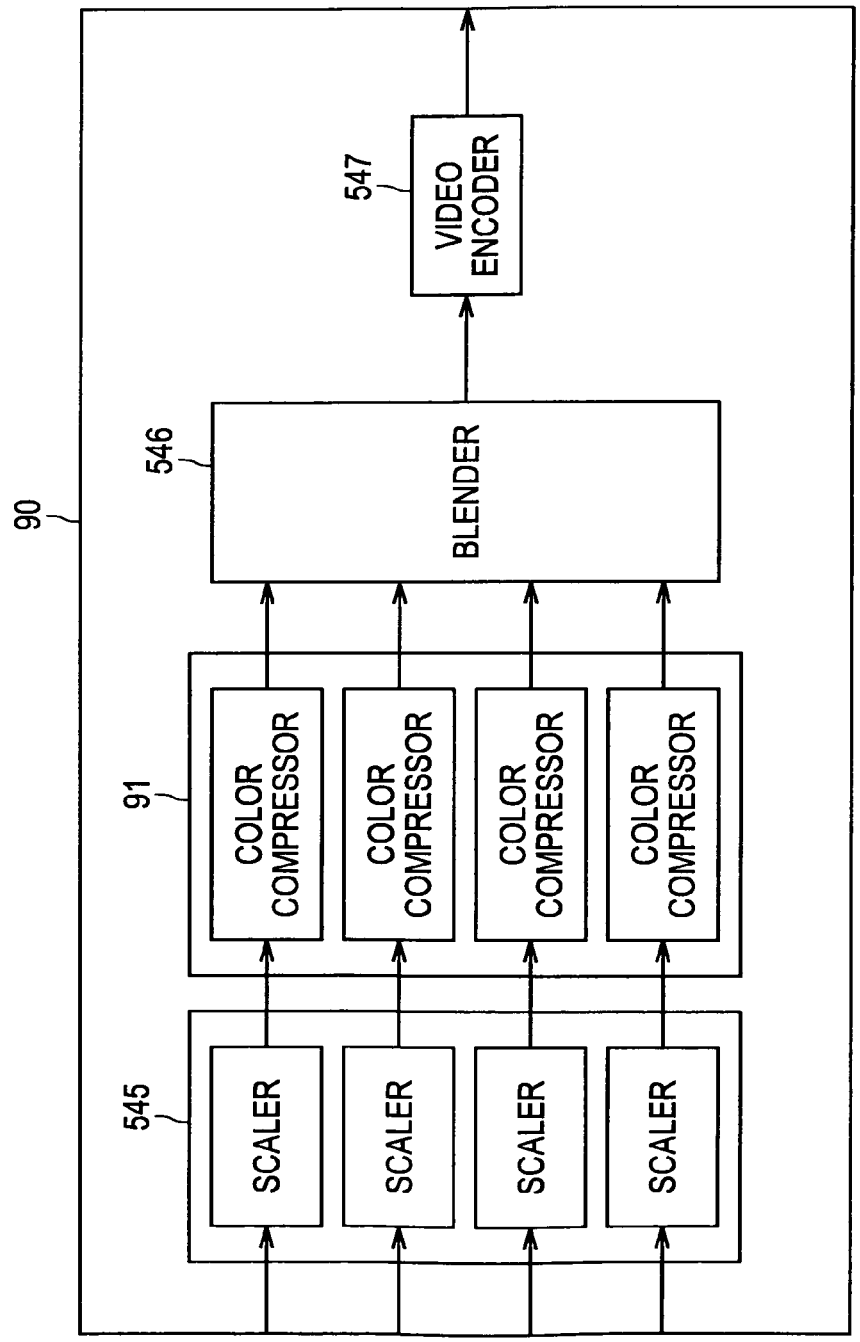
FIG. 27 is a block diagram showing a configuration example of the combining processing unit when color space information is compressed.

FIG. 27 is a block diagram showing a configuration example of the combining processing unit when color space information is compressed. The same reference numerals are attached to the same components as those of the combining processing unit 542 shown in FIG. 5 and a description thereof is omitted. In addition to the function of the combining processing unit 542 shown in FIG. 5, this combining processing unit 90 can further perform compressing processing of the color gamut of xvYCC to that of BT.709. Moreover, the blend ratio of a plurality of images can be changed.

A color compressor 91 outputs signals of the color gamut of BT.709 unchanged and those of the color gamut of xvYCC after compressing those signals to BT.709.

Accordingly, color space information is typically output by fixing to BT.709 and the color space information is not switched and thus, colors can be prevented from changing while being displayed.

FIGS. 28 and 29 are schematic diagrams showing Concrete Example 17 and Concrete Example 18 of screen images, output video signals, and color space information when screens are combined. In these concrete examples, a GUI front image is combined with a back image in the blend ratio α. Then, at times t0 and t1, the color space standard of the back image is switched. In these cases, the host CPU 60 acquires the blend ratio α from the blenders 546a, 546b, and 546c and determines whether to switch color space information in accordance with the blend ratio α. More specifically, if the α value of a front screen (GUI) to be blended is 50% or more, the color space information of the front screen (GUI) is output.

In Concrete Example 17 shown in FIG. 28, the GUI front image in xvYCC is blended with the back image with the α value equal to 50% or more. Then, at time t0, the back image in BT. 709 is switched to the back image in xvYCC and at time t1, the back image in xvYCC is switched to the back image in BT. 709. The host CPU 60 detects that the blend ratio α is 50% or more and sets the color space information xvYCC709 of the front image to the HDMI Tx 55.

In Concrete Example 18 shown in FIG. 29, the GUI front image in BT. 709 is blended with the back image with the α value equal to 50% or more. Then, at time t0, the back image in BT. 709 is switched to the back image in xvYCC and at time t1, the back image in xvYCC is switched to the back image in BT. 709. The host CPU 60 detects that the blend ratio α is 50% or more and sets the color space information BT. 709 of the front image to the HDMI Tx 55.

Thus, if the blend ratio α is 50% or more, annoyance while the combined screen is displayed can be prevented by transmitting the color space information of the front image because the frequency with which the color of the front image changes while being displayed is thereby decreased.

FIGS. 30 to 32 are schematic diagrams showing Concrete Example 19 to Concrete Example 21 of screen images, output video signals, and color space information when screens are combined. In these concrete examples, a GUI front image is combined with a back image at time t1. In these cases, the host CPU 60 retains the state of color space information immediately before images are combined.

In Concrete Example 19 shown in FIG. 30, a video signal of the xvYCC color space standard is output prior to time t0. At time t0, the GUI front image in xvYCC is blended with the back image in xvYCC. Then, at time t1, the back image in xvYCC is switched to the back image in BT.709. In this case, the host CPU 60 retains the color space information of the image immediately before at time t0 and sets xvYCC709 to the HDMI Tx 55. The host CPU 60 also retains the color space information immediately before at time t1 and sets xvYCC709 to the HDMI Tx 55.

In Concrete Example 20 shown in FIG. 31, a video signal of the BT.709 color space standard is output prior to time t0. At time t0, the GUI front image in xvYCC is blended with the back image in xvYCC. Then, at time t1, the back image in xvYCC is switched to the back image in BT.709. In this case, the host CPU 60 retains the color space information of the image immediately before at time t0 and sets BT.709 to the HDMI Tx 55. The host CPU 60 also retains the color space information immediately before at time t1 and sets BT.709 to the HDMI Tx 55.

In Concrete Example 21 shown in FIG. 32, a video signal of the BT.709 color space standard is output prior to time t0. At time t0, the GUI front image in xvYCC is blended with the back image in BT.709. Then, at time t1, the back image is switched to a video signal of an image in xvYCC. In this case, the host CPU 60 retains the color space information of the image immediately before at time t0 and sets BT.709 to the HDMI Tx 55. At time t1, the host CPU 60 sets xvYCC709, which is the color space of the image, to the HDMI Tx 55 because the image is not a combined image.

Thus, if screens are combined by blending, colors can be prevented from changing while being displayed by retaining the state of color space information immediately before screens are combined.

So far, the first embodiment of the present invention has been described using FIGS. 1 to 32. According to the present embodiment, by fixing color space information to be transmitted via HDMI when screens are combined, a problem of changing colors of graphics or a combined image while being displayed on a TV receiver that switches color gamut expansion processing according to the color space information can be avoided.

Also, by retaining color space information before screens are combined and transmitting the color space information also after the screens are combined, a problem of changing colors of graphics or a combined image while being displayed on a TV receiver that switches color gamut expansion processing according to the color space information can be avoided.

Also, by determining color space information to be transmitted via HDMI in accordance with the size or area of a combined screen, even if colors of graphics or a combined image change while being displayed on a TV receiver that switches color gamut expansion processing according to the color space information, the change can visually be made less conspicuous.

Also, if the size or area of screens is the same when color space information to be transmitted via HDMI is decided in accordance with the size or area of a combined screen, even if colors of graphics or the combined image change while being displayed on a TV receiver that switches color gamut expansion processing according to the color space information, the change can visually be made less conspicuous by retaining and transmitting the previous color space information.

Also, by transmitting color space information of the front screen (GUI) with the minimum value of the α value in the screen of 50% or more when all screens are combined by α blending, a problem of changing colors of graphics or a combined screen while being displayed on a TV receiver that switches color gamut expansion processing according to the color space information can be avoided.

Also, if the switching interval is a predetermined time or less when color space information to be transmitted via HDMI is decided in accordance with the size or area of a combined screen, even if colors of graphics or the combined image change while being displayed on a TV receiver that switches color gamut expansion processing according to the color space information, the change can visually be made less conspicuous by retaining and transmitting the previous color space information.

Also, by generating an artificial wide color gamut signal by performing color gamut expansion processing on a signal of normal color gamut to combine screens and fixing color space information to be transmitted via HDMI to the wide color gamut, a problem of changing colors of graphics or a combined image while being displayed on a TV receiver that switches color gamut expansion processing according to the color space information can be avoided.

Also, by generating a normal color gamut signal by performing color gamut compression processing on a signal of wide color gamut to combine screens and fixing color space information to be transmitted via HDMI to the normal color gamut, a problem of changing colors of graphics or a combined image while being displayed on a TV receiver that switches color gamut expansion processing according to the color space information can be avoided.

Incidentally, the present embodiment is not limited to the above embodiment and can naturally be modified in various ways without departing from the spirits of the present invention. For example, the present embodiment is described by taking a transmission example using HDMI, but the present invention is not limited to this. While it is difficult to transmit attribute data such as the color gamut identification flag and metadata, for example, an analog component signal or analog composite video signal (or Y/C separate video signal) in wide color gamut may be output from the component terminal 58 or the composite video terminal (or the S terminal) 59 respectively, enabling the host CPU 60 to perform communication with the host CPU 23 of the TV receiver 2 based on, for example, TCP/IP (Transmission Control Protocol/Internet Protocol).

Second Embodiment

Incidentally, if color gamut expansion processing is turned on/off in a TV receiver, the tint and the depth of color of a displayed image change. When, for example, video signals of different color space attributes (for example, BT.709 and xvYCC709) are continuously transmitted, a source device switches color space information to be transmitted by matching change in color space attributes of the video signal to be transmitted and thus, even if a TV receiver switches color gamut expansion processing after detecting that the color space information has changed, the switching time of color space attributes of an actual video signal and the switching time of color gamut expansion processing performed on the video signal are shifted if it takes time t0 detect change in color space information in the TV receiver or to switch color gamut expansion processing and in the meantime, video on which suitable color gamut expansion processing has not been performed may be displayed. Moreover, color gamut expansion processing is turned on/off by being shifted from the switching time of a video signal and thus, the appearance of color may be damaged due to change in tint of video.

Thus, in the second to fourth embodiments described below, image processing apparatuses capable of preventing change in color while being displayed when color space information of a image signal is switched.

A reproduction system according to a second embodiment described below is configured like the first embodiment shown in FIGS. 1 to 5.

In such a reproduction system, if it takes time t0 detect change in color space information in the TV receiver or to switch color gamut expansion processing, the switching time of color space attributes of an actual video signal and the switching time of color gamut expansion processing performed on the video signal are shifted even if the TV receiver 2 switches color gamut expansion processing after detecting that the color space information has changed and in the meantime, video on which suitable color gamut expansion processing has not been performed may be displayed. A detailed description will be provided below by citing concrete examples. BT.709 is assumed as a concrete color space standard and xvYCC (xvYCC709) as a color space standard with a wider color gamut.

Figure 33:
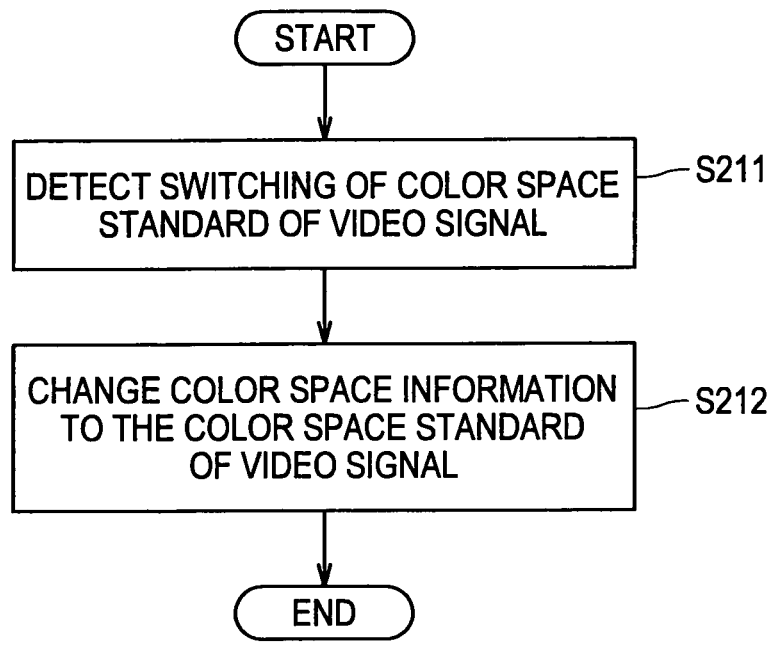
FIG. 33 is a flow chart showing a conventional transmission operation.
Figure 34:
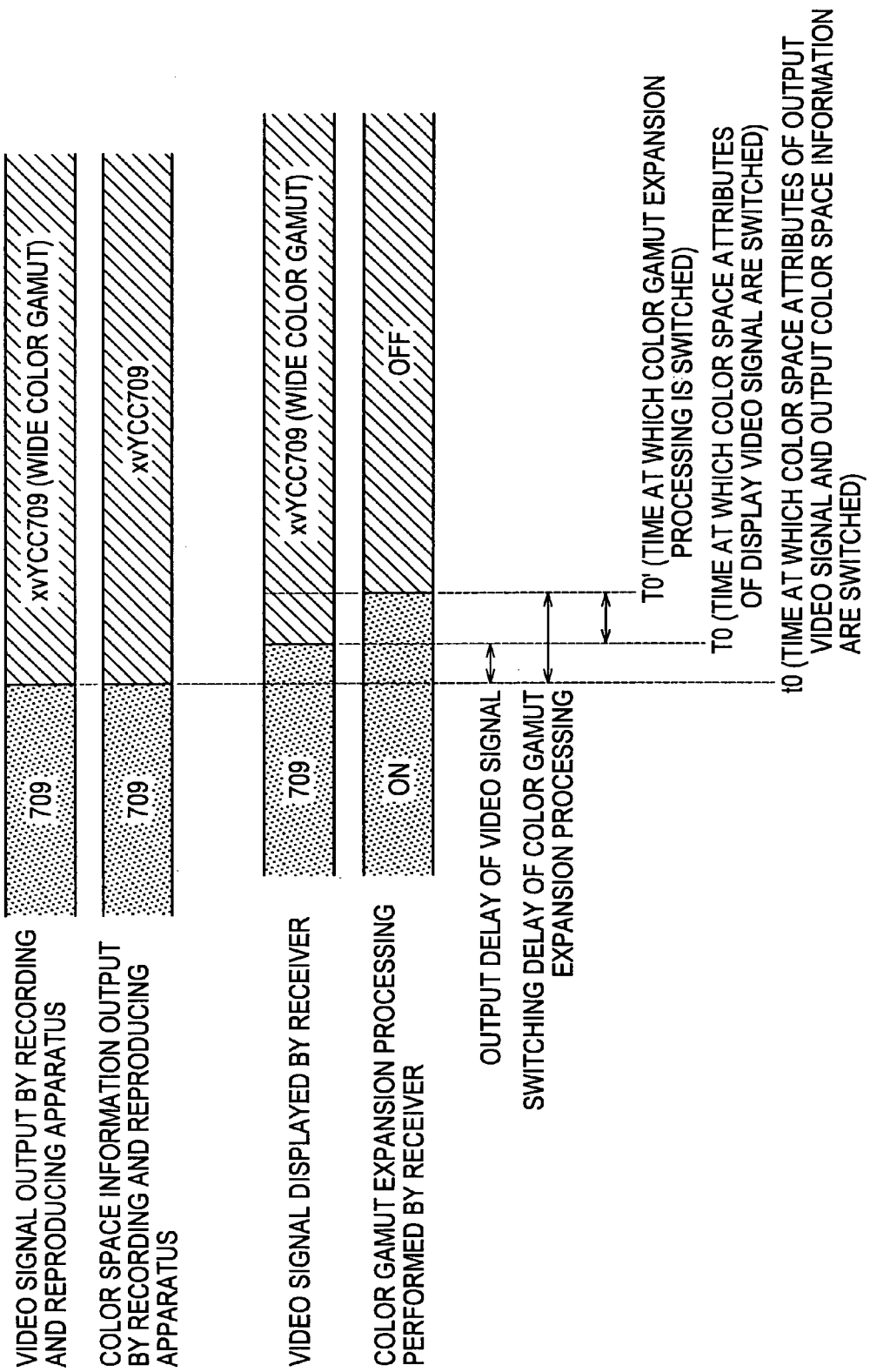
FIG. 34 is a schematic diagram showing the conventional transmission operation.

FIGS. 33 and 34 are a flow chart and a schematic diagram showing a conventional transmission operation respectively. At step S211, the host CPU 60 detects switching of the color space standard of a video signal output from the MPEG decoder 53. At step S212, the host CPU 60 changes color space information to color space attributes of the video signal in accordance with the detected switching. More specifically, the color gamut identification flag of the color space standard is set to the HDMI Tx 55.

Thus, if the switching time when the color space standard of a video signal is switched and the change time when color space information is changed are matched before being transmitted to the TV receiver 2, the switching time of the color space standard of the video signal and the switching time of color gamut expansion processing performed on the video signal do not match due to a delay of switching of color space expansion processing or the like in the TV receiver 2.

If, for example, as shown in FIG. 34, color space attributes of a video signal to be transmitted are switched from BT.709 to xvYCC at time t0 and at the same time, color space information to be transmitted is also switched from BT.709 to xvYCC, it is difficult for the TV receiver 2 to completely match switching of color gamut expansion processing performed on the video signal to switching of color space attributes of the video signal. If color space attributes of the video signal displayed by the TV receiver 2 are switched from BT.709 to xvYCC at time T0 and color gamut expansion processing performed on the video signal displayed by the TV receiver is switched from on to off at time T0', inappropriate processing to perform color gamut expansion processing on a video signal in xvYCC may arise in a period between T0 and T0'. Also a problem that the appearance of color may be damaged due to change in tint of video when color gamut expansion processing is switched from on to off at time T0'.

Thus, in the present embodiment, in the TV receiver 2, output of the recording and reproducing apparatus 1 is controlled so that the time T0 when color space attributes of a video signal are switched and the time T0' when color gamut expansion processing is switched match.

Figure 35:
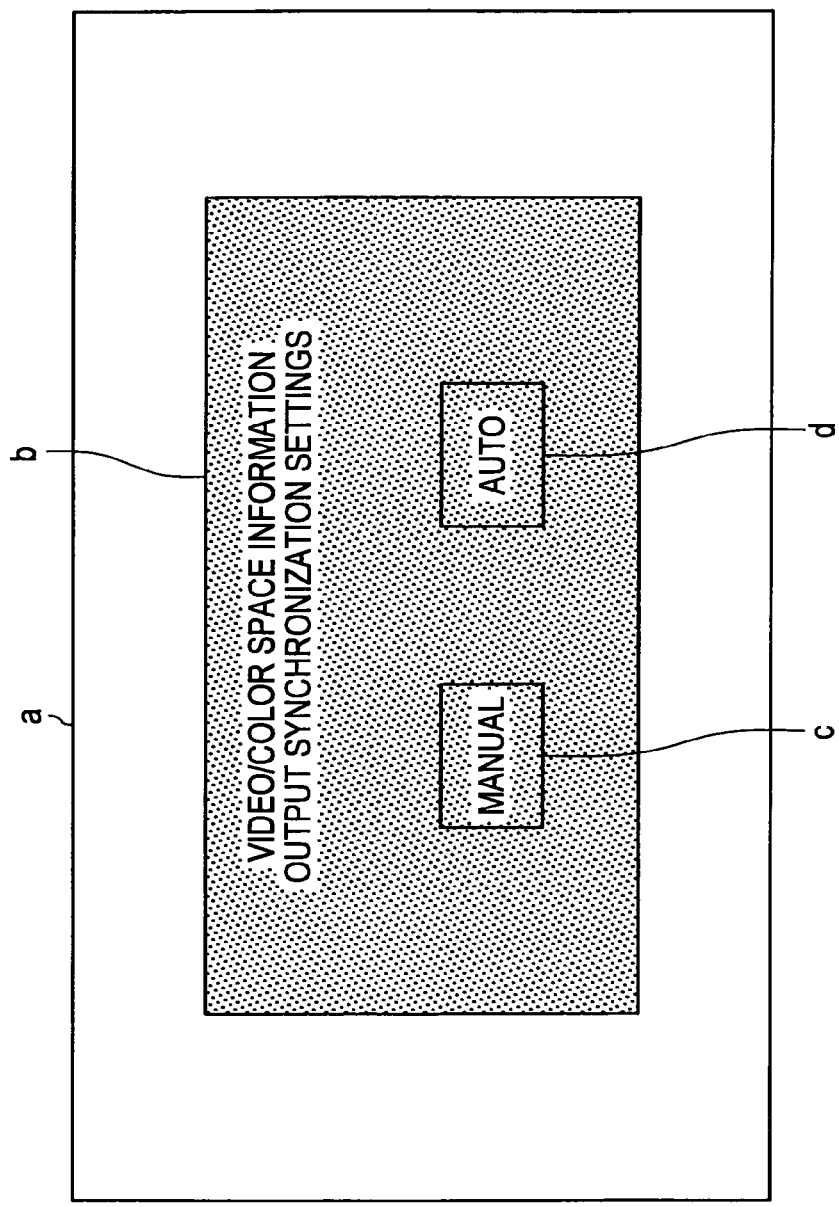
FIG. 35 is a diagram showing a setting screen example when output timing of the video signal and color space information is adjusted.
Figure 36:
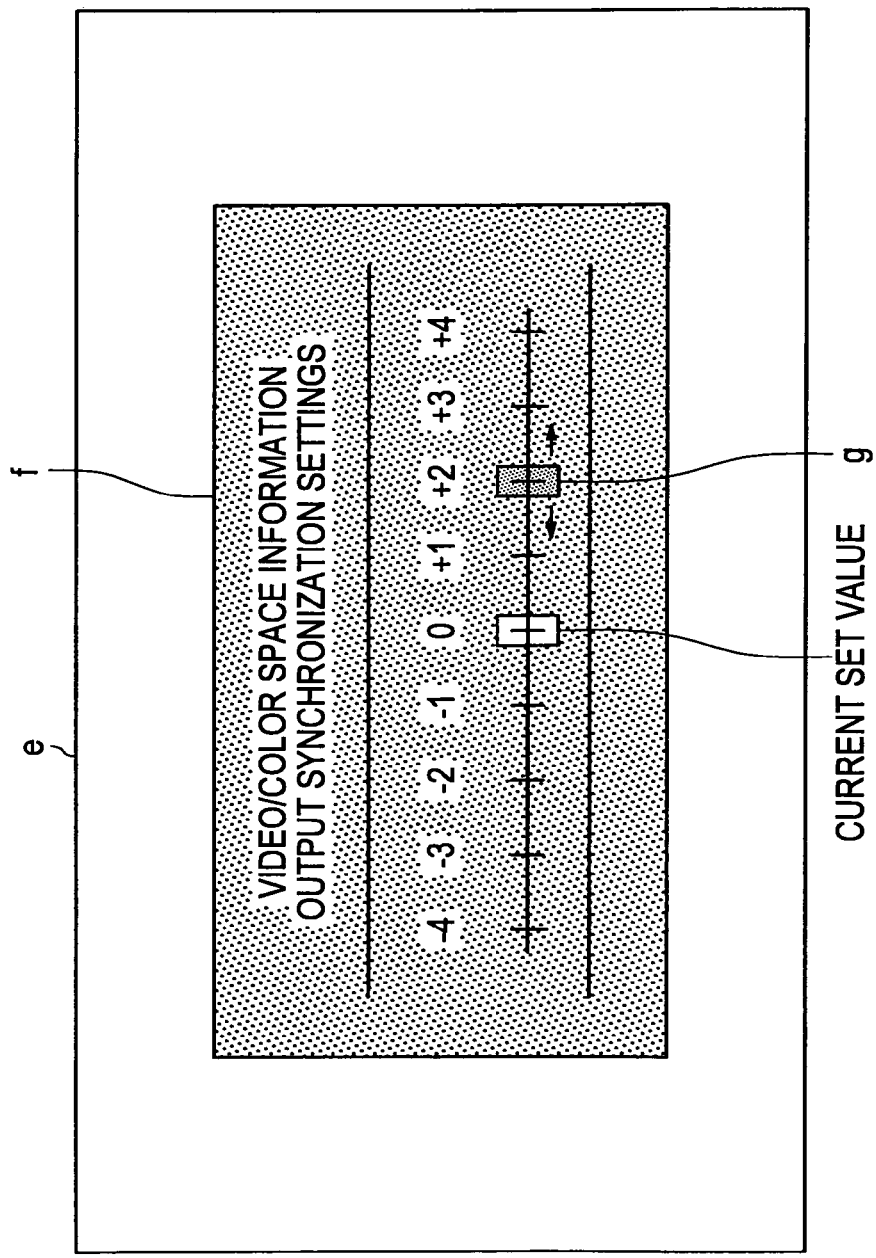
FIG. 36 is a diagram showing a setting screen example when output timing of the video signal and color space information is adjusted.

FIGS. 35 and 36 are diagrams showing setting screen examples when output timing of the video signal and color space information is adjusted. A setting screen a shown in FIG. 35 is created by combining an operation screen b of GUI (Graphical User Interface) and a coefficient (α value). In the operation screen b, a manual button c and an auto button d of output synchronization of a video signal and color space information are displayed.

If the manual button c in the operation screen b shown in FIG. 35 is selected, for example, a setting screen e as shown in FIG. 36 is displayed. In an operation screen f of GUI, the current set value is displayed at 0 position and output of a video signal and color space information can be controlled by moving a cursor g in a plus direction or minus direction. By moving the cursor g, for example, in the plus direction, the switching time of the color space standard of a video signal is delayed with respect to the change time of color space information before being output. Here, it is preferable to display video of a test video signal whose color space standard is switched at predetermined intervals in the setting screen e in the background of the operation screen f. Accordingly, whether a set value is appropriate can be judged while operating the operation screen f.

If the auto button d in the operation screen b shown in FIG. 35 is selected, a period between the change time of color space information and the switching time of the color space standard is automatically set. For example, the color gamut identification flag or metadata is acquired from the MPEG decoder 53 to detect switching of the color space standard of a video signal and the color gamut identification flag is set to the HDMI Tx 55 before the switching time of the color space standard of video data.

Figure 37:
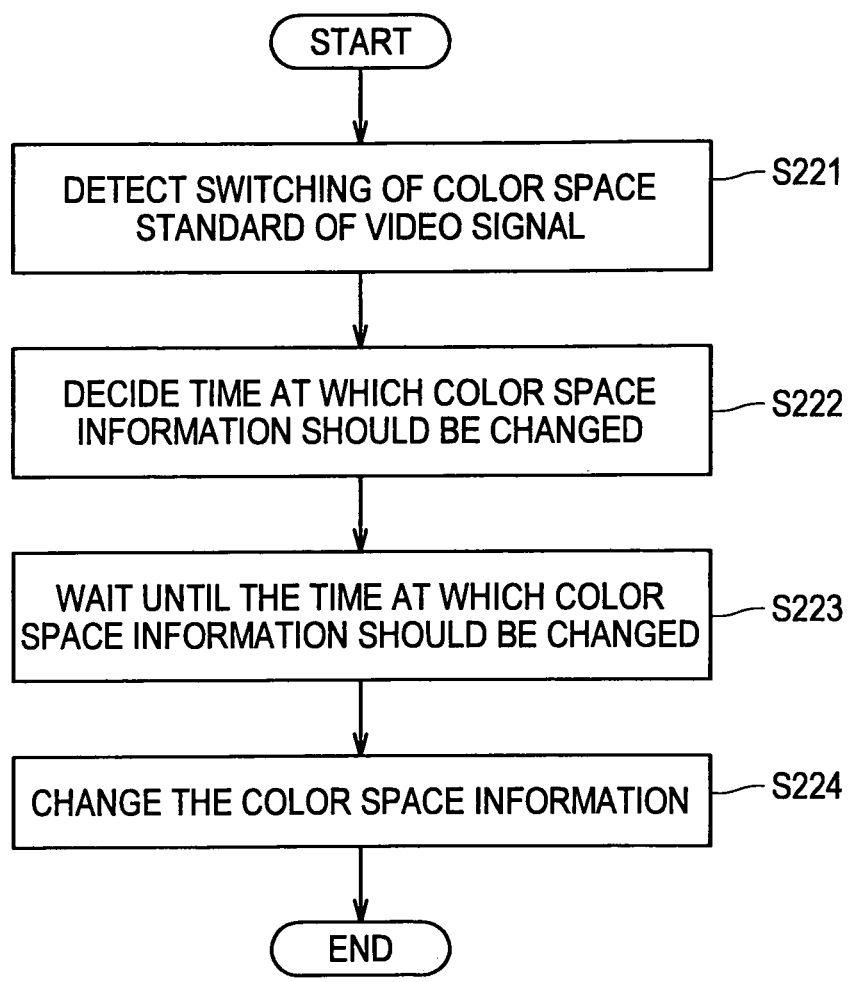
FIG. 37 is a flow chart showing the transmission operation in a second embodiment.
Figure 38:
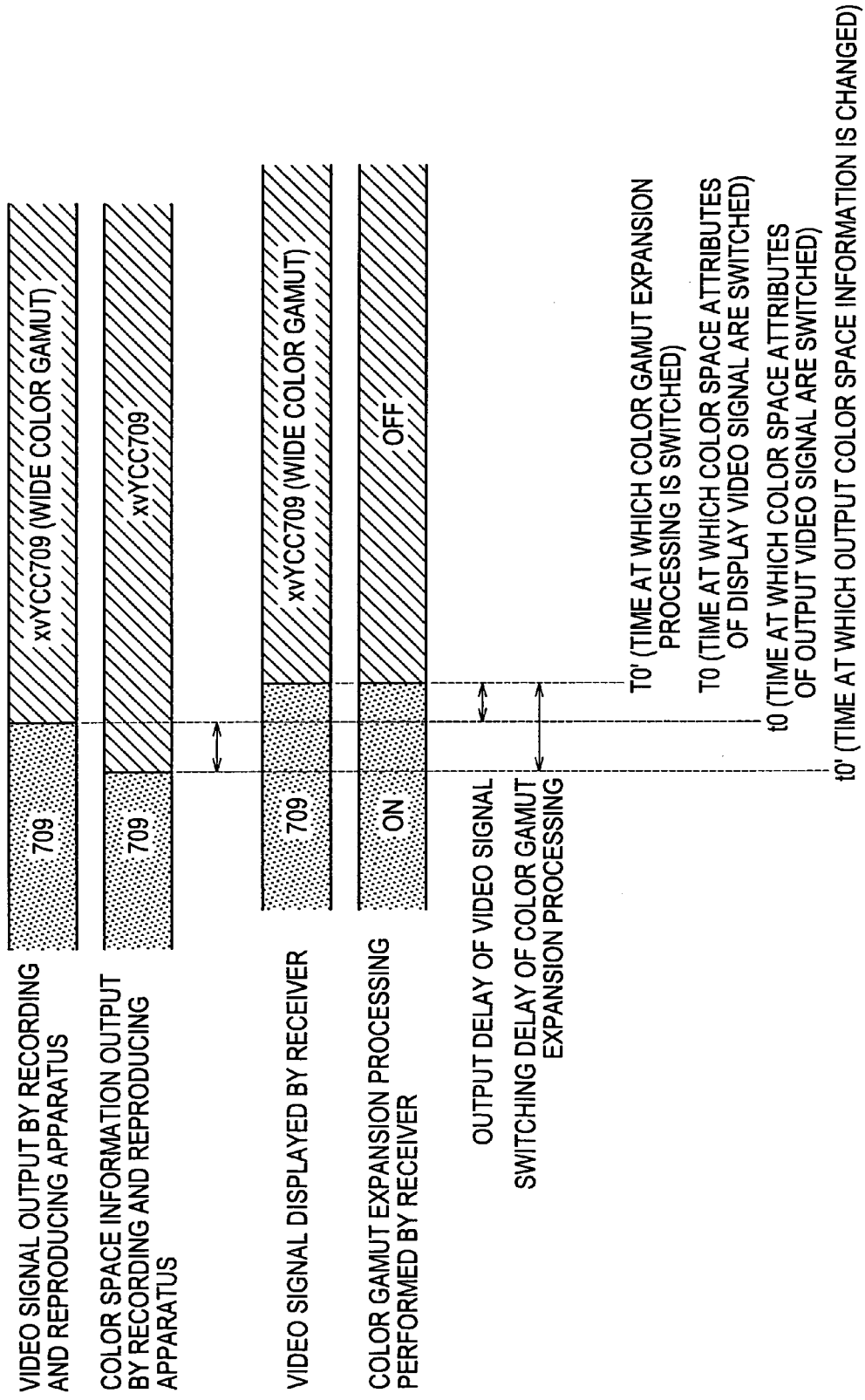
FIG. 38 is a schematic diagram showing the transmission operation in the second embodiment.
Figure 39:
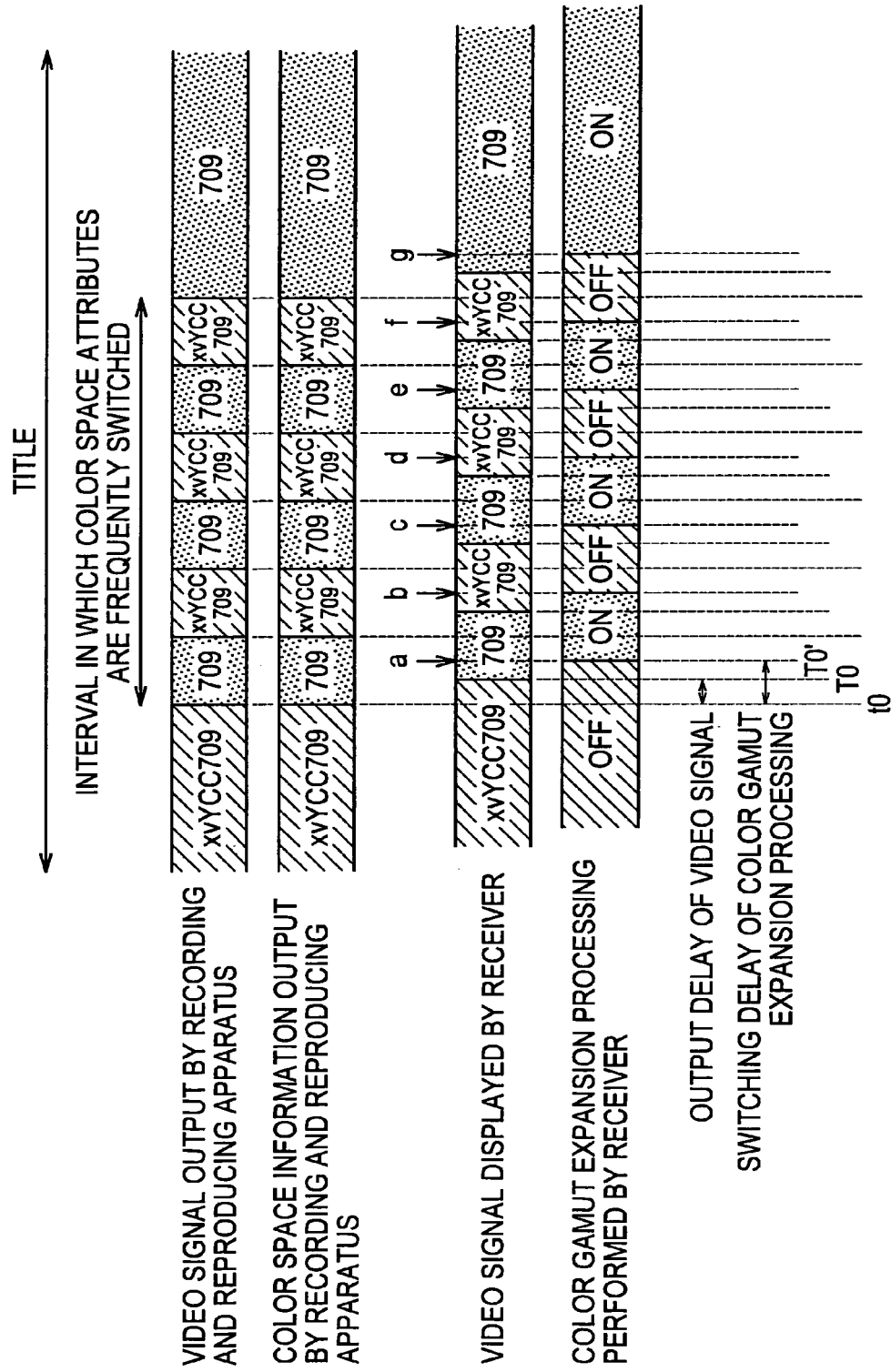
FIG. 39 is a schematic diagram showing the conventional transmission operation when color space attributes of the video signal are frequently switched.

FIGS. 37 and 38 are a flow chart and a schematic diagram showing a transmission operation in the present embodiment respectively. At step S221, the host CPU 60 detects switching of the color space standard of a video signal output from the MPEG decoder 53. More specifically, the host CPU 60 detects the switching time when the color space standard of a video signal is switched from the color gamut identification flag or metadata from the MPEG decoder 53.

At step S222, the host CPU 60 decides the time when color space information should be changed. Here, the change time of the color space information is decided to be prior to the switching time when the color space standard of the video signal is switched. More specifically, the host CPU 60 sets the period between the change time of the color space information and the switching time of the video signal so that the switching time of the color space standard of the video signal in the TV receiver 2 and the switching time of color gamut expansion processing performed on the video signal match.

At step S223, the host CPU 60 waits until the change time set at step S222 before changing the color space information. Then, at step S224, the host CPU 60 changes the color space information at the change time set at step S222. More specifically, the host CPU 60 sets the color gamut identification flag of the color space standard of the video signal switched after the change time t0 the HDMI Tx 55.

Thus, the switching time of the color space standard of a video signal and that of color gamut expansion processing performed on the video signal are matched on the TV receiver 2 side by exercising control so that the period between the change time when color space information is changed and the switching time when the color space standard of the video signal is switched in the recording and reproducing apparatus 1 matches a delay period due to a delay of switching of the color gamut expansion processing or the like in the TV receiver 2.

If, for example, as shown in FIG. 38, the color space information transmitted at time t0' is switched from BT.709 to xvYCC and color space attributes of the video signal transmitted at time t0 are switched from BT.709 to xvYCC, the TV receiver 2 can completely match switching of color gamut expansion processing performed on the video signal to switching of color space attributes of the video signal.

That is, by setting the period between the time t0' when color space information is changed and the time t0 when color space attributes of the video signal are switched in the recording and reproducing apparatus 1, the time T0 when the color space attributes of the video signal are switched and the time T0' when color gamut expansion processing is switched can be matched in the TV receiver 2. Therefore, even if the color gamut expansion processing is switched from on to off at time T0', the appearance of color is not damaged because no change in tint of video occurs.

While the switching time when the color space standard of a video signal is switched is detected from the color gamut identification flag or metadata acquired from the MPEG decoder 53 in the present embodiment, if the recording and reproducing apparatus 1 has a database in which the period between the change time of color space information and the switching time of the color space standard is stored for each piece of type information of the TV receiver, for example, settings can be made automatically by acquiring type information or the like from the EDIDROM 24 of the TV receiver 2 and checking the acquired information against information in the database. The database need not be included in the recording and reproducing apparatus 1 and may be in a network such as the Internet connectable by the recording and reproducing apparatus 1.

The present embodiment is described by taking a transmission example using HDMI, but the present invention is not limited to this. While it is difficult to transmit attribute data such as the color gamut identification flag and metadata, for example, an analog component signal or analog composite video signal (or Y/C separate video signal) in wide color gamut may be output from the component terminal 58 or the composite video terminal (or the S terminal) 59 respectively, enabling the host CPU 60 to perform communication with the host CPU 23 of the TV receiver 2 based on, for example, TCP/IP (Transmission Control Protocol/Internet Protocol).

So far, the second embodiment of the present invention has been described using FIGS. 33 to 38. According to the present embodiment, the color on a TV receiver side can be prevented from changing while being displayed because the switching time of the color space standard is controlled to be subsequent to the change time of color space information so that the switching time of color space attributes of an image signal and the switching time of color gamut expansion processing performed on the image signal match on the TV receiver side.

Third Embodiment

A reproduction system according to a third embodiment described below is configured like the first and second embodiments shown in FIGS. 1 to 5.

Like the second embodiment, if, as described above using FIGS. 33 and 34, the switching time when the color space standard of a video signal is switched and the change time when color space information is changed are matched before being transmitted to the TV receiver 2 in such a reproduction system, the switching time of the color space standard of the video signal and the switching time of color gamut expansion processing performed on the video signal do not match due to a delay of switching of color space expansion processing or the like in the TV receiver 2.

Further, if, as shown in FIG. 8, image data of different color space attributes is mixed in video content (hereinafter, called the title) reproduced continuously such as a movie, color space attributes of the video signal to be output are switched frequently, and color space information is also switched frequently, inappropriate color gamut expansion processing occur frequently at times a to g and also the tint changes frequently if the color gamut expansion processing is controlled to turn on/off in accordance with color space information.

Thus, in the present embodiment, a change in tint due to frequent switching of the video signal is prevented by outputting fixed color space information regardless of the actual color space information of the video signal.

Figure 40:
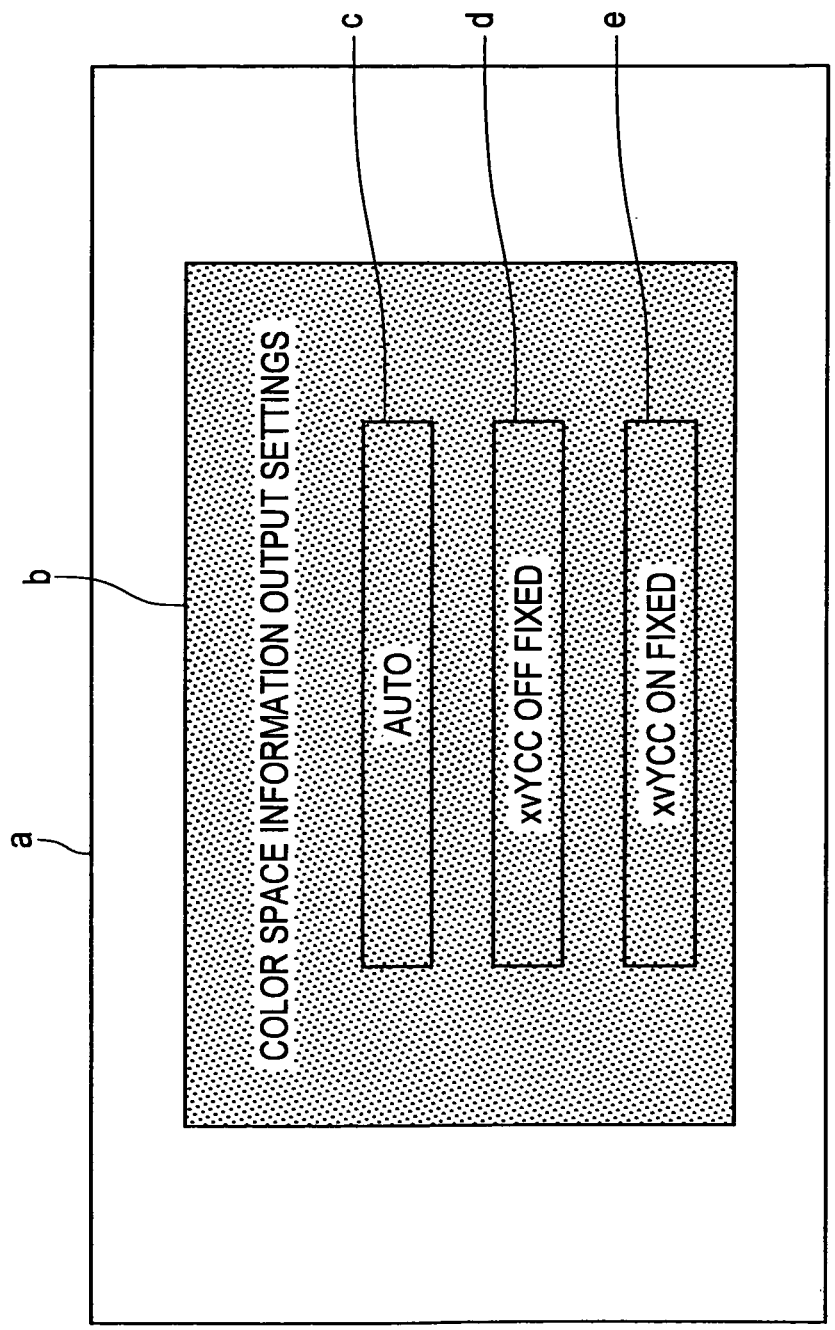
FIG. 40 is a diagram showing a setting screen example when the output timing of the color space information is adjusted.

FIG. 40 is a diagram showing a setting screen example when the output timing of the color space information is adjusted. A setting screen a is created by combining an operation screen b of GUI (Graphical User Interface) and a coefficient (cc value). In the operation screen b, an "Auto" setting button c, a "xvYCC OFF fixed" setting button d, and a "xvYCC ON fixed" setting button e are displayed. If the "Auto" setting button c is selected, as will be described later, the change of color space information is controlled depending on whether the next switching of the color space standard occurs within a predetermined period after the switching time of the color space standard of a video signal. If the "xvYCC OFF fixed" setting d is selected and the next switching of the color space standard occurs within a predetermined period after the switching time of the color space standard of a video signal, the color space information is fixed to BT.709. If the "xvYCC ON fixed" setting e is selected and the next switching of the color space standard occurs within a predetermined period after the switching time of the color space standard of a video signal, the color space information is fixed to xvYCC.

Figure 41:
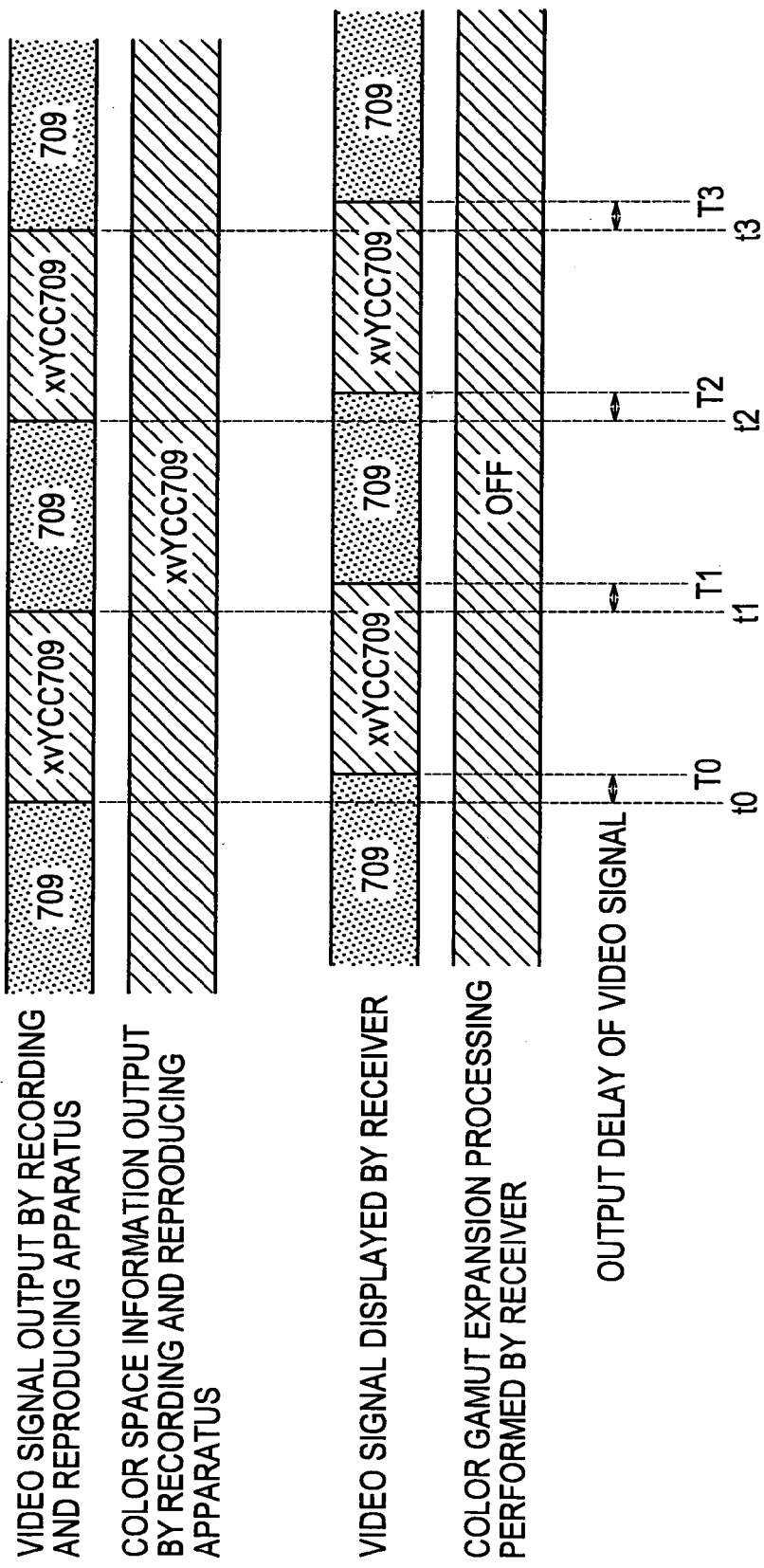
FIG. 41 is a schematic diagram showing the transmission operation when the color space information is fixed to xvYCC.

FIG. 41 is a schematic diagram showing the transmission operation when the color space information is fixed to xvYCC. When the color space information to be transmitted is switched from BT.709 to xvYCC at times t0 and t2 and the color space attributes of a video signal to be transmitted are switched from xvYCC to BT.709 at times t1 and t3, the color space information is fixed to xvYCC and output. Since color gamut expansion processing of the TV receiver 2 is thereby set to an off state, a change of tint at switching times T0, T1, T2, and T3 of a video signal can be prevented. Moreover, if the video signal is from the same title, the user does not find any change in color while being displayed.

Color space attributes of image data at the start of a title may be used as color space information to be fixed. If color space attributes of image data constituting a title are retained as meta-information in a database, typical color space information of the title may be derived from the meta-information and fixed.

Figure 42:
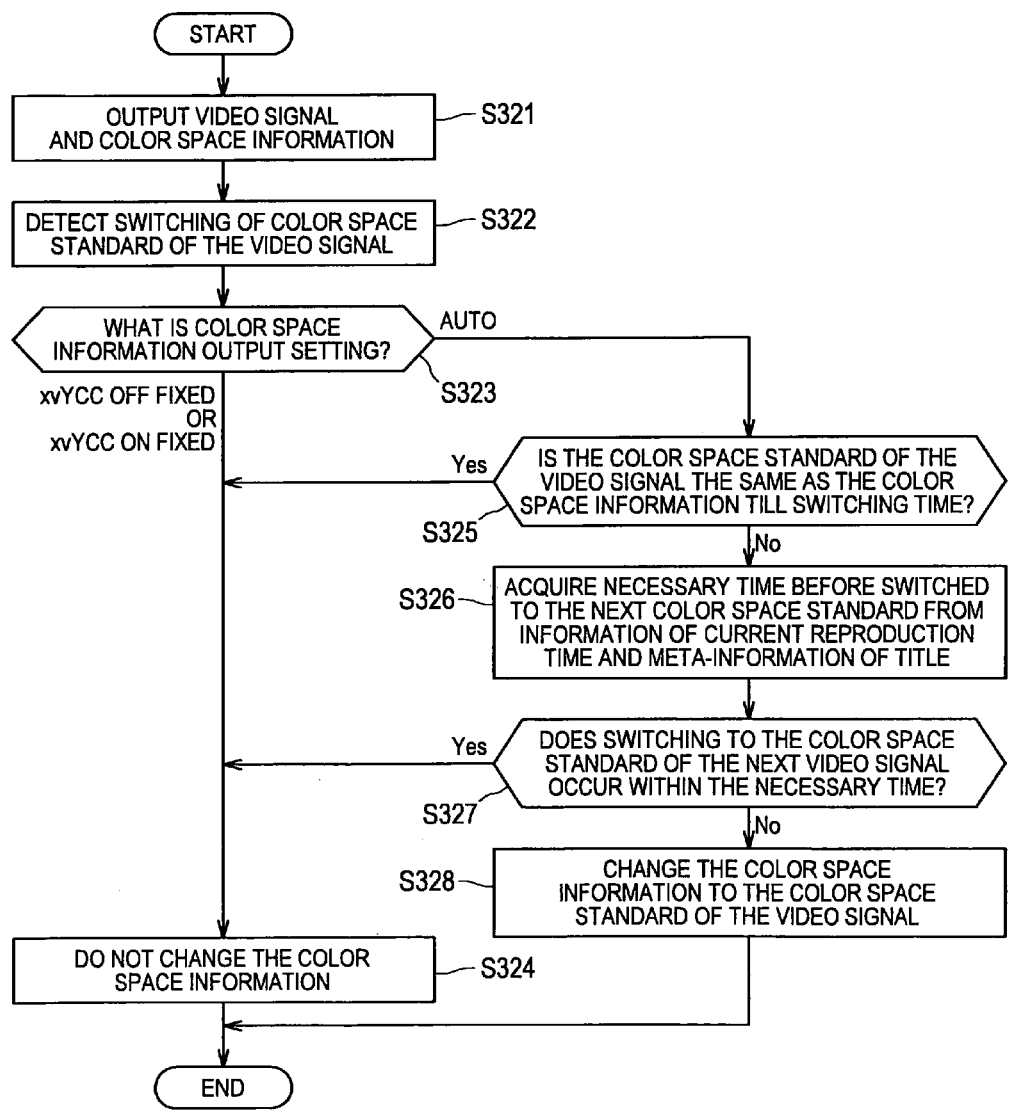
FIG. 42 is a flow chart showing a change operation of the color space information.

Next, a case when color space attributes of a video signal are frequently switched will be described. FIG. 42 is a flow chart showing a change operation of the color space information. Here, color space attributes of the video signal constituting a title are retained in the hard disk drive 44 as meta-information.

At step S321, the host CPU 60 outputs the video signal and color space information to start reproduction of the title. At step S322, the host CPU 60 detects switching of the color space standard of the video signal. For example, the switching time when the color space standard of the video signal is switched can be detected from the color space identification flag or metadata acquired from the MPEG decoder 53. At step S323, the host CPU 23 determines the output setting of color space information set, for example, in the setting screen shown in FIG. 40. If the host CPU 23 determines that the output setting is the "xvYCC OFF fixed" setting or "xvYCC ON fixed" setting, the host CPU 23 proceeds to step S324 and does not change the color space information. If the host CPU 23 determines that the output setting is the "Auto" setting, the host CPU 23 proceeds to step S325.

At step S325, the host CPU 60 determines whether the color space standard of the video signal after the switching detected at step S322 is the same as the current color space information. More specifically, the host CPU 60 determines whether the color space standard of the video signal is the same as that of the color gamut identification flag. If the color space standards are the same at step S325, the host CPU 60 proceeds to step S324 and does not change the color space information. If the color space standards are different, the host CPU 60 proceeds to step S326.

At step S326, the host CPU 60 acquires the necessary time up to the next switching time of the color space standard from information about the current reproduction time and meta-information of the title. More specifically, the host CPU 60 acquires the period between the switching time of the color space standard of the video signal detected at step S322 based on the meta-information and the next switching time of the color space standard.

At step S327, the host CPU 60 determines whether the next switching of the color space standard occurs within a predetermined time. More specifically, the host CPU 60 determines whether the necessary time acquired at step S326 is within the predetermined time. At step S327, if the next switching of the color space standard occurs within the predetermined time, the host CPU 60 proceeds to step S324 and does not change the color space information until the switching time. If the next switching of the color space standard does not occur within the predetermined time, the host CPU 60 proceeds to step S328.

A typical fixed value (for example, five minutes) specific to an apparatus may be used as the predetermined time after the switching time of the color space standard. Also, a fixed proportion of the total reproduction time of a title (for example, 10% of the total reproduction time of a title) may be used as the predetermined time.

At step S328, the host CPU 60 changes the color space information up to the switching time t0 the color space standard of the video signal after the switching time.

Figure 43:
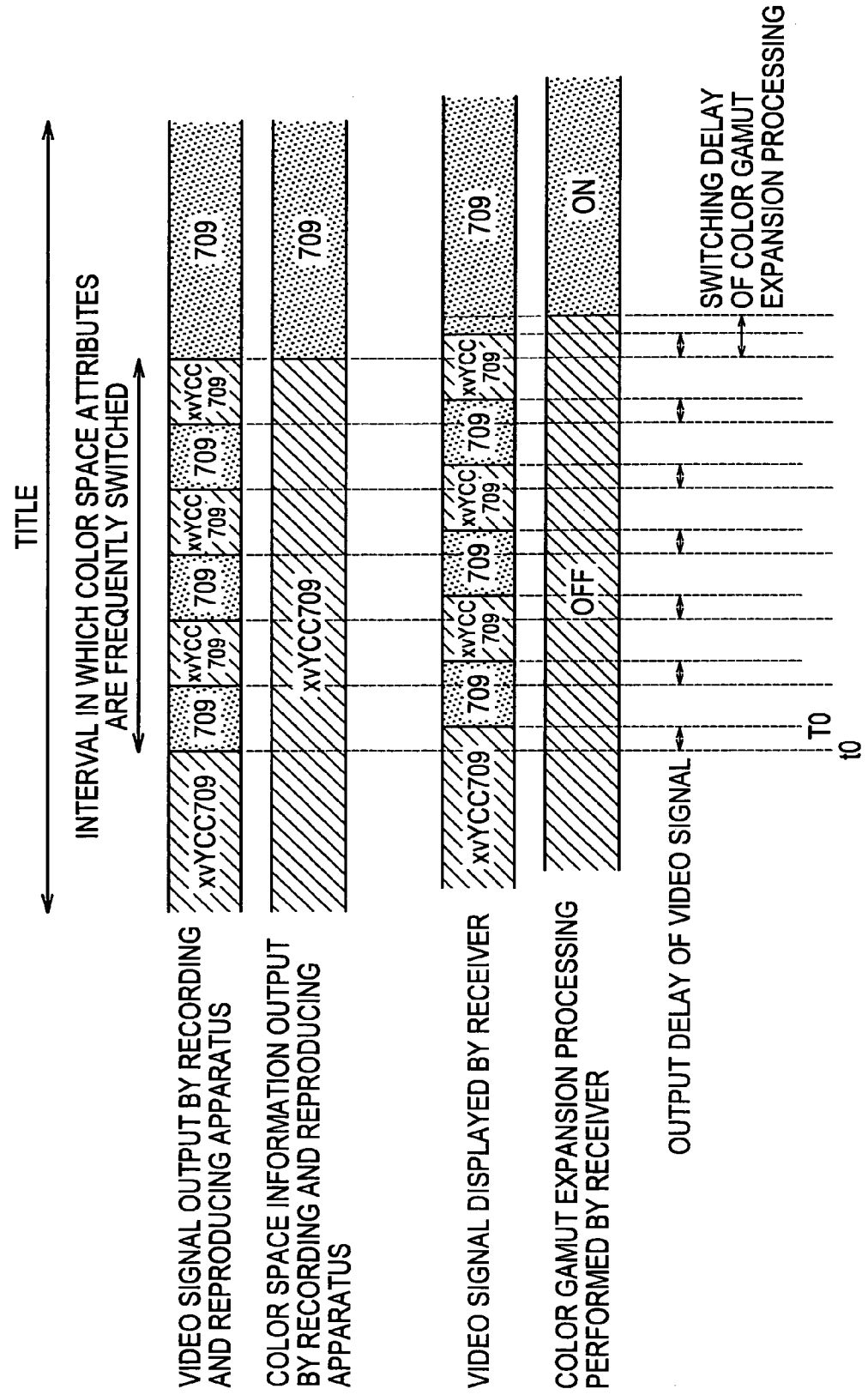
FIG. 43 is a schematic diagram showing the relationship between the transmitted video signal and color space information.

FIG. 43 is a schematic diagram showing the relationship between the video signal transmitted by a change operation of color space information shown in FIG. 42 and the color space information. At time t0, switching of color space information is restricted. Here, the color space information is not changed because it is determined that the next switching of the color space standard will occur within the predetermined time after the time t0 based on meta-information, though the color space information up to the time t0 is not the same as the color space standard after the time t0. At a time when BT.709 is switched to xvYCC, the color space information is not changed because a determination is made based on the color space standard of xvYCC after the time and the color space information of xvYCC up to the time.

Thus, if color space attributes of video signals constituting a title are retained in a database as meta-information, the next switching of color space attributes can be derived from information about the current reproduction time and meta-information of the title as a method of detecting an interval in which color space attributes of video signal are frequently switched. Then, by detecting whether an interval of frequently switched color space attributes of the video signal is determined from meta-information of the title and restricting the change of color space information, colors can be prevented from changing while being displayed during frequent switching of color space information of an image signal.

Figure 44:
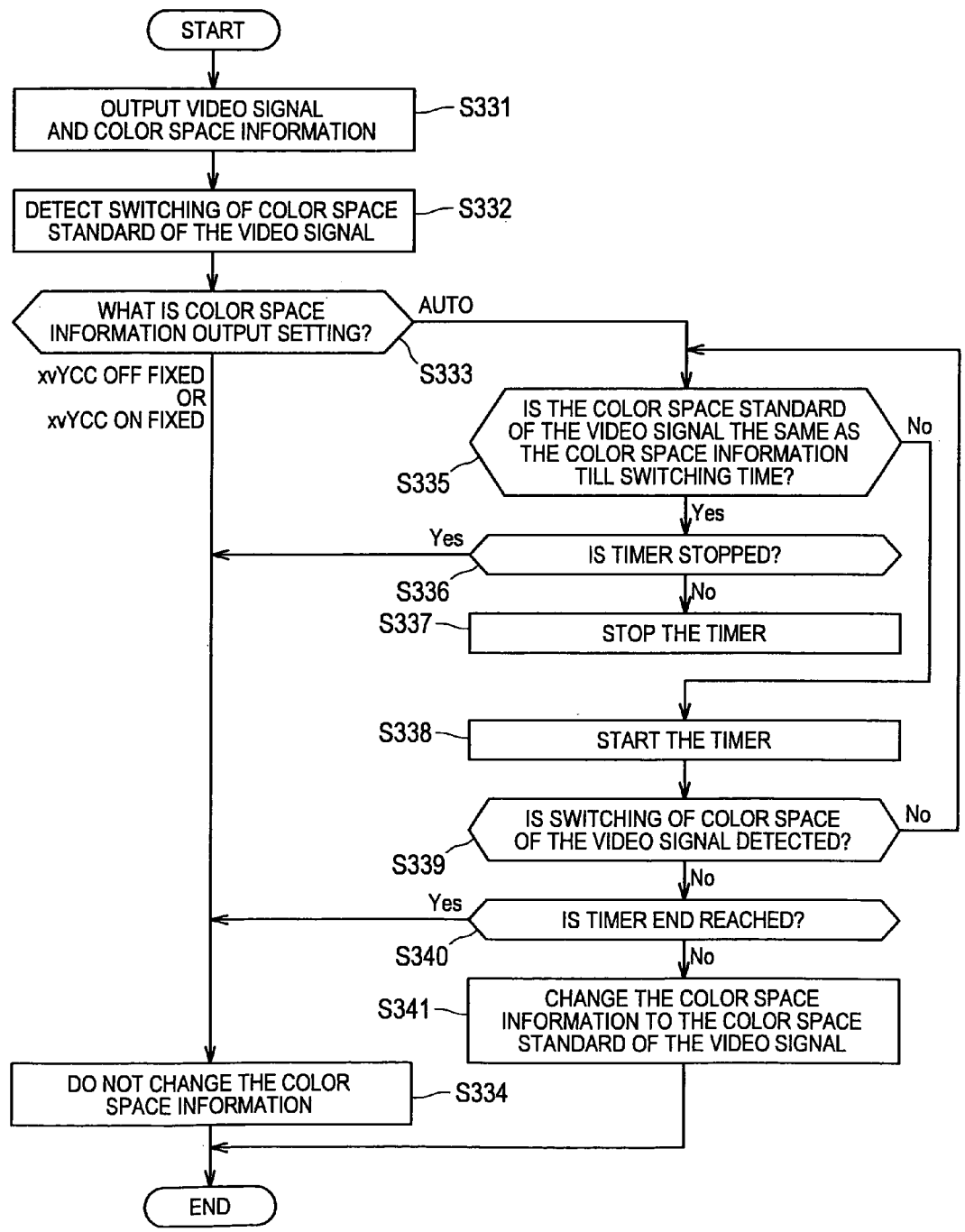
FIG. 44 is a flow chart showing another example of the change operation of the color space information.

FIG. 44 is a flow chart showing another example of the change operation of the color space information. Here, whether an interval of frequently switched color space attributes of a video signal is detected from a result of whether the next switching of the color space standard does not occur in a fixed time after switching of the color space standard occurs to control the change of the color space information accordingly.

At step S331, the host CPU 60 outputs the video signal and color space information to start reproduction of the title. At step S332, the host CPU 60 detects switching of the color space standard of the video signal. For example, the switching time when the color space standard of the video signal is switched can be detected from the color space identification flag or metadata acquired from the MPEG decoder 53. At step S333, the host CPU 23 determines the output setting of color space information set, for example, in the setting screen shown in FIG. 40. If the host CPU 23 determines that the output setting is the "xvYCC OFF fixed" setting or "xvYCC ON fixed" setting, the host CPU 23 proceeds to step S334 and does not change the color space information. If the host CPU 23 determines that the output setting is the "Auto" setting, the host CPU 23 proceeds to step S335.

At step S335, the host CPU 60 determines whether the color space standard of the video signal after the switching detected at step S332 is the same as the current color space information. More specifically, the host CPU 60 determines whether the color space standard of the video signal is the same as that of the color gamut identification flag. If the color space standards are the same at step S335, the host CPU 60 proceeds to step S336. If the color space standards are different, the host CPU 60 proceeds to step S338.

At step S336, the host CPU 60 determines whether the timer is stopped. If the timer is stopped, the host CPU 60 proceeds to step S334 and does not change the color space information. If the timer is not stopped, the host CPU 60 proceeds to step S337 and causes the timer to stop without changing the color space information.

At steps S338 to S340, the host CPU 60 starts the timer set to a predetermined time and determines whether switching of the color space standard occurs before the timer terminates (step S339).

If switching of the color space standard occurs at step S339, the host CPU 60 proceeds to step S335. If switching of the color space standard does not occur within the predetermined time, the host CPU 60 proceeds to step S341 and changes the color space information up to the switching time t0 the color space standard of the video signal after the switching time.

Figure 45:
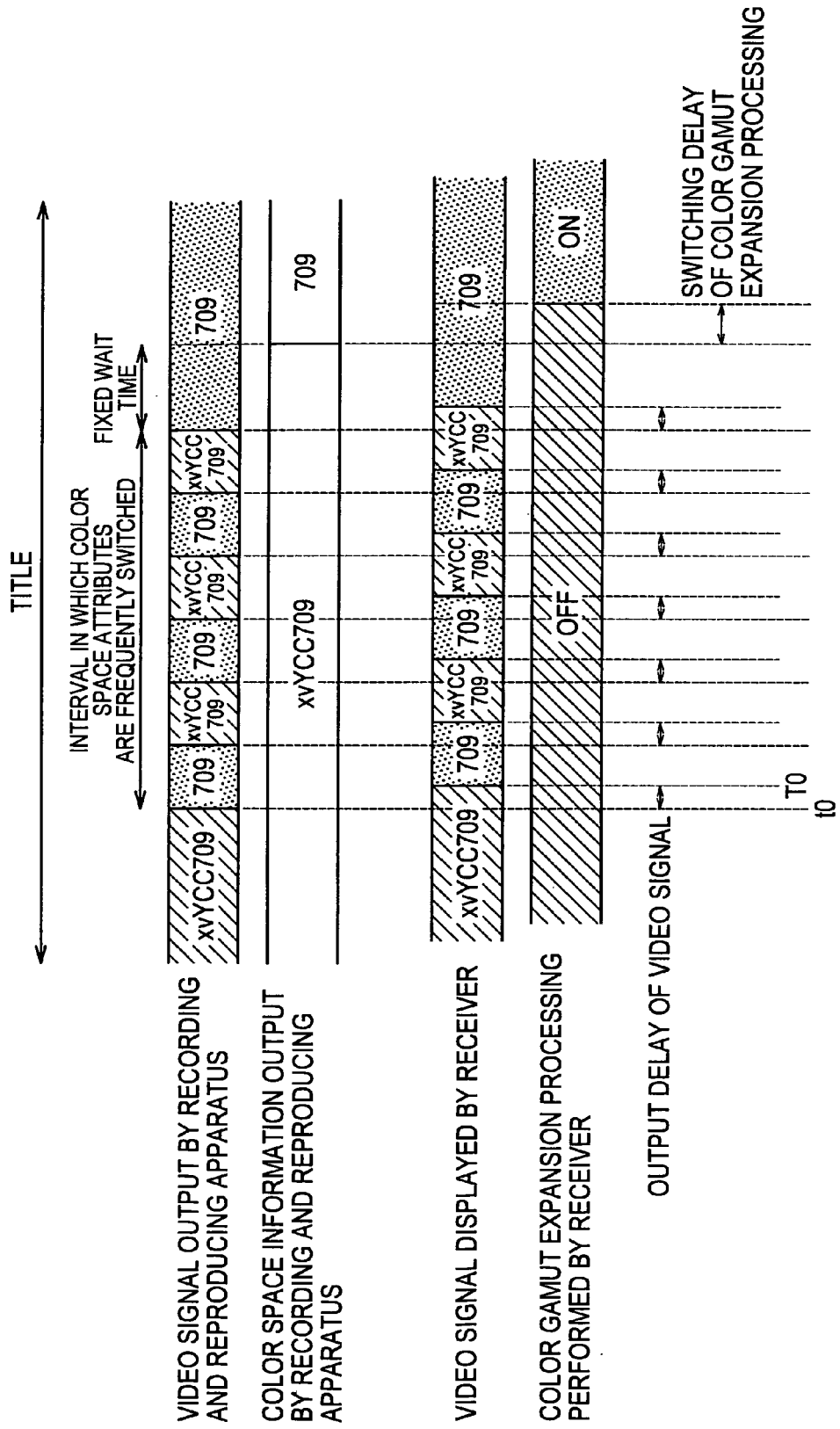
FIG. 45 is a schematic diagram showing the relationship between the transmitted video signal and color space information.

FIG. 45 is a schematic diagram showing the relationship between the video signal transmitted by a change operation of color space information shown in FIG. 44 and the color space information. At time t0, switching of color space information is restricted. Here, the color space information is not changed because it is determined that the next switching of the color space standard will occur within the predetermined time after the time t0, though the color space information up to the time t0 is not the same as the color space standard after the time t0. At a time when BT.709 is switched to xvYCC, the color space information is not changed because a determination is made based on the color space standard of xvYCC after the time and the color space information of xvYCC up to the time. In this example, the predetermined time is set to be long and a certain waiting time occurs in the predetermined time after a period in which color space attributes are frequently switched.

Thus, a result of whether the next switching of the color space does not occur in a fixed time after switching of the color space occurs can be used as a method of detecting an interval in which color space attributes of video signal are frequently switched. By detecting whether an interval of frequently switched color space attributes of a video signal depending on a result of whether the next switching of the color space standard does not occur in a fixed time after switching of the color space standard occurs and restricting the change of the color space information, colors can be prevented from changing while being displayed during frequent switching of color space information of an image signal.

While the switching time when the color space standard of a video signal is switched is detected from the color gamut identification flag or metadata acquired from the MPEG decoder 53 in the present embodiment, if the recording and reproducing apparatus 1 has a database in which the period between the change time of color space information and the switching time of the color space standard is stored for each piece of type information of the TV receiver, for example, settings can be made automatically by acquiring type information or the like from the EDIDROM 24 of the TV receiver 2 and checking the acquired information against information in the database. The database need not be included in the recording and reproducing apparatus 1 and may be in a network such as the Internet connectable by the recording and reproducing apparatus 1.

The present embodiment is described by taking a transmission example using HDMI, but the present invention is not limited to this. While it is difficult to transmit attribute data such as the color gamut identification flag and metadata, for example, an analog component signal or analog composite video signal (or Y/C separate video signal) in wide color gamut may be output from the component terminal 58 or the composite video terminal (or the S terminal) 59 respectively, enabling the host CPU 60 to perform communication with the host CPU 23 of the TV receiver 2 based on, for example, TCP/IP (Transmission Control Protocol/Internet Protocol).

So far, the third embodiment of the present invention has been described using FIGS. 39 to 45. According to the present embodiment, if the next switching of the color space standard occurs within the predetermined time after the switching time when a image signal switches from one color space standard to another color space standard, colors can be prevented from changing while being displayed on a TV receiver side because the change of color space information is restricted depending on the other color space standard.

Fourth Embodiment

A reproduction system according to a fourth embodiment described below is configured like the first to third embodiments shown in FIGS. 1 to 5.

In the present embodiment, faced with the problem, as described using FIGS. 33 and 34, that the switching time of the color space standard of a video signal and that of color gamut expansion processing performed on the video signal do not match, colors are prevented from changing while being displayed on a TV receiver side by inserting a preset image signal when an image signal is switched from one color space standard to another color space standard. The preset image signal is a mute image signal that does not change in color when color space information changes and invalid image data constituted by a single color such as black in the whole image.

A video signal of a mute image is stored in, for example the hard disk drive 44 in advance and the host CPU 60 inserts the video signal of the mute image into a video signal of a title by means of the video graphic processor 54.

More specifically, the output of the mute image is started by inputting the video signal of the mute image into the blender 546 to stop combining the video signal of the title. Alternatively, a mute color is output by inputting a specific color (mute color) to an image region where a video signal is not combined in the blender 546 to stop combining the video signal of the title.

Figure 46:
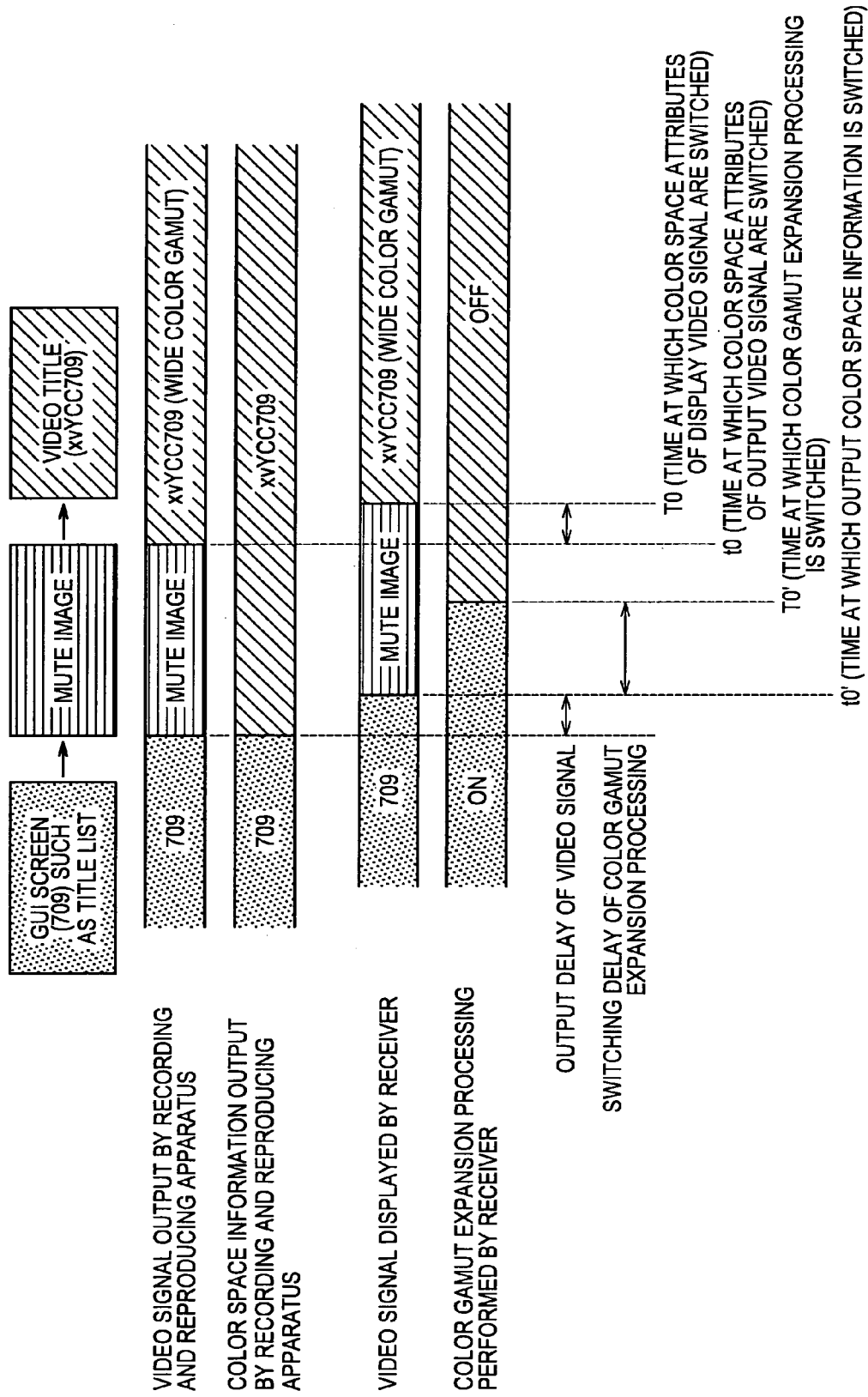
FIG. 46 is a schematic diagram showing the transmission operation when the video signal of a mute image is inserted.

FIG. 46 is a schematic diagram showing the transmission operation when a video signal of a mute image is inserted. When the color space standard of a video signal is switched from BT.709 to xvYCC709, the video signal of the mute image and the color space information of BT.709 are output. Then, after waiting for a predetermined period, output of the video signal (title reproduction) of xvYCC709 is started. By inserting the video signal of the mute image in this manner, the mute image is displayed on the TV receiver 2 side at time t0' and title video of xvUYCC709 is displayed at time T0. Color gamut expansion processing is switched from an on state to an off state in a period when the mute image is displayed between the time t0' and the time T0. That is, switching of color gamut expansion processing is caused on the TV receiver 2 side in response to the mute image and thus, an occurrence of change in tint of video can be prevented when on/off of color gamut expansion processing is switched.

As the length of the predetermined period, a value (for example, one second) sufficiently longer than a period between the input time of a video signal of the TV receiver and the switching time of color gamut expansion processing can be used as a fixed value specific to an apparatus.

Next, video content reproduced continuously will be described by taking a playlist in the Blu-ray Disc Rewritable Format Part3 Audio Visual Basic Specification Version2.1 standard as an example.

The file structure of BD-RE (Blu-ray Disc Rewritable) has a hierarchical structure of a playlist file, clip information file, and a stream file. The clip information file contains information about correspondence of connection of a plurality of play items in the stream file. Therefore, some playlist is reproduced by a plurality of play items being connected by clip information.

Figure 47:
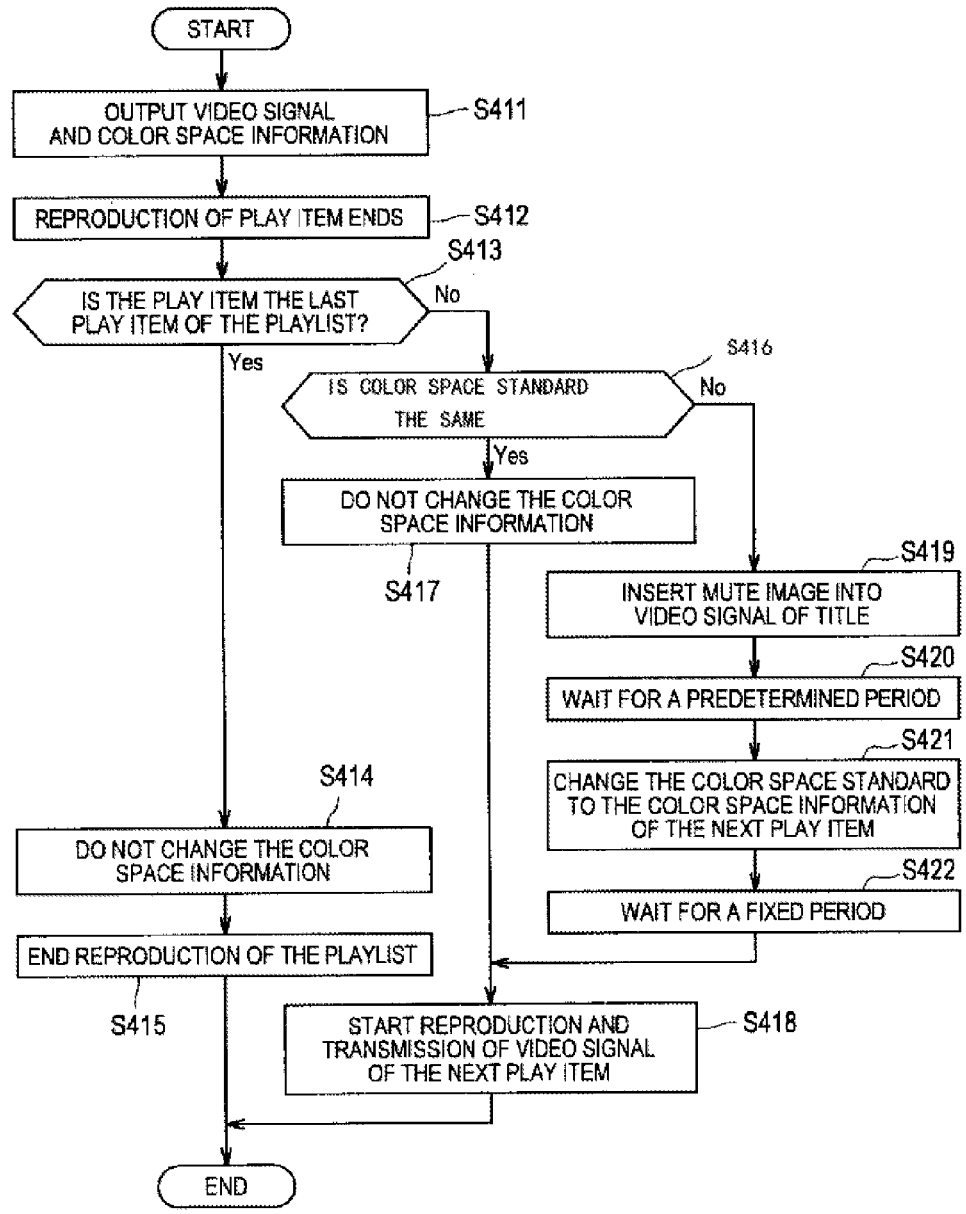
FIG. 47 is a flow chart showing the transmission operation when image data of different color space attributes is mixed.

FIG. 47 is a flow chart showing the transmission operation when image data of different color space attributes is mixed for each reproduction unit constituting a playlist. At step S411, the host CPU 60 outputs a video signal and color space information to start reproduction of a title. At step S422, the host CPU 60 detects an end of reproduction of a play item. That is, the host CPU 60 detects switching of play items.

At step S413, the host CPU 60 determines whether the play item up to the switching detected at step S412 is the last play item of the playlist. This determination is made by referring to, for example, clip information.

If the play item is the last play item at step S413, the host CPU 60 proceeds to step S414 and ends reproduction of the playlist without changing the color space information (step S415) to end transmission of the video signal and color space information.

If the play item is not the last play item at step S413, the host CPU 60 proceeds to step S416 and determines whether the color space standard of the first video signal of the next play item is the same as the color space information prior to switching to the next play item.

If, at step S416, the color space standard of the next video signal is the same as the color space information prior to switching to the next play item, the host CPU 60 proceeds to step S417 and starts reproduction of the video signal of the next playlist without changing the color space information (step S418) to transmit the video signal and color space information to the TV receiver 2.

If, at step S416, the color space standard of the next video signal is different from the color space information prior to switching to the next play item, the host CPU 60 proceeds to step S419 and inserts a video signal of a mute image into a video signal of a title by means of the video graphic processor 54. The host CPU 60 starts to count for an insertion period in which the video signal of the mute image is inserted.

At step S420, the host CPU 60 waits for a predetermined period before changing color space information and, when the predetermined period passes, changes the color space information to color space information in the color space standard of the first video signal of the next play item (step S421). Accordingly, the video signal of the mute image is transmitted prior to the color space information of the play item so that the color space information can reliably be changed within the display period of the mute image.

At step S422, the host CPU 60 further waits for the predetermined period until the insertion period ends and then starts reproduction of the video signal of the next playlist (step S418) to transmit the video signal and color space information to the TV receiver 2.

FIG. 48 is a schematic diagram showing the relationship between the video signal transmitted by the transmission operation shown in FIG. 47 and color space information. When switched from a play item 1 in B T.709 to a play item 2 in xvYCC709, a video signal of a mute image is inserted. When a predetermined period passes after the insertion time, the color space information is changed to the xvYCC709 standard at time t0'. Then, after a period in which the mute image is displayed passes, the video signal is switched to the play item 2 in the xvYCC709 standard at time t0. When switched from the play item 2 to a play item, the color space information is not changed at step S416 because the color space standard of the next video signal is the same as the color space information prior to switching to the next play item.

Thus, by inserting the video signal of the mute image, the mute image is displayed at time t0' and the play item 2 in xvYCC709 is displayed at time T0 on the TV receiver 2 side. Then, color gamut expansion processing is switched from an on state to an off state in a period when the mute image is displayed between the time t0' and the time T0. That is, switching of color gamut expansion processing is caused on the TV receiver 2 side in response to the mute image and thus, an occurrence of change in tint of video can be prevented when on/off of color gamut expansion processing is switched.

While the switching time when the color space standard of a video signal is switched is detected from the color gamut identification flag or metadata acquired from the MPEG decoder 53 in the present embodiment, if the recording and reproducing apparatus 1 has a database in which the period between the change time of color space information and the switching time of the color space standard is stored for each piece of type information of the TV receiver, for example, settings can be made automatically by acquiring type information or the like from the EDIDROM 24 of the TV receiver 2 and checking the acquired information against information in the database. The database need not be included in the recording and reproducing apparatus 1 and may be in a network such as the Internet connectable by the recording and reproducing apparatus 1.

The present embodiment is described by taking a transmission example using HDMI, but the present invention is not limited to this. While it is difficult to transmit attribute data such as the color gamut identification flag and metadata, for example, an analog component signal or analog composite video signal (or Y/C separate video signal) in wide color gamut may be output from the component terminal 58 or the composite video terminal (or the S terminal) 59 respectively, enabling the host CPU 60 to perform communication with the host CPU 23 of the TV receiver 2 based on, for example, TCP/IP (Transmission Control Protocol/Internet Protocol).

So far, the fourth embodiment of the present invention has been described using FIGS. 46 to 48. According to the present embodiment, colors can be prevented from changing while being displayed on a TV receiver side because when a video signal is switched from one color space standard to another color space standard, a preset image signal is inserted in accordance with the other color space standard.

Fifth Embodiment

While a TV receiver normally determines color space information of image data and then switches the rendering mode, the color space information of image data can be known only after analyzing a data stream arranged chronologically. Moreover, image data is processed serially and thus, even if the time when the color space information is switched is obtained, it is difficult to know how long the state will continue.

Therefore, if the color space information is frequently switched, the rendering mode of the TV receiver may be switched frequently, leading to degraded tints of the screen.

If image data with different color space information is mixed and processed, there is a possibility of processing in which the color space information is frequently changed.

Since there is no other way than to process image data serially to know the state of the processing target, there is a possibility that, as a result of processing, it is difficult to know how the image data is reproduced, leading to frequent change in tint of the screen.

Thus, in the present embodiment, an image processing apparatus capable of preventing colors from changing while being displayed is proposed.

A reproduction system according to the fifth embodiment of the present invention is configured as shown in FIGS. 1 to 5.

Figures 49A, 49B:
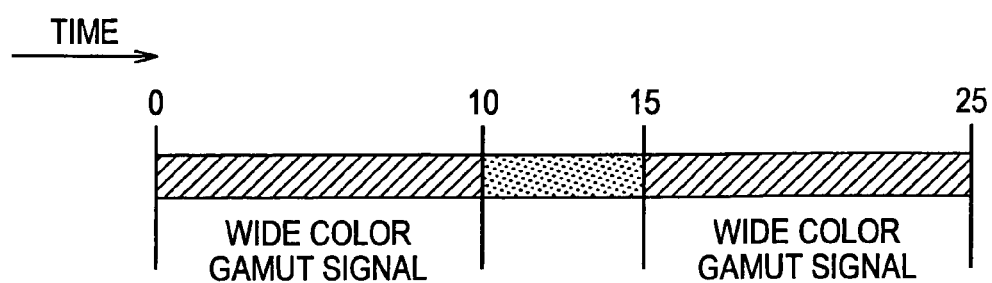
FIG. 49 is a diagram exemplifying the relationship between the video signal and change points of the color space information.

FIG. 49 is a diagram exemplifying the relationship between the video signal and change points of the color space information. FIG. 49A shows a title in which a video signal in BT.709 and that in xvYCC, which is wider than BT.709, are mixed. The title has video signals in which xvYCC is set between the time 0 and the time 10, BT.709 between the time 10 and the time 15, and xvYCC between the time 15 and the time 25. The stream processor 52 detects the time 0, time 10, and time 15 as change points of color space information of the stream and, as shown in FIG. 49B, stores color space information indicating the color space standard of the video signal at detected times in the hard disk drive 44 or the like as metadata.

Moreover, for example, the title ID, title number, Copy Free/EPN, channel number, resume point, recording date/time (starting date and time), reproduction time, recording mode, title name, broadcasting station name, classification mark, genre, thumbnail information, protection, not viewed/viewed, update/recording setting, auto recording and private attributes are stored in the hard disk drive 44 or the like as metadata. The above information is accessibly recorded and managed independently of video data.

Figure 50:
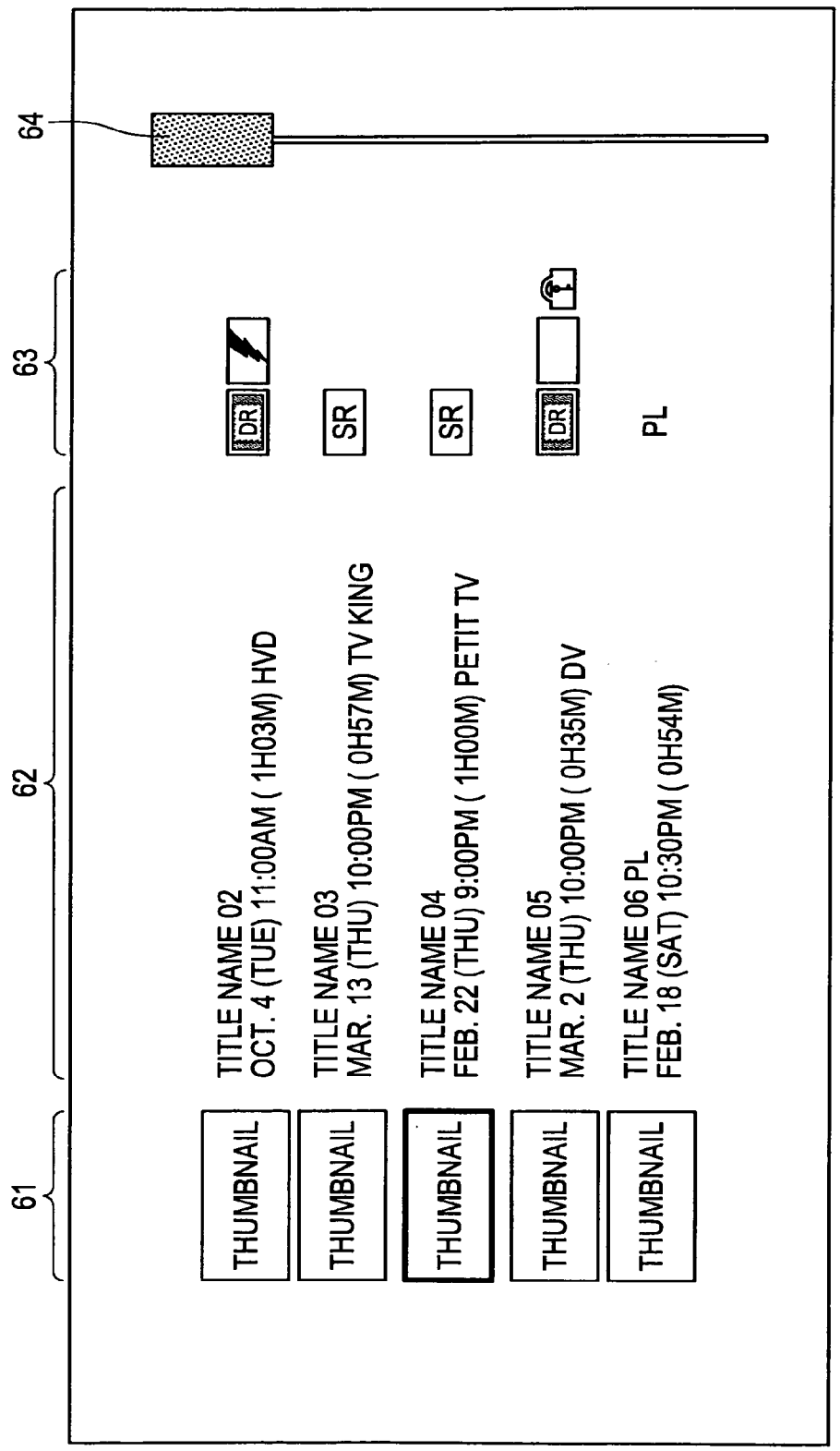
FIG. 50 is a diagram showing a display screen example of a title list.

FIG. 50 is a diagram showing a display screen example of a title list. The display screen is displayed based on metadata created when video data is stored in the hard disk drive 44 or the like. In a thumbnail region 61, for example, the initial screen of video data is displayed as a typical image. In a title region 62, record source information such as the title name, recording date/time, and broadcasting station (channel) digital video (DV) is displayed. In a title attribute region 63, the recording format of video data, information about whether a wide color gamut signal is contained, encryption information and the like are displayed. The user can view information of video data stored in the hard disk drive 44 or the like by moving a scroll bar 64.

In the present embodiment, the host CPU 60 restricts switching of color space information based on change point information of color space information contained in metadata to prevent tints of video from frequently changing due to frequent switching of the color space standard of video signal. The host CPU 60 also sets a period of time in which color space information is maintained, that is, a maintenance time in which the identification flag is not switched by restricting switching of the color space information.

More specifically, the maintenance period corresponding to display information is stored in the hard disk drive 44 or the like in advance and when display information is acquired through communication with the TV receiver 2, the maintenance time corresponding to the model of the TV receiver 2 is acquired and set.

Figure 51:
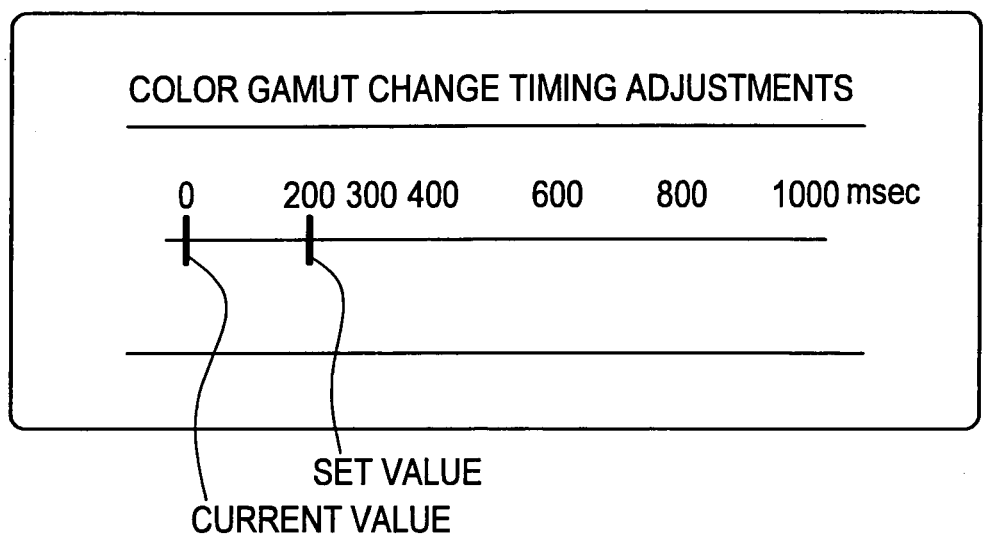
FIG. 51 is a diagram exemplifying the setting screen.

Also, the maintenance time may be set manually by the user through a setting screen as shown in FIG. 51. The user can set the maintenance time by moving the cursor in the GUI (Graphical User Interface) screen.

Figure 52:
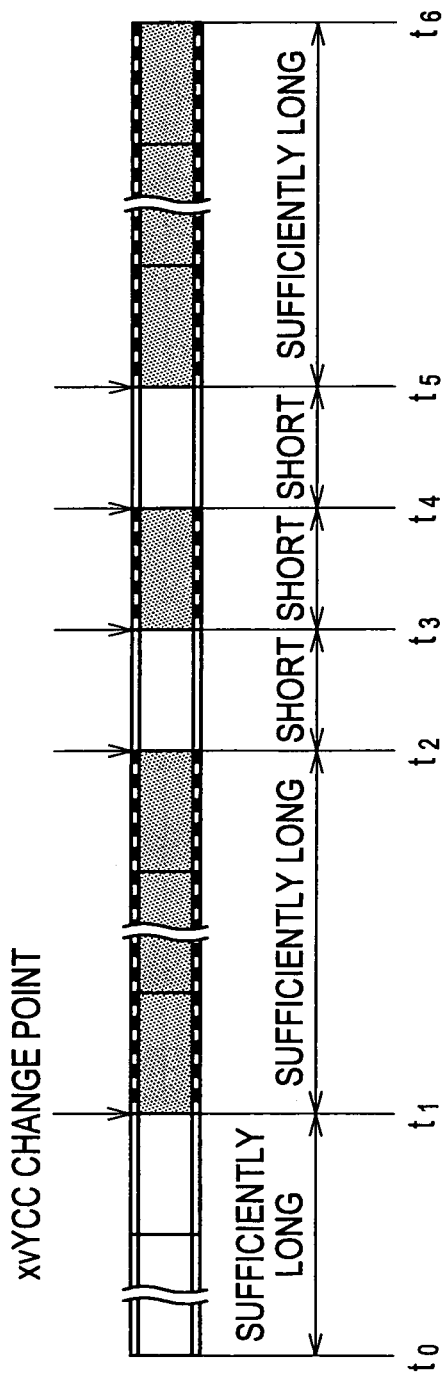
FIG. 52 is a diagram exemplifying the video signal in which the color space standard is switched.

FIG. 52 is a diagram exemplifying the video signal in which the color space standard is switched. Here, change points t0 to t6 of color space information are acquired from metadata extracted by the stream processor 52. The color space standard of the video signal is switched at each time of t0 to t6 and the color space information is switched accordingly. Here, periods between the times t2 and t3, between the times t3 and t4, and between the times t4 and t5 are shorter than the set maintenance time. In this case, for example, the period between the times t2 and t5 maintain color space information and processing is performed in the manner as in an xvYCC period between the times t1 and t2. That is, the host CPU 60 maintains the color gamut flag set to xvYCC in the period between the times t2 and t5. Accordingly, the TV receiver 2 can suppress the change in tint accompanying color gamut expansion processing because the color gamut expansion processing is turned off in the period between the times t2 and t5.

Next, an edit operation in the recording and reproducing apparatus 1 will be described with reference to FIGS. 53 to 57. The host CPU 60 performs an edit based on editing points input for a stream to be edited. The stream processor 52 extracts metadata from the stream to be edited to acquire change point information of the color space standard of video data.

Figure 53:
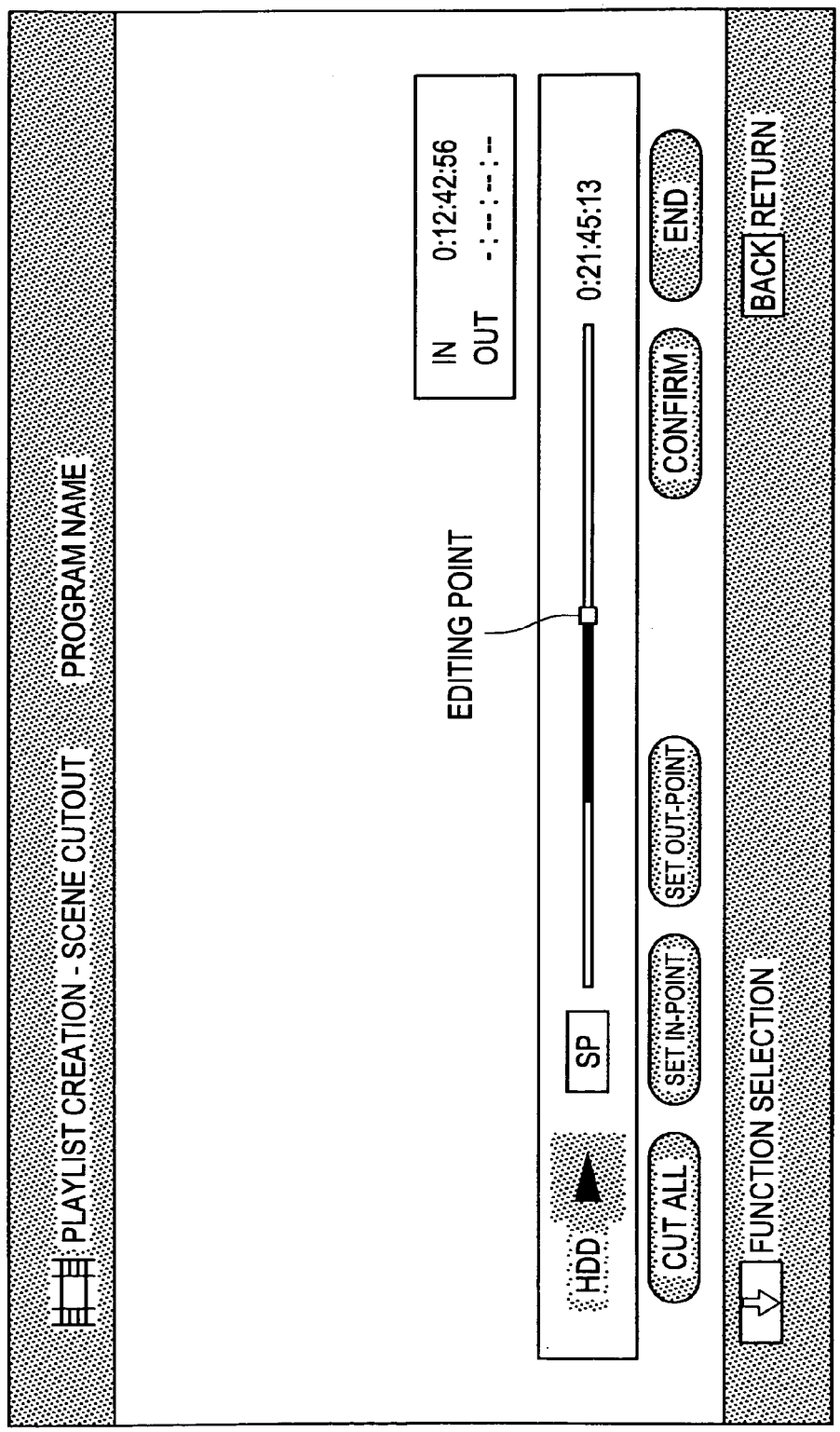
FIG. 53 is a diagram exemplifying an editing screen when a scene is cut out.
Figure 54:
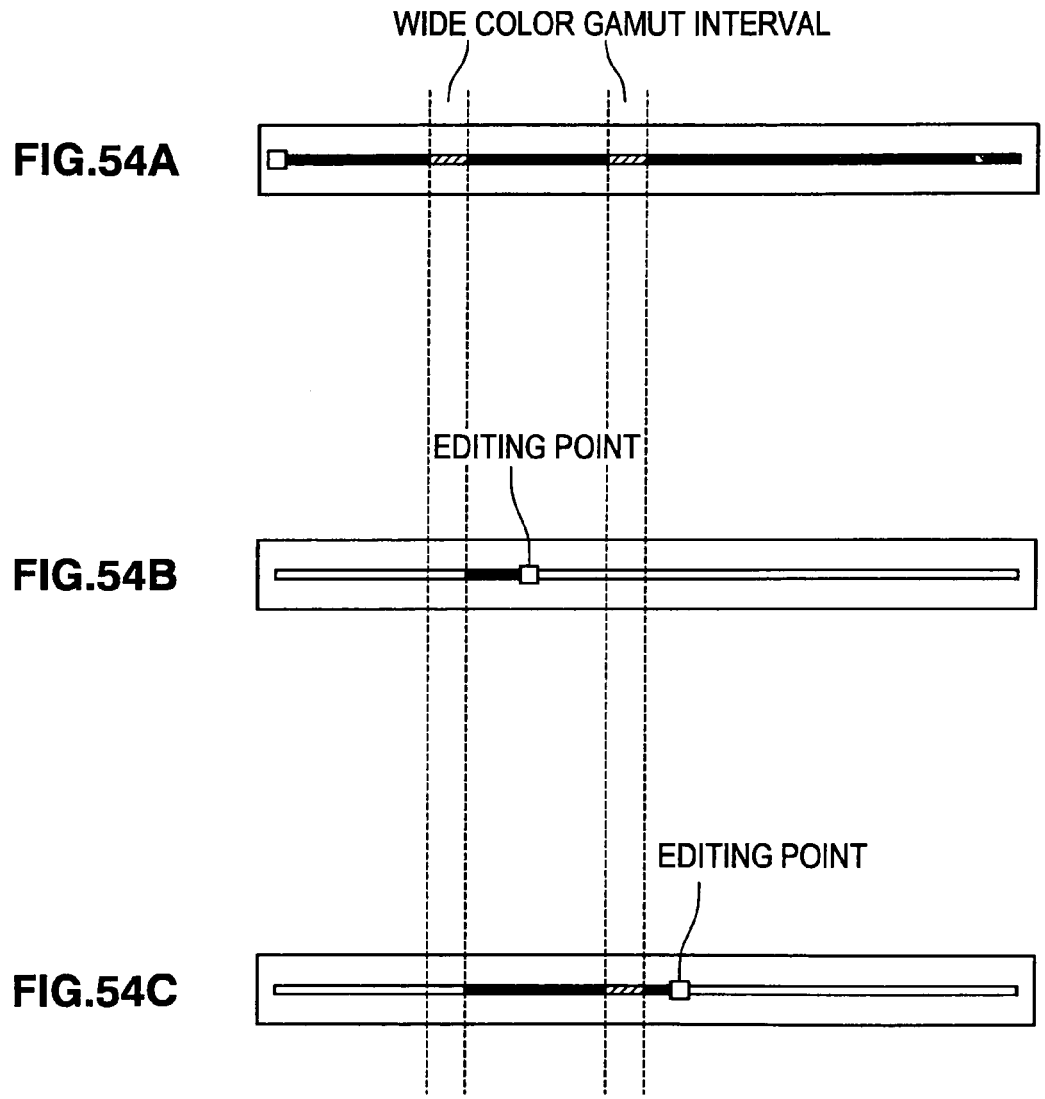
FIG. 54 is a diagram exemplifying a GUI operation screen.

FIG. 53 is a diagram exemplifying an editing screen when a scene is cut out. The screen has a GUI operation screen 92 blended with video 91. The user can set an in point and an out point by moving an editing point of the GUI operation screen 92 while viewing the video 91.

As shown in FIG. 54A, a stream to be edited is displayed by a time axis in the GUI operation screen 92. The display of the time axis is changed based on metadata so that an interval of wide color gamut such as xvYCC is recognizable. Therefore, if an in point and an out point are set as shown in FIG. 54B, it is clear that the scene is a scene of a single color space standard containing no video data of wide color gamut. If an in point and an out point are set as shown in FIG. 54C, on the other hand, it is clear that the scene is a scene of a plurality of color space standards containing a wide color gamut interval. By presenting change points of the color space standard of video data based on metadata in this manner, the user can cut out scenes by considering change in tint.

Based on metadata containing information about change points of the color space standard, the host CPU 60 warns or prohibits editing operations of the user. More specifically, the host CPU 60 warns or prohibits edit processing that makes the interval between change points of the color space standard shorter than a predetermined period.

Figure 55:
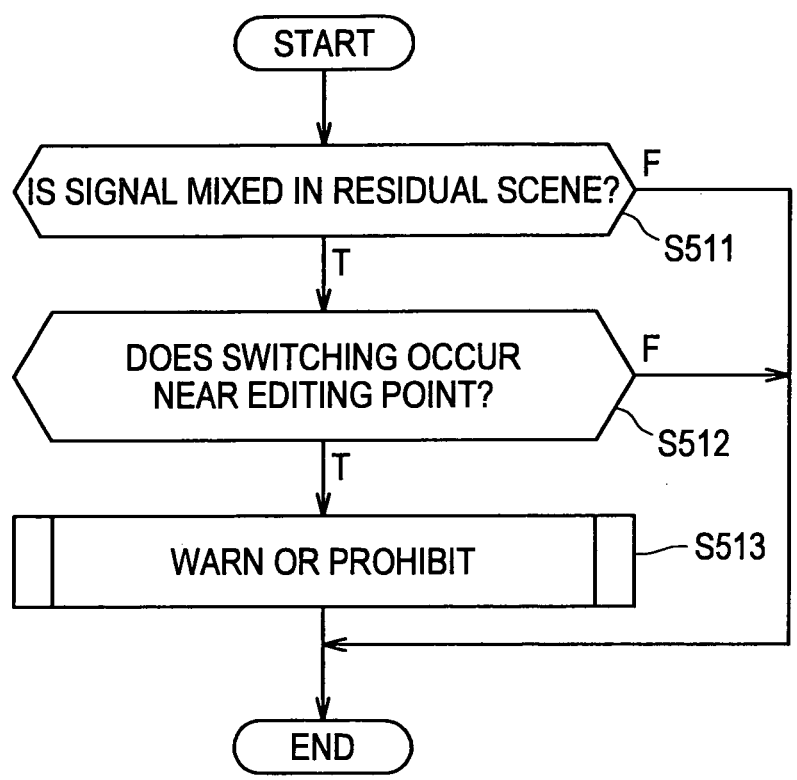
FIG. 55 is a flow chart showing a warning/prohibition operation during an edit.

FIG. 55 is a flow chart showing a warning/prohibition operation during an edit. At step S511, the host CPU 60 determines whether video data to which an editing point setting an in point or an out point has different color space standards mixed therein. If the video data has different color space standards mixed therein, the host CPU 60 proceeds to step S512 and if the video data does not have different color space standards mixed therein, the host CPU 60 ends the warning/prohibition operation.

At step S512, the host CPU 60 determines whether switching of the color space standard occurs near an editing point. Here, if the editing point is an in point, the host CPU 60 determines whether there is a change point of the color space standard within a predetermined period from the in point. If the editing point is an out point, the host CPU 60 determines whether there is a change point of the color space standard within a predetermined period up to the out point. The above maintenance period in which the identification flag is not switched may be used as the predetermined period.

If switching of the color space standard occurs near the editing point at step S512, the host CPU 60 proceeds to step S13 and if switching of the color space standard does not occur near the editing point, the host CPU 60 ends the warning/prohibition operation.

At step S513, the host CPU 60 presents a warning or prohibition to the user. As a warning, for example, "Because switching will occur in a short time, the color display may become abnormal. Do you want to continue?" is displayed. As a prohibition, "Because monitor output is affected, this point is not allowed to select as an editing point." is displayed. Here, whether a warning or prohibition is set in accordance with display information acquired from the TV receiver 2.

Figure 56:
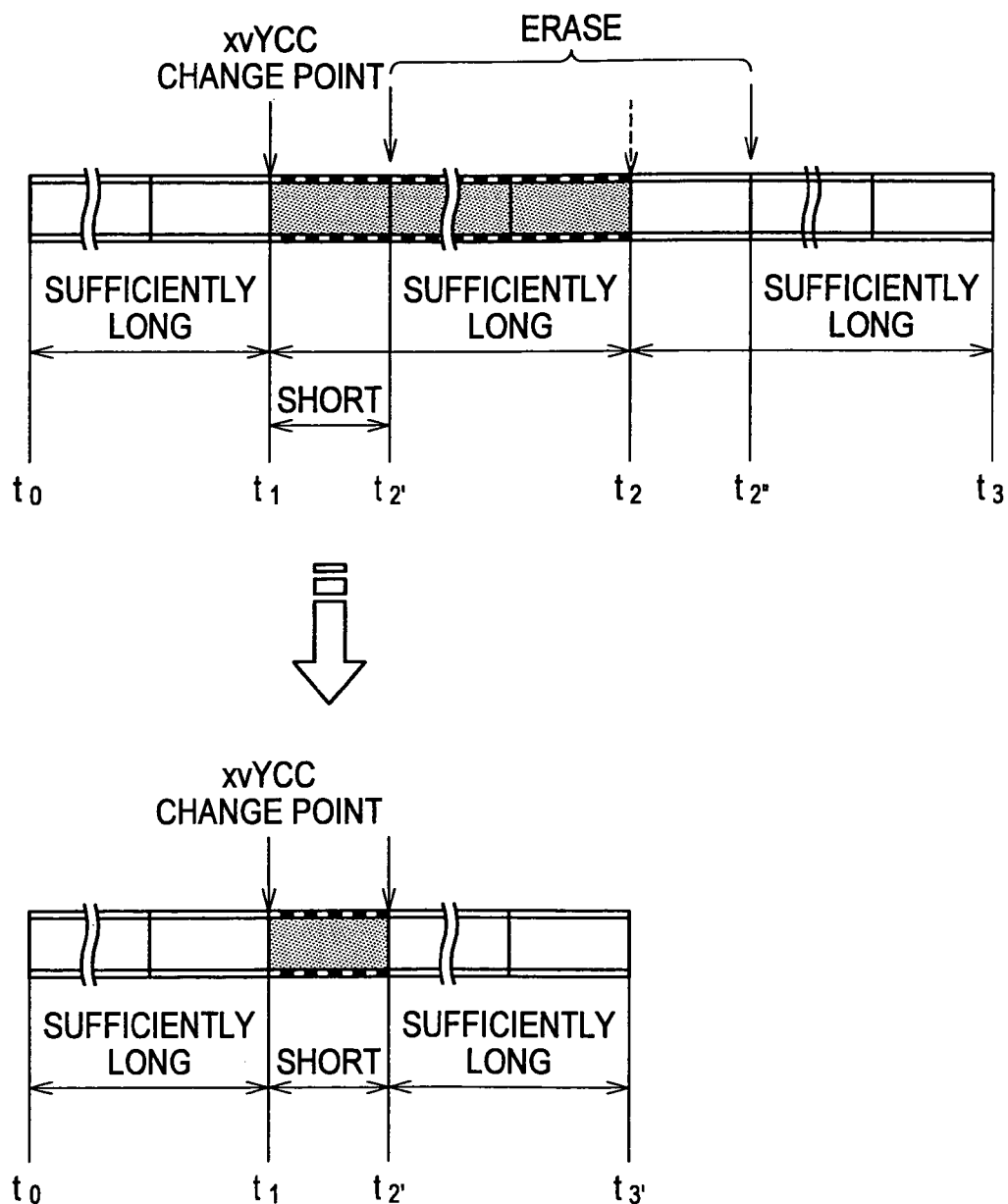
FIG. 56 is a diagram exemplifying the edit in which a warning/prohibition is presented.

FIG. 56 is a diagram exemplifying the edit in which a warning/prohibition is presented. In FIG. 56, periods between the times t0 and t1, between the times t1 and t2, and between the times t0 and t3 are longer the above maintenance period and a period between the times t1 and t2 contains a video signal of the color space standard of xvYCC. Here, if an edit to delete a video signal in the period between times t2' and t2" is performed so that the period between the times t1 and t2' becomes shorter than the maintenance period, the host CPU 60 presents a warning or prohibition.

Figure 57:
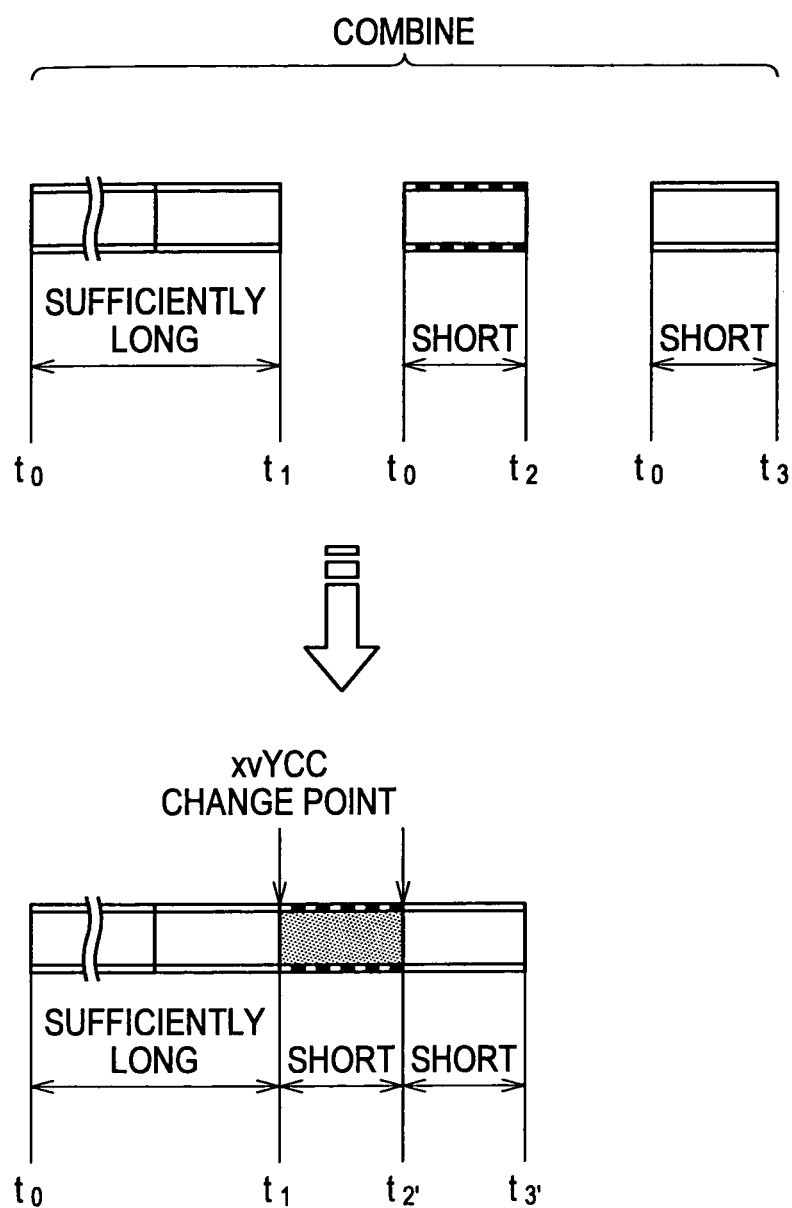
FIG. 57 is a diagram exemplifying the edit in which a warning/prohibition is presented.

If, as shown in FIG. 57, a video signal between the times t0 and t1, a video signal of wide color gamut between the times t1 and t2, and a video signal between the times t0 and t3 are combined and periods between the times t0 and t2 and between the times t0 and t3 are shorter than the maintenance period, the host CPU 60 presents a warning or prohibition.

Thus, when video data is recorded in the hard disk drive 44 or the like, problems regarding edits, operations and the like can proactively be avoided by recording change point information of the color space standard as metadata by associating with video data and managing the color space information of the video data.

So far, the fifth embodiment of the present invention has been described using FIGS. 49 to 57. According to the present embodiment, change points of the color space standard of a video signal are detected and change point information associating change points of the color space standard of a image signal and the position of the image signal is recorded and thus, for example, colors can be prevented from changing while being displayed by presenting a warning or prohibition based on change point information in edit processing.

Sixth Embodiment

Incidentally, when a wide color gamut signal defined by the standard xvYCC of the video signal of wide color gamut described herein in the background is transmitted via the HDMI, if the connected display (a display apparatus such as a TV receiver) is compatible with xvYCC, a format to write the color gamut identification flag of a signal to be transmitted and metadata in AVI InfoFrame of HDMI is specified. The xvYCC compatible display determines the signal and automatically sets the color gamut on the display surface to enable optimal color reproduction. That is, if a signal of conventional color gamut and that of wide color gamut are switched, the color gamut setting is switched based on information of the above AVI InfoFrame on the display or monitor side, but it may be difficult to match change points of an actual signal to switching points of a control signal of AVI InfoFrame. For example, even if change points are matched on a sender side, timing may be shifted on a receiver side and the converse thereof can also be assumed. If an actual signal and setting timing of the color gamut on the monitor side are different, there is a problem that video of undesirable color is displayed for a moment by a transient thereof.

Thus, in the present embodiment, an image processing apparatus capable of preventing change in tint of video due to switching of the color gamut setting on the monitor side and degradation by a transient when a plurality of image signals (video signals) of different color space standards is mixed is provided.

A reproduction system according to the sixth embodiment of the present invention is configured, excluding the video graphic processor 54 described below, as shown in FIGS. 1 to 5.

FIG. 58 is a functional block diagram showing the video graphic processor 54 that combines images according to the present embodiment.

In FIG. 58, the video graphic processor 54 includes a memory 301, combining processing units 302a to 302d, a graphic engine 306, and a JPEG engine 307. Here, the combining processing units 302a to 302d are prepared for each output format and each includes a scaler 308, a color expander 309, a blender 310, and a video encoder 311.

Output of the video decoder 48 and output of the MPEG decoders 53a and 53b are written to a video plane of the memory 301. The graphic engine 306 writes graphic data to a graphic plane of the memory 301. The JPEG engine 307 decodes a JPEG file and writes JPEG data to the video plane of the memory 301. Image data written to the memory 301 is read from each plane and scaled to a desired size by the scaler 308 before being transmitted to the blender 310 via the color expander 309. The color expander 309 performs color gamut conversion processing to convert an image signal of a first color space standard into an artificial wide color gamut signal by artificially expanding the color gamut of the image signal of the first color space standard to the color gamut of a second color space standard and more specifically, artificially expands (color gamut expansion processing) the color gamut of sRGB to that of xvYCC before transmitting the artificial wide color gamut signal to the blender 310. The blender 310 combines images read from each plane. The video encoder 311 generates timing or adds a synchronization signal to achieve desired output specifications. The combining processing units 302b to 302d have a circuit configuration similar to that of the combining processing unit 302a and perform processing in accordance with the form of output.

Next, an example of expansion processing (color gamut expansion processing) to artificially convert the color gamut of BT.601 or BT.709 (first color space standard) into that of xvYCC (second color space standard) by the color expander 309 will be described.

The value of level of a chroma (Cr, Cb) signal in BT.601 or BT.709 is specified to 16 to 240. In xvYCC, signal levels of values of 1 to 254 can be handled to further expand the color gamut. Here, a method of artificially changing a signal of conventional level to a wide color gamut will be described using FIG. 59.

FIG. 59 is a diagram exemplifying level changes when expansion processing of a Cr signal and a Cb signal, which are the chroma signals, is performed. That is, FIG. 59A shows the Cr signal and FIG. 59B the Cr signal and shows output with respect to input to the color expander 309 for the Cr signal and the Cb signal respectively. As described above, the Cr signal input to the color expander 309 is specified to the level range of 16 to 240 in BT.601 or BT.709. When this is converted into an artificial xvYCC signal, signals of a predetermined level range, for example, the level range of 36 to 220 are allowed to pass unchanged (with the amplification factor set to 1) and level conversions (level expansion by a fixed amplification factor greater than 1) are made on each of signals whose level range is 16 to 36 and those whose level range is 221 to 240 by linear processing to perform processing to expand the level range of 16 to 36 to 1 to 36 and the level range of 221 to 240 to 221 to 254. As a result, artificial xvYCC signals are generated by color signals with a relatively high degree of saturation of original signal being further expanded. The Cb signal is also expanded in the same manner. An xvYCC flag (color space information of the second color space standard) can be used for the artificial xvYCC signal on which color gamut expansion processing is performed as color space information and thus, even if an xvYCC signal and an artificial xvYCC signal are mixed, the xvYCC flag can be fixed for output and transmit to the color space information.

While expansion processing on the Cr/Cb signal is exemplified in FIG. 59, similar expansion processing may also be performed in RGB signals. Moreover, the threshold of level may be changed and also the gain (amplification factor) of level conversion may be controlled independently in a range below the threshold and in a range above by using the threshold as a boundary. Further, a similar effect can be achieved by adopting nonlinear processing as the level conversion.

Next, a control operation of the color expander 309 and an input/output signal example will be described using FIGS. 61 and 62.

Figure 60:
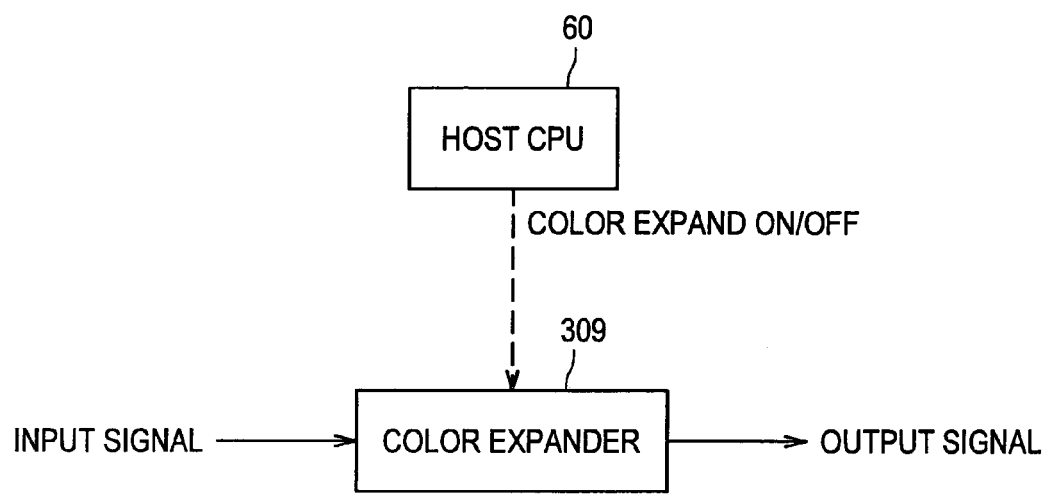
FIG. 60 is a block diagram schematically showing the configuration when color expander is controlled.

The host CPU 60 in FIG. 60 detects whether the color space standard of the video signal currently output is xvYCC and sends the result to the color expander 309 as a color expansion ON/OFF signal. The color expander 309 turns on/off the expansion processing based on the color expansion ON/OFF signal of the host CPU 60. That is, if a video signal in which xvYCC and 709/601 signals are mixed as shown in FIG. 61A is input, the expansion processing is turned on for 709/601 signals and converts for artificial xvYCC signals and thus, as shown in FIG. 61B, an output signal of wide color gamut can typically be obtained and color space information transmitted together with a video signal can be fixed, as shown in FIG. 61C, to the color gamut identification flag (xvYCC identification signal) indicating wide color gamut.

Here, if xvYCC and 709/601 signals before expansion processing being performed thereon are mixed, it is conventionally necessary to change the color space information of AVI of an HDMI Tx 116 by fitting to the signals, but by constantly transmitting an xvYCC or artificial xvYCC signal, as described above, it becomes possible to transmit a fixed color gamut identification flag (xvYCC identification signal).

Since the fixed color gamut identification flag (xvYCC identification signal) is regularly transmitted on the TV receiver 2 side (monitor side), it becomes unnecessary to switch the setting of the color gamut in accordance with different color space standards as before so that change in tint of video, degradation by a transient and the like can be prevented.

So far, the sixth embodiment of the present invention has been described using FIGS. 58 to 61. According to the present embodiment, when video of different color space standards is mixed, it becomes possible to prevent undesirable video from being displayed due to switching timing on a sender side and a receiver side, which conventionally poses a problem, by converting conventional 709/601 signals into artificial xvYCC signals. Since, as described above, the xvYCC flag added to an elementary stream as color space information is detected on the sender side, switching timing of an xvYCC signal and an artificial xvYCC signal can internally be controlled correctly.

Since it is difficult to transmit a flag specified by HDMI in analog transmission of a component signal or the like, the optimum color gamut can be obtained by constantly outputting an xvYCC signal (including an artificial xvYCC signal) from the sender side.

A case in which an image signal of the first color space standard (for example, SMPTE 170M/ITU601 or ITU709) and an image signal of the second color space standard (for example, xvYCC) are temporally switched is described, but the present invention can also be applied when a plurality of image signals of these different color space standards is spatially mixed simultaneously. In this case, when one image signal is generated by combining an image signal of the first color space standard and that of the second color space standard, the image signal of the first color space standard may be combined after artificially being expanded to the color gamut of the second color space standard with color space information output after being fixed to that of the second color space standard.

Further, according to the present embodiment, it can be made unnecessary to switch the setting of the color gamut on the display side (monitor side) based on color space information to be transmitted and change in tint of video, degradation by a transient and the like can be prevented by artificially expanding an image signal of the first color space standard to the color gamut of the second color space standard for an image signal in which the image signal of the first color space standard and that of the second color space standard are mixed and transmitting the artificial wide color gamut signal artificially expanded, the video signal of the second color space standard, and color space information fixed to the color space information of the second color space standard so that the optimum color gamut can be obtained.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus that performs signal processing of a plurality of image signals including a first image signal of a first color space standard and a second image signal of a second color space standard having a wider color gamut than a color gamut specified by the first color space standard, comprising: image processing means for combining the plurality of image signals to generate a combined image signal; control means for deciding color space information of the combined image signal in favor of one of the first color space standard and the second color space standard; and transmission means for transmitting the combined image signal and the decided color space information according to a predetermined digital video signal transmission standard, wherein the control means decides the color space information of the combined image signal in accordance with the color space standard of the combined image signal, which is decided by the control means based on a combining ratio of the first and second image signals combined by the image processing means, and the color space information prior to the combining the plurality of image signals.

2. The image processing apparatus according to claim 1, wherein the image processing means performs expansion processing on the image signal of the first color space standard so as to become an artificial second color space standard.

3. The image processing apparatus according to claim 1, further comprising selection means for selecting an image signal of a main image among the plurality of image signals combined by the image processing means.

4. The image processing apparatus according to claim 3, wherein the main image is an image from which sound is output.

* * * * *